United States Patent
Haque et al.

(10) Patent No.: US 11,956,725 B2
(45) Date of Patent: Apr. 9, 2024

(54) NETWORK INITIATED ON-DEMAND ZERO-ENERGY PAGING METHOD AND APPARATUS

(71) Applicant: INTERDIGITAL PATENT HOLDINGS, INC., Wilmington, DE (US)

(72) Inventors: Tanbir Haque, Jackson Heights, NY (US); Ravikumar V. Pragada, Warrington, PA (US); Anantharaman Balasubramanian, San Diego, CA (US); Alpaslan Demir, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/962,863

(22) Filed: Oct. 10, 2022

(65) Prior Publication Data

US 2023/0189148 A1 Jun. 15, 2023

Related U.S. Application Data

(63) Continuation of application No. 16/768,129, filed as application No. PCT/US2018/063320 on Nov. 30, 2018, now Pat. No. 11,470,553.

(Continued)

(51) Int. Cl.
*H04W 52/02* (2009.01)
*H04W 76/28* (2018.01)

(52) U.S. Cl.
CPC ... *H04W 52/0229* (2013.01); *H04W 52/0216* (2013.01); *H04W 52/0235* (2013.01); *H04W 76/28* (2018.02)

(58) Field of Classification Search
CPC ............. H04W 52/0229; H04W 76/28; H04W 52/0216; H04W 52/0235; H04W 52/0245;
(Continued)

(56) References Cited

U.S. PATENT DOCUMENTS

| | | | |
|---|---|---|---|
| 7,525,436 | B2 | 4/2009 | Mickle et al. |
| 8,390,433 | B2 | 3/2013 | Warner et al. |

(Continued)

FOREIGN PATENT DOCUMENTS

| | | |
|---|---|---|
| CN | 205983517 U | 2/2017 |
| EP | 2621242 A1 | 7/2013 |

(Continued)

OTHER PUBLICATIONS

3GPP TSG RAN WG1 Meeting #89; R1-1707456 (as submitted in IDS); Source: CATT; Title: UE Wakeup Mechanism and On-Demand Access for fNB-IoT UE Power Saving; May 15-19, 2017, Hangzhou, China. (Year: 2017).*

(Continued)

*Primary Examiner* — Mohammed S Chowdhury
(74) *Attorney, Agent, or Firm* — Volpe Koenig

(57) ABSTRACT

A wireless transmit/receive unit (WTRU) may include one or more antennas and a first transceiver operatively coupled to the antennas. The one or more antennas and the first transceiver may be configured to receive a first signal from a network using zero energy from the WTRU. The one or more antennas and the first transceiver may be further configured to extract energy from the first signal. The first transceiver may be further configured to examine a separation between energy threshold events to decode an energy signature of the first signal. The first transceiver may be further configured to activate a second transceiver operatively coupled to the one or more antennas if the decoded energy signature matches a stored energy signature, wherein (Continued)

the second transceiver is powered by the WTRU. The one or more antennas and the second transceiver may be configured to receive a second signal from the network.

16 Claims, 56 Drawing Sheets

Related U.S. Application Data

(60) Provisional application No. 62/593,631, filed on Dec. 1, 2017.

(58) Field of Classification Search
CPC .. H04W 52/0261; Y02D 30/70; H04B 7/0404
See application file for complete search history.

(56) References Cited

U.S. PATENT DOCUMENTS

| | | | |
|---|---|---|---|
| 8,737,280 B2 | 5/2014 | Mujtaba et al. | |
| 9,232,475 B2 | 1/2016 | Heinzelman et al. | |
| 9,801,060 B2 | 10/2017 | Min et al. | |
| 2005/0009527 A1 | 1/2005 | Sharma | |
| 2010/0067422 A1 | 3/2010 | Kadous et al. | |
| 2011/0252111 A1 | 10/2011 | Murray et al. | |
| 2011/0298591 A1 | 12/2011 | Mickle et al. | |
| 2012/0319824 A1 | 12/2012 | Bares et al. | |
| 2013/0124883 A1 | 5/2013 | Addepalli et al. | |
| 2013/0301542 A1 | 11/2013 | Krishnamurthy et al. | |
| 2014/0112226 A1 | 4/2014 | Jafarian et al. | |
| 2014/0112229 A1 | 4/2014 | Merlin et al. | |
| 2014/0228025 A1 | 8/2014 | Singh et al. | |
| 2014/0254445 A1* | 9/2014 | Heinzelman | H04W 52/0229 370/311 |
| 2014/0269465 A1 | 9/2014 | Ballantyne et al. | |
| 2015/0087255 A1 | 3/2015 | Wentzloff et al. | |
| 2016/0278003 A1 | 9/2016 | Kim et al. | |
| 2016/0302076 A1* | 10/2016 | Chou | H04W 52/0225 |
| 2016/0337975 A1* | 11/2016 | Li | H04W 52/0238 |
| 2018/0049126 A1* | 2/2018 | Cheng | H04W 76/28 |
| 2018/0049156 A1* | 2/2018 | Laha | H04W 76/28 |
| 2018/0139698 A1* | 5/2018 | Quinlan | H04Q 9/00 |
| 2018/0288705 A1 | 10/2018 | Park et al. | |
| 2018/0375703 A1* | 12/2018 | Kellogg | H04L 27/26 |
| 2019/0342939 A1* | 11/2019 | Liu | H04W 72/569 |
| 2020/0367166 A1* | 11/2020 | Wong | H04W 52/0229 |
| 2021/0153218 A1* | 5/2021 | Wang | H04W 72/543 |

FOREIGN PATENT DOCUMENTS

| | | |
|---|---|---|
| EP | 2 833 680 | 2/2015 |
| WO | 2011/097116 | 8/2011 |
| WO | 2015/055669 | 4/2015 |

OTHER PUBLICATIONS

SA WG2 Meeting #123; S2-177357; Source: CATT; Title: Complete paging priority handling in SR procedure; Oct. 23-27, 2017, Ljubljana, Slovenia. (Year: 2017).*
SA WG2 Meeting #123; S2-177522; Source: Huawei, HiSilicon; Title:TS 23.502: Paging Priority considering RRC-inactive; Oct. 23-27, 2017, Ljubljana, Slovenia (Year: 2017).*
Catt, "UE Wakeup Mechanism and On-Demand Access for fNB-IoT UE Power Saving," 3GPP TSG RAN WG1 Meeting #89, R1-1707456, Hangzhou, China (May 15-19, 2017).
Catt et al., "New SID: Study on UE Power Saving and Wakeup Mechanism in NR," 3GPP TSG RAN Meeting #77, RP-171862, Sapporo, Japan (Sep. 11-14, 2017).
Ba et al., "Passive Wake-Up Radios: From Devices to Applications," Ad Hoc Networks 11, pp. 2605-2621 (2013).
Chen et al., "Range Extension of Passive Wake-up Radio Systems through Energy Harvesting," 2013 IEEE International Conference on Communications, pp. 1549-1554 (Jun. 2013).
Chen et al., "REACH2-MOTE: A Range-Extending Passive Wake-UP Wireless Sensor Node," ACM Transactions on Sensor Networks, vol. 11, No. 4 (Dec. 2015).
Eichler et al., "LTE-M, NB-IoT and LTE-V paving the way to 5G IoT," Rohde &Schwarz tutorial (Jun. 2016).
Gu et al., "Radio-Triggered Wake-Up for Wireless Sensor Networks," Real-Time Systems 29 (2), pp. 157-182 (Mar. 31, 2005).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Nokia Networks et al., "UE Power Consumption Reduction for MTC," 3GPP TSG-RAN WG1 Meeting #78bis, R1-144175, Ljubljana, Slovenia (Oct. 6-10, 2014).
Park et al., "AmbiMax: Autonomous Energy Harvesting Platform for Multi-Supply Wireless Sensor Nodes," Center for Embedded Computer Systems, University of California, Irvine (2006).
Rico-Alvarino et al., "An Overview of 3GPP Enhancement on Machine to Machine Communications," IEEE Communications Magazine (Jun. 2016).
Singh et al., "Enhanced Power Saving in Next Generation Wireless LANs," IEEE Vehicular Technology Conference (Sep. 2006).

* cited by examiner

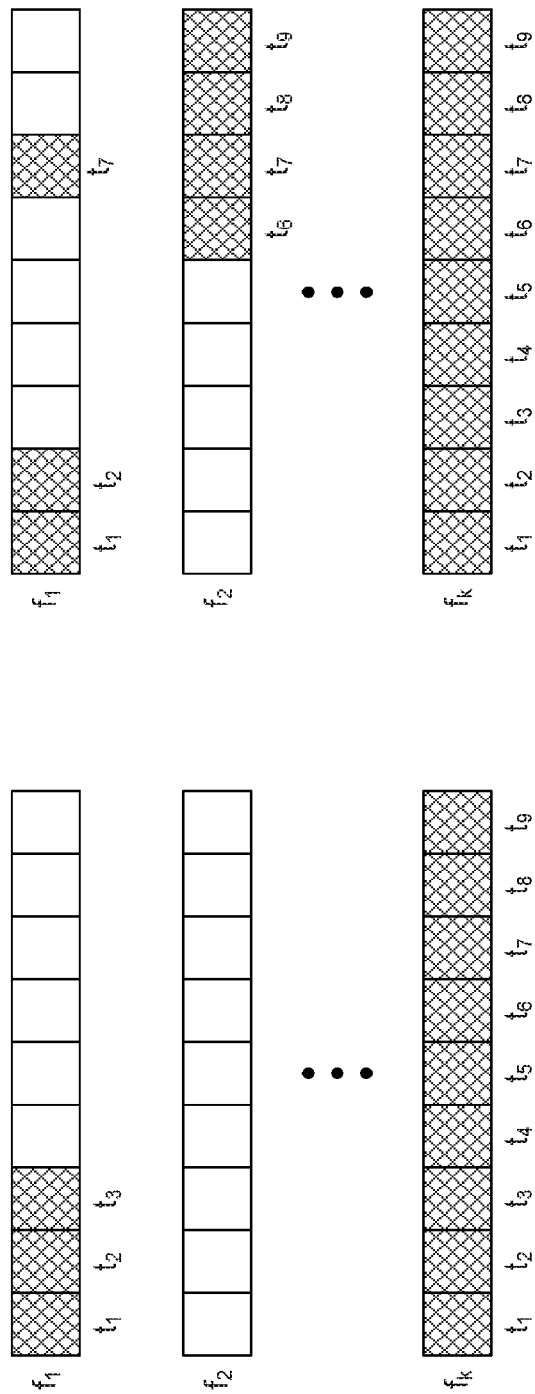

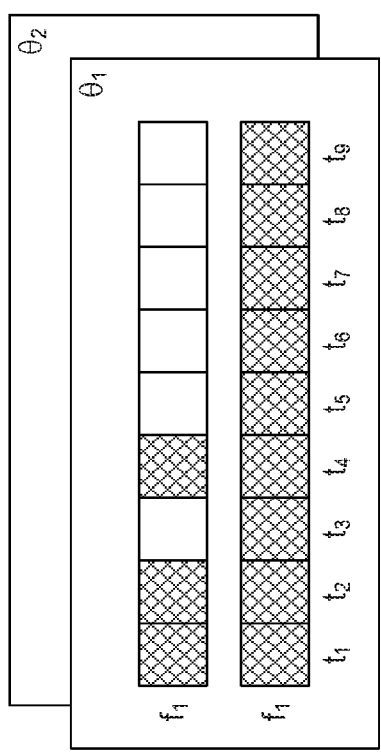
FIG. 35A
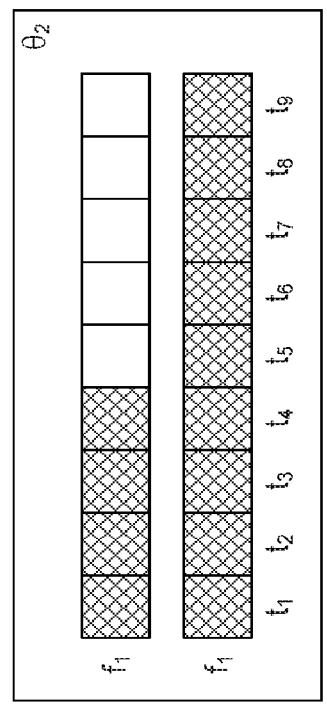
FIG. 35B
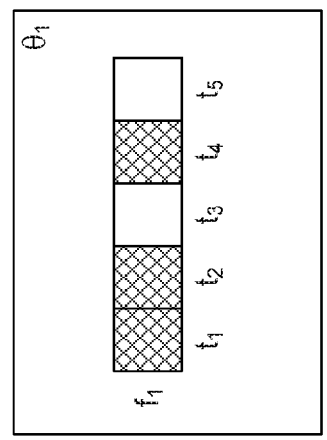

FIG. 37A
FIG. 37B
FIG. 37C
FIG. 37D

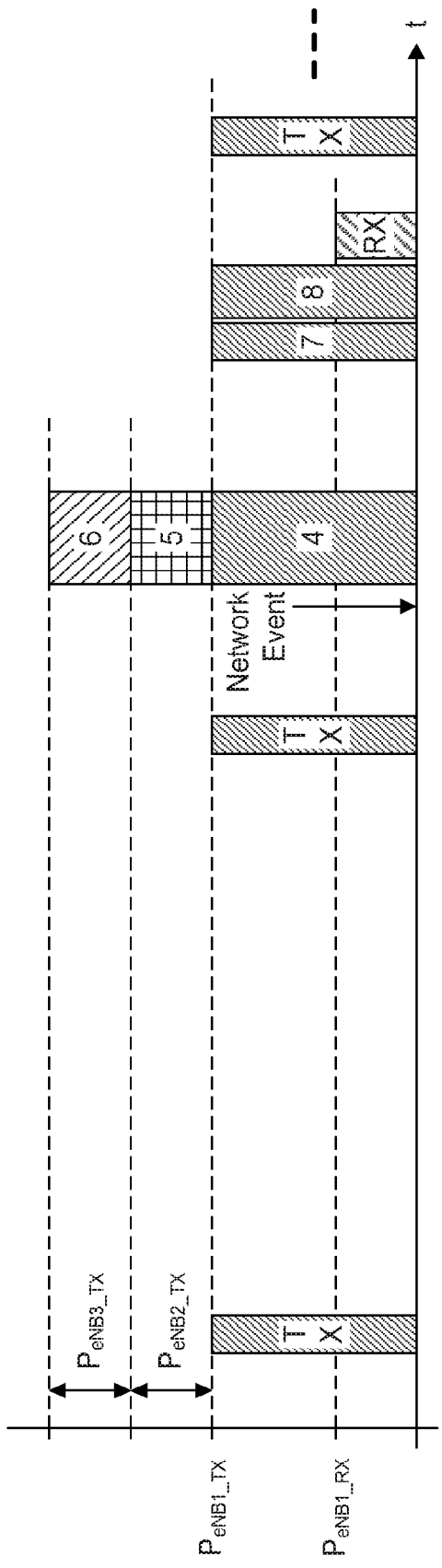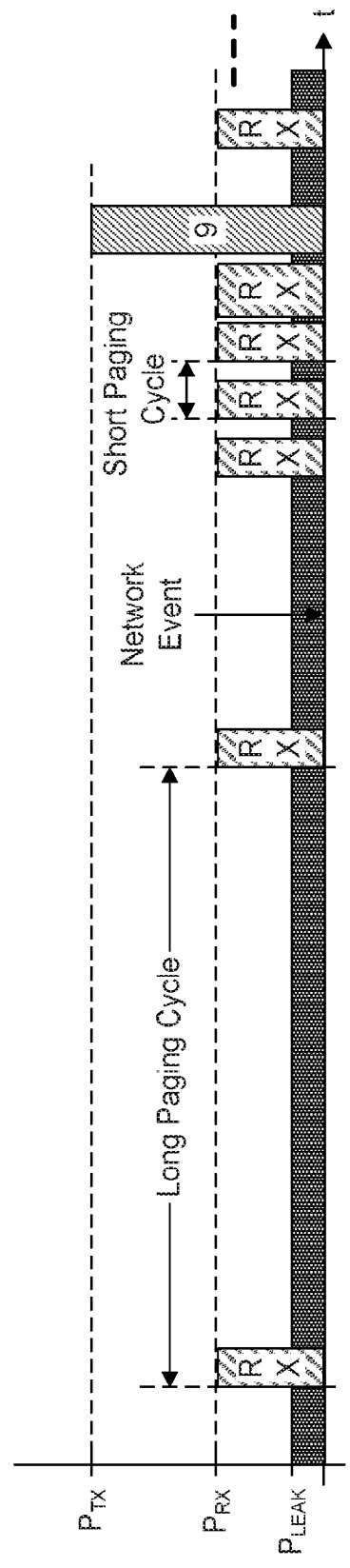
FIG. 43A
FIG. 43B

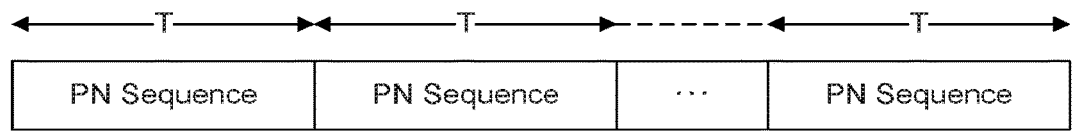
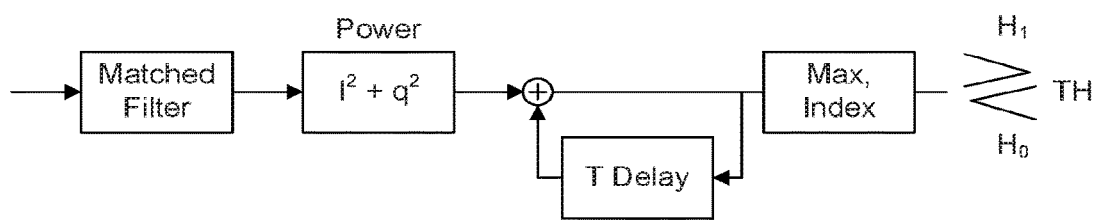
FIG. 46
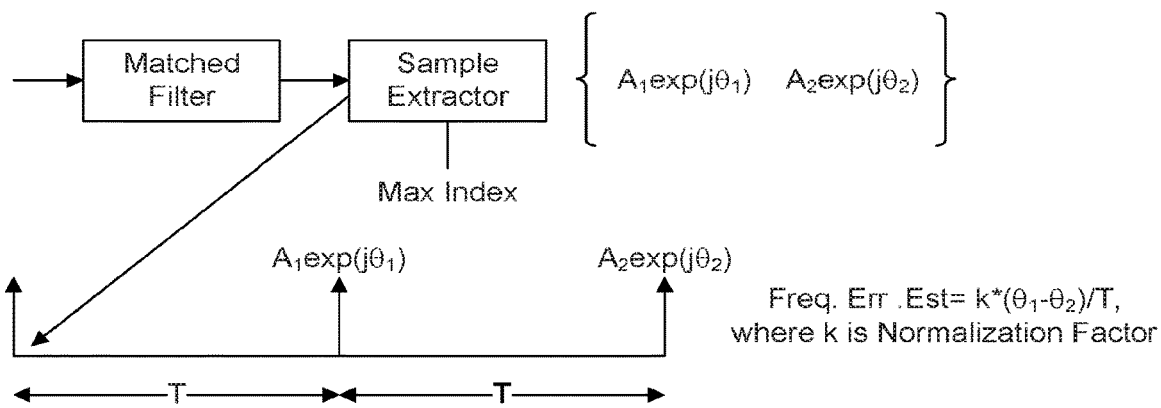
FIG. 47

NETWORK INITIATED ON-DEMAND ZERO-ENERGY PAGING METHOD AND APPARATUS

CROSS REFERENCE TO RELATED APPLICATIONS

This application is a continuation of U.S. patent application Ser. No. 16/768,129, filed May 29, 2020, which is the U.S. National Stage, under 35 U.S.C. § 371, of International Application No. of PCT/US2018/063320 filed Nov. 30, 2018, which claims the benefit of U.S. Provisional Application No. 62/593,631 filed on Dec. 1, 2017, the contents of which are hereby incorporated by reference herein.

BACKGROUND

Advances in technology and connectivity for devices (e.g., mobile devices, appliances, consumer goods, wearables, automation devices, servers, notes, transmitters, receivers, etc.) have led these devices to benefit from network connectivity. Emerging application areas that drive this need include smart cities, smart homes, smart energy grids, mobile-health devices, vehicle telematics, automated agriculture, asset tracking, environmental monitoring, industrial monitoring, and infrastructure monitoring. In many emerging applications, energy efficiency is a key requirement as it is desirable to maximize the battery life of connected network devices.

SUMMARY

A wireless transmit/receive unit (WTRU) may include one or more antennas and a first transceiver operatively coupled to the one or more antennas. The one or more antennas and the first transceiver may be configured to receive a first signal from a network using zero energy from the WTRU. The one or more antennas and the first transceiver may be further configured to extract energy from the first signal. The first transceiver may be further configured to examine a separation in time between energy threshold events to decode an energy signature of the first signal. The first transceiver may be further configured to activate a second transceiver operatively coupled to the one or more antennas if the decoded energy signature matches a stored energy signature, wherein the second transceiver is powered by the WTRU. The one or more antennas and the second transceiver may be configured to receive a second signal from the network.

A wireless transmit/receive unit (WTRU) may include one or more antennas and a first transceiver operatively coupled to the one or more antennas. The one or more antennas and the first transceiver may be configured to receive a first signal from a network using zero energy of the WTRU. The one or more antennas and the first transceiver may be further configured to extract energy from the first signal. The first transceiver may be further configured to examine a separation in time between energy threshold events to decode an energy signature of the first signal. The energy threshold events may be generated by determining that an amount of the extracted energy stored in a temporary storage element exceeds a threshold. The separation in time between energy threshold events may be based on one or more of a capacity of the temporary storage element and a configured value of the threshold. The first transceiver may be further configured to convert the energy threshold events to a digital signal by transferring the extracted energy from a temporary storage element to a permanent storage element. The first transceiver may be further configured to activate a second transceiver operatively coupled to the one or more antennas if the decoded energy signature matches a stored energy signature. The second transceiver may be powered by the WTRU. The one or more antennas and the second transceiver may be configured to receive a second signal from the network.

A method for use in a wireless transmit/receive unit (WTRU) may include receiving a first signal from a network using a first transceiver. The first transceiver may use zero energy from the WTRU. Energy may be extracted from the first signal. A separation in time between energy threshold events may be examined to decode an energy signature of the first signal. A second transceiver operatively coupled to the one or more antennas may be activated if the decoded energy signature matches a stored energy signature. The second transceiver may be powered by the WTRU. A second signal may be received from the network using the second transceiver powered by the WTRU.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 34A shows a word employing a (⅗, f1) and a (1, fk) frequency-time resource combination;

FIG. 34B shows a {(⅗, f1), (⅘, f2), (1, fk)} word;

FIG. 35A shows a word employing an identical combination of time and frequency resources (⅗, $f_1$) and (1, $f_2$) on two different angle resources $\theta_1$ and $\theta_2$;

FIG. 35B shows a [{$\theta_1$, (⅗, $f_1$)}, {$\theta_2$, (⅘, $f_1$), (1, $f_2$)}] word;

FIG. 37A shows a first quantization level of a word that employs a single angle resource, a single frequency resource, and 8 time resources;

FIG. 37B shows a second quantization level of a word that employs a single angle resource, a single frequency resource, and 8 time resources;

FIG. 37C shows a third quantization level of a word that employs a single angle resource, a single frequency resource, and 8 time resources;

FIG. 37D shows a fourth quantization level of a word that employs a single angle resource, a single frequency resource, and 8 time resources;

FIG. 43A shows eNodeB power profile and signals;

FIG. 43B shows device power profiles and signals;

FIG. 46 is a diagram showing a detection procedure example;

FIG. 47 is a diagram showing a frequency offset estimator;

DETAILED DESCRIPTION

Figure 1A:
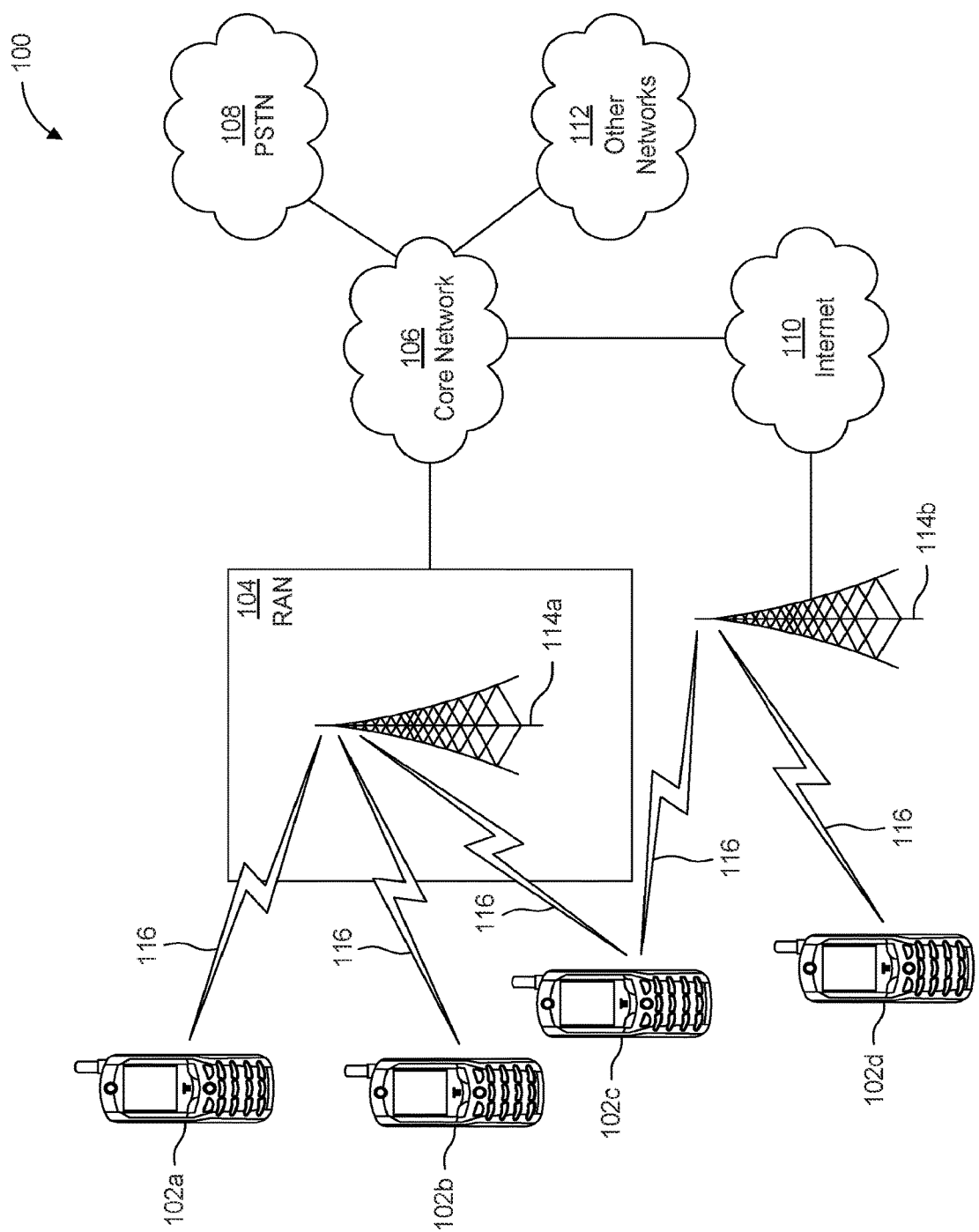
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
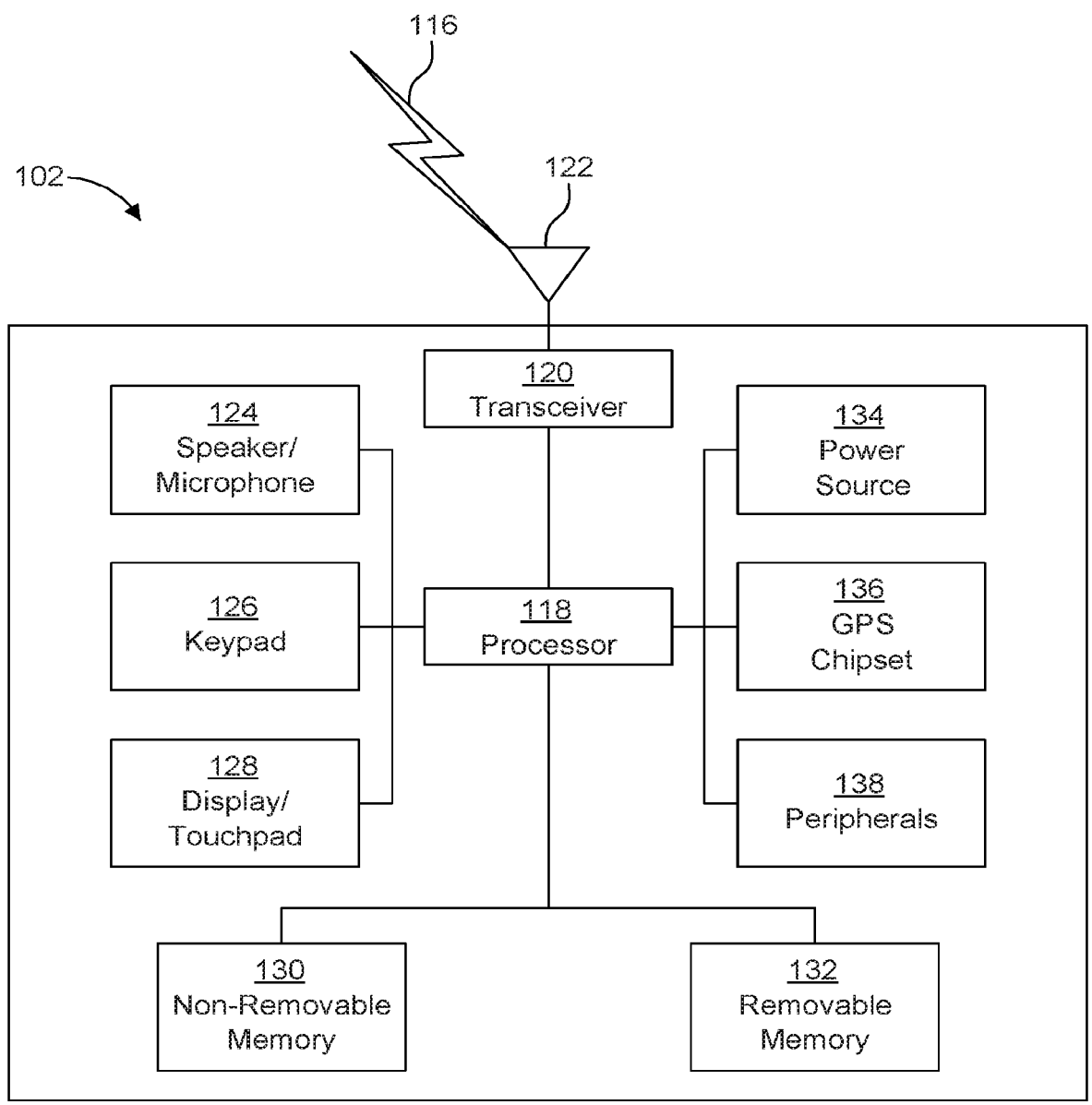
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
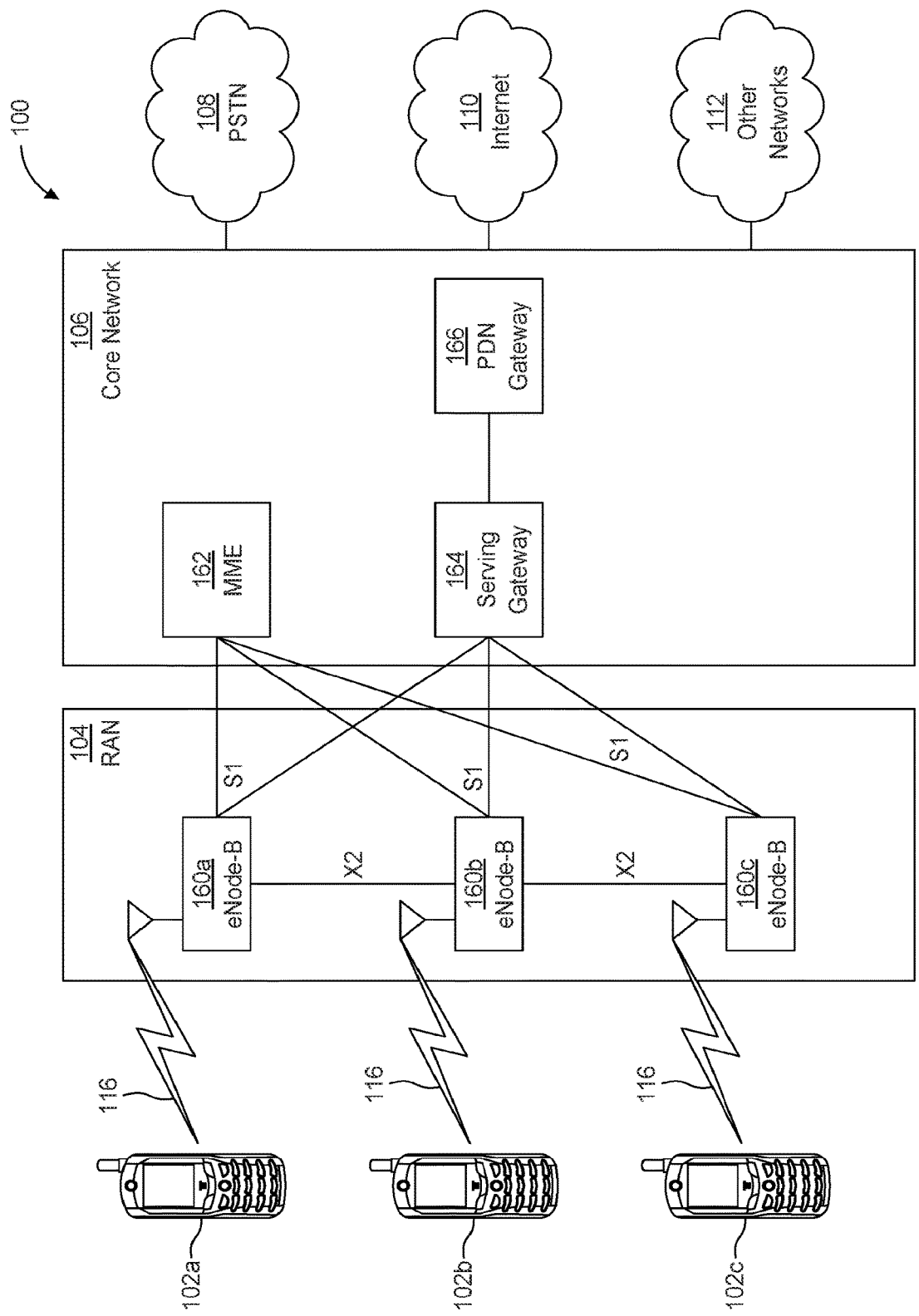
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
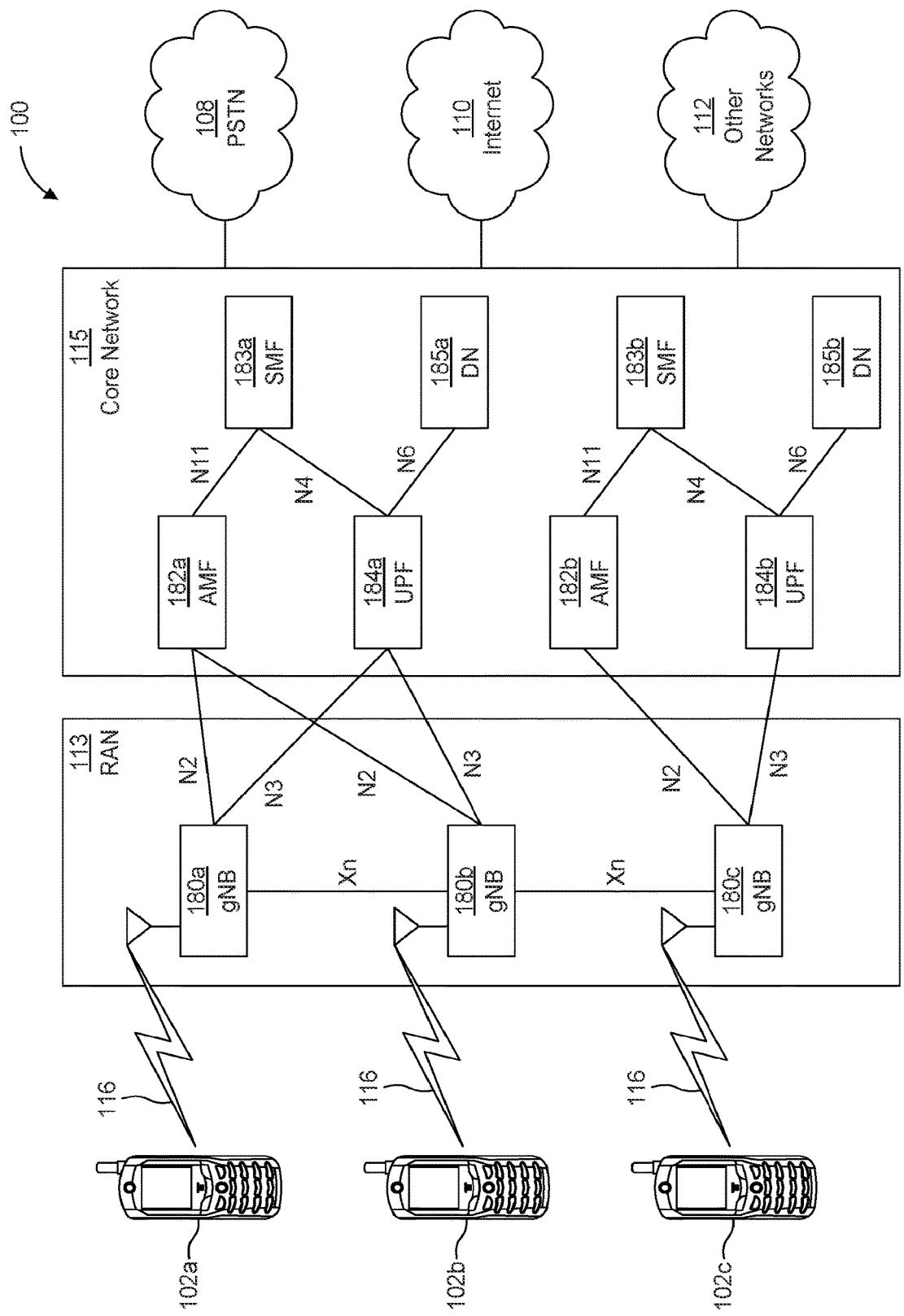
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
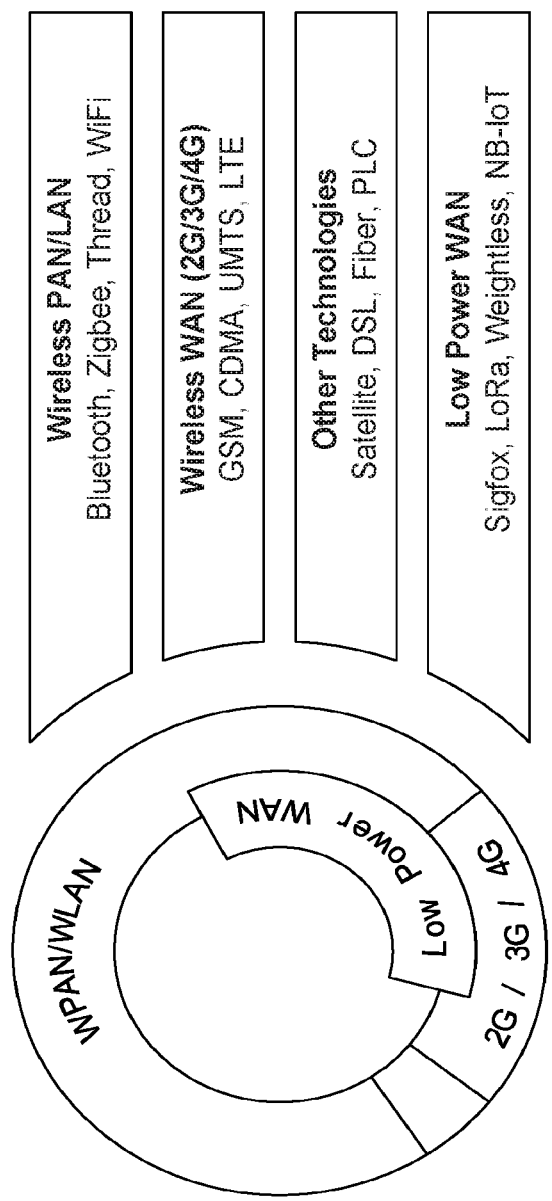
FIG. 2 is a diagram illustrating various approaches for connecting a large number of devices to the internet.

Referring now to FIG. 2, a diagram illustrating various approaches for connecting a large number of devices to the internet. As shown, a device may be connected to the internet through one or more access technologies, including but not limited to, wireless personal area network/local area network (PAN/LAN), a wireless wide area network (WAN), a low power WAN, or other technologies.

Energy efficiency may be a key requirement for these devices. For example, in internet of things (IoT) applications, it may be desirable to maximize the battery life of devices. Table 1 shows a number of conventional approaches for reducing device cost and complexity as well as reducing the device power consumption in IoT applications.

DRX mode, the device powers down most of its circuitry (e.g., RF transceiver, modem, applications processor, etc.) when there are no packets to be transmitted or received. A slow reference clock and a minimal amount of circuitry is kept active so that the WTRU can periodically wakeup and listen to the downlink for pages. This type of scheduled approach is broadly known as duty cycling.

Figure 3:
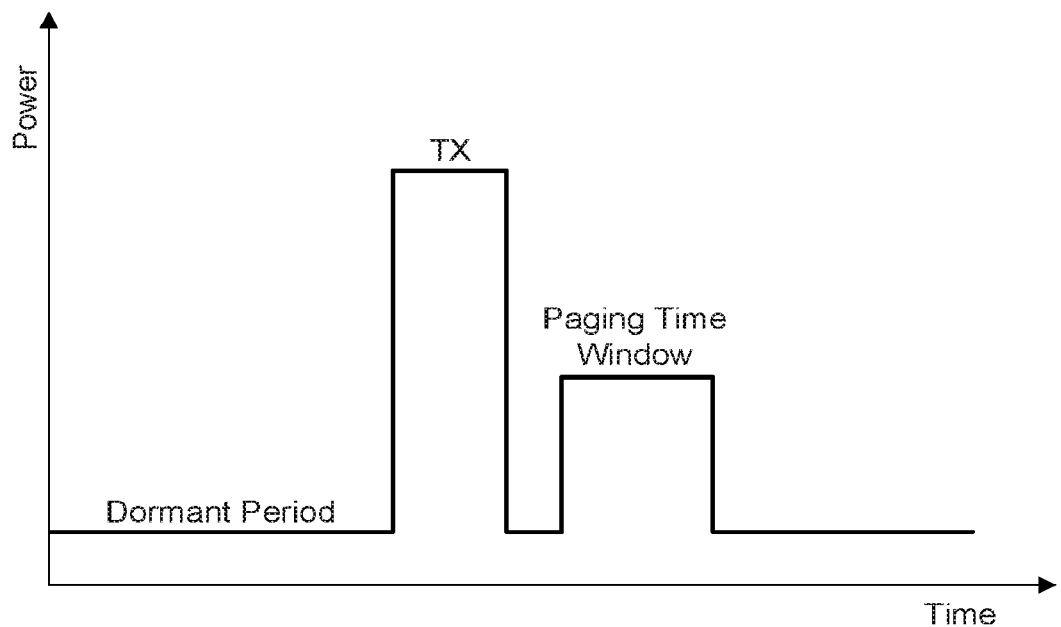
FIG. 3 is a diagram illustrating Power Save Mode (PSM)

Referring now to FIG. 3, a diagram illustrating PSM is shown. When operating with PSM, a WTRU may be registered to the network, though the WTRU may be considered to be switched off and power consumption may be minimal as it is may be in a deep sleep while in this state. PSM may be targeted for mobile originated use cases, where the WTRU may wake up from PSM when it has data to transmit. When a WTRU wakes up from PSM, it may perform a tracking area update (TAU), and may remain reachable only for a short duration of time (in idle) before it goes back to sleep. This process is shown in FIG. 3 where the WTRU is in a Dormant Period with very low power output. A Tx activity may result in a power spike followed by a paging time window before returning to a Dormant Period. Accordingly, in PSM mode, the network may not be able to reach the WTRU at a time of its choosing, as the WTRU may be in receive mode only for a short period. There may be two periods where a WTRU in PSM negotiates with the network. When a WTRU performs an 'Attach Request' or 'TAU request', the WTRU may include the following information elements (IE): T3324 for monitoring paging and T3412 for the extended periodic TAU update (i.e., inactivity timer as shown as Dormant Period). If the network supports PSM, it may provide the resulting values of T3324 and T3412 in 'Attach Accept' or 'TAU accept'. After the expiry of T3412, the WTRU may perform TAU procedures.

Figure 4:
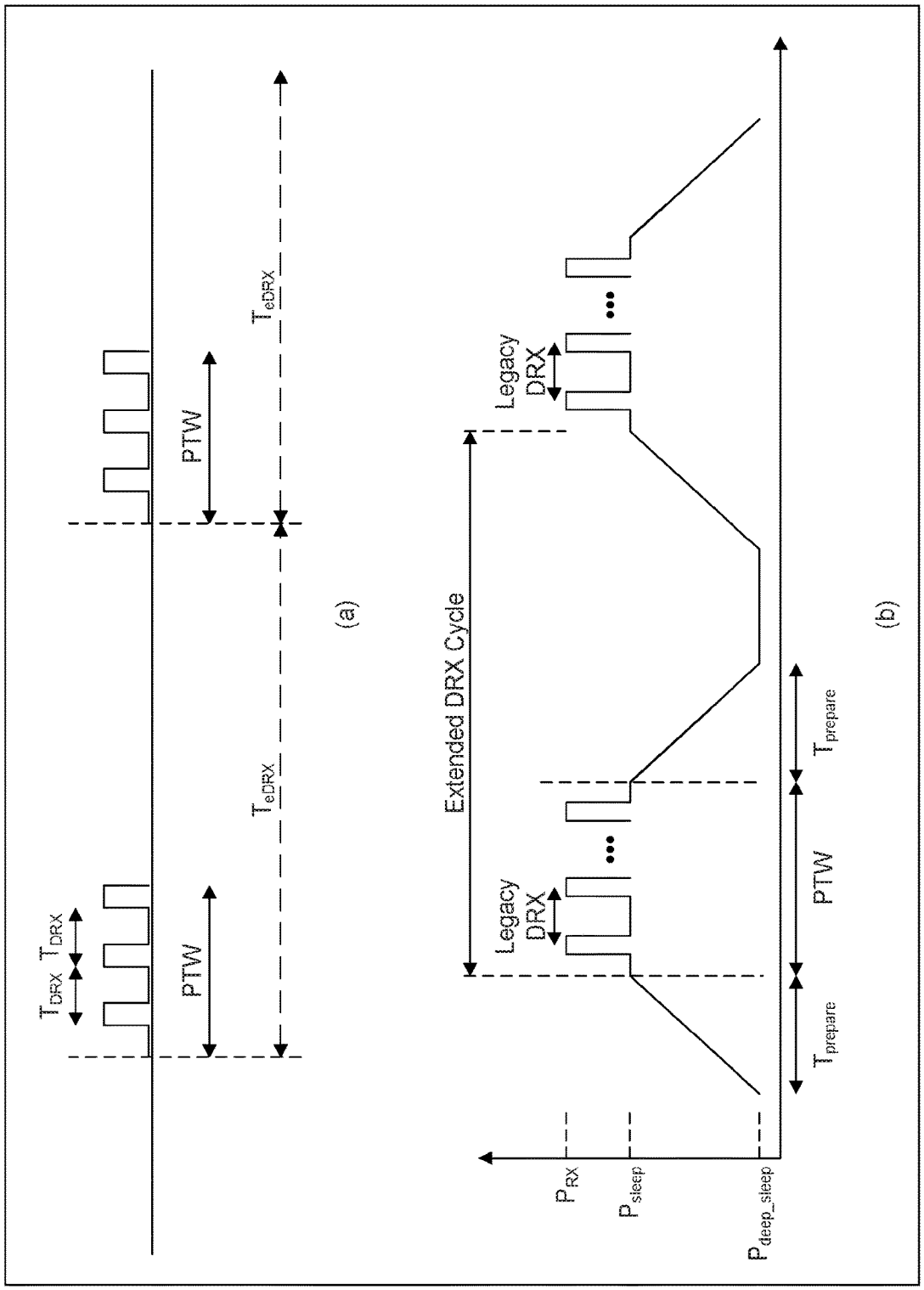
FIG. 4 is a diagram illustrating discontinuous reception (DRX) cycles.

Referring now to FIG. 4, a diagram illustrating DRX cycles is shown. eDRX may be more suited for mobile terminated scenarios. In DRX/eDRX, the WTRU may not generate unnecessary signaling such as the TAU procedures in PSM mode. However the WTRU may need to wake-up during paging transmission windows (PTW) durations to monitor the control channel. The frequency of waking up for PTW duration may determine the efficiency of eDRX. For example, eDRX may be configured for as long as 43.69 min

TABLE 1

Approaches for Extending Battery Life in IoT Devices

| | LTE- Cat 1 | LTE- Cat 0 | LTE- Cat M1 | NB-IoT (Cat-NB) |
|---|---|---|---|---|
| Deployment | In-band LTE | In-band LTE | In-band LTE | In-band LTE Guard-Band LTE Standalone |
| Downlink | OFDMA [15 kHz] | OFDMA [15 kHz] | OFDMA [15 kHz] | OFDMA [15 kHz] |
| Uplink | SC-FDMA [15 kHz] | SC-FDMA [15 kHz] | SC-FDMA [15 kHz] | Single Tone [15/3.75 kHz] |
| Peak Rate | DL: 10 Mbps UL: 5 Mbps | DL: 1 Mbps UL: 1 Mbps | DL: 1 Mbps UL: 1 Mbps | DL: 250 kbps UL: 20 kbps |
| Receiver BW | 20 MHz | 20 MHz | 1.4 MHz | 200 kHz |
| Duplex Mode | Full-Duplex | Half-Duplex | Half-Duplex | Half-Duplex |
| Max Transmit Power | 23 dBm | 23 dBm | 23 or 20 dBm | 23 or 20 dBm |
| Power Saving | PSM, eDRX | PSM, eDRX | PSM, eDRX | PSM, eDRX |

Two energy-efficient technologies developed in LTE include: Power Save Mode (PSM) introduced in Release 12, and the extended DRX (eDRX) cycle introduced in Release 13. While PSM can extend the device battery life significantly, a disadvantage of the PSM technology is that the respective device is not reachable while in PSM mode. In idle mode, while for connected mode it may be 10.24 seconds. For DRX, the maximum time period may be 2.56 seconds. The difference between eDRX and DRX may be significant not only due to the duration for which the device circuitry is switched off, but also the actual power that is allocated during the DRX/eDRX cycles.

In legacy DRX, the power of the circuitry may be maintained at $P_{sleep}$, which may be much higher than the power used when the device is at eDRX, $P_{deep\_sleep}$ However to transition to PTW from eDRX (or vice versa), there may be a ramp up/ramp down time of $T_{prepare}$ required. Since there is latency involved in switching between the PTW and eDRX, there may be a need for longer time durations of the eDRX cycles. In order to take full advantage of power savings in deep sleep state, the eDRX cycle duration may be large while PTW duration may be small. However, this may increase the latency in reaching the WTRU. Hence an optimal value of PTW and eDRX time duration may need to be designed based on the latency-power trade off.

Figure 5:
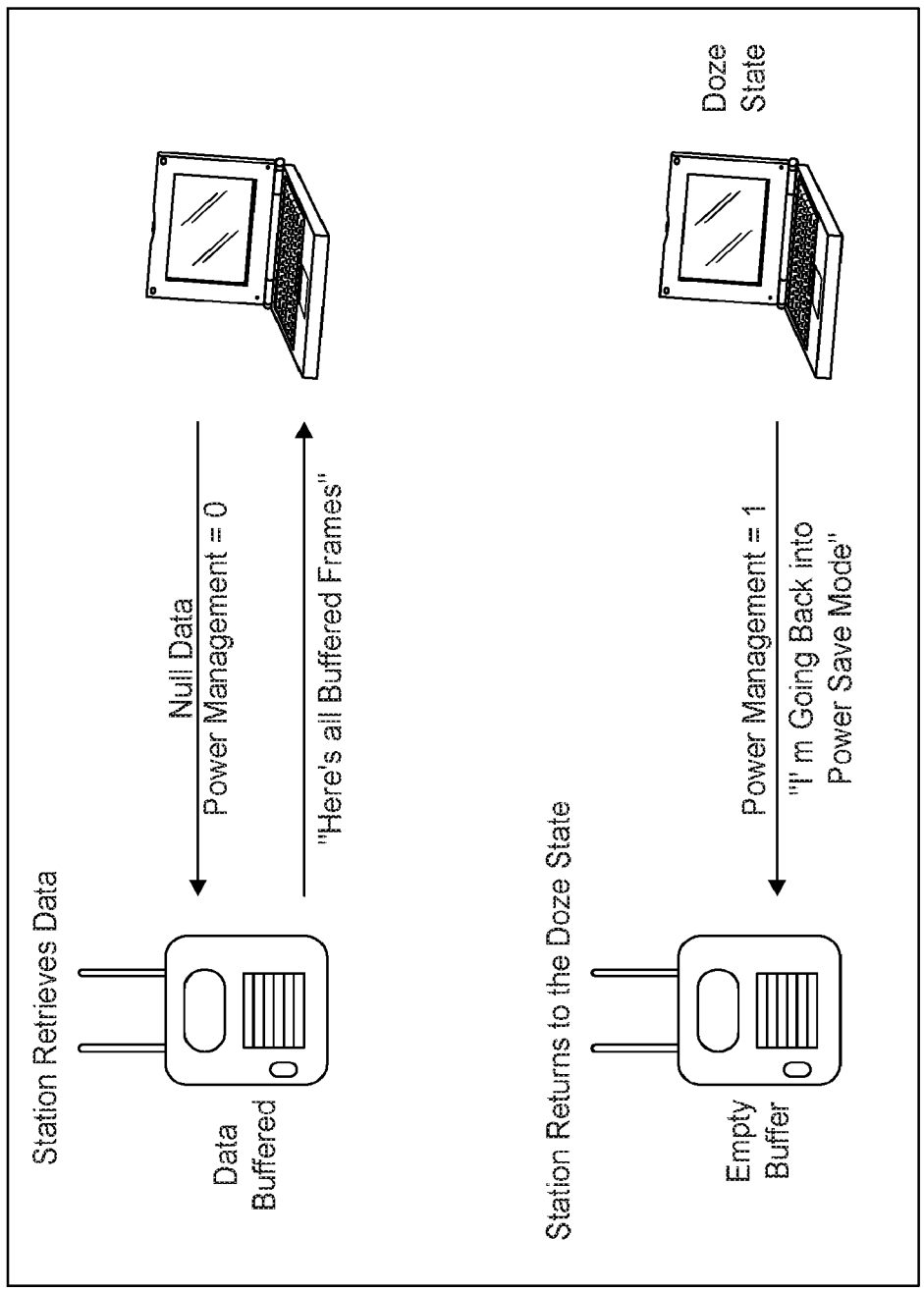
FIG. 5 is a diagram illustrating a PSM that may be used in conventional IEEE 802.11 systems to help stations conserve power.

Referring now to FIG. 5, a diagram illustrating a PSM that may be used in conventional IEEE 802.11 systems to help stations conserve power. When entering a doze (or sleep) state, a station (STA) may send a NULL frame with a Power Management Bit set to 1, and thereafter may go into the doze state. An AP may buffer packets addressed to the STA in PSM. The AP may notify (e.g., in its beacon message) the stations that are in PSM for which it has buffered packets through a Traffic Information Map (TIM) information element.

The STA in PSM may read this information from the beacon. To undertake this step, the STA may need to wake-up every beacon interval, which can be roughly 102 microseconds. Alternately, the STA may wake-up in multiples of beacon time periods. This can occur when a buffered broadcast/multicast packet is to be delivered to an STA (in PSM) through which the AP indicates to the STA, through Delivery TIM (DTIM), that occur in multiples of beacon time periods. The DTIM may also be part of a beacon frame. However, the DTIM may be provided once over multiple beacons, and may also indicate that the frame following the DTIM has the broadcast/multicast data.

To retrieve the buffered packets, the STA may send a power save-poll (PS-POLL) to the AP requesting the AP to send the buffered packets. The AP may transmit the buffered packets to the STA with More Data Bit set to 1 so that the STA can remain in an awake state until it receives all the buffered packets. When the More Data Bit is set to 0, the STA may go back to the doze state.

The process outlined above may require that for every frame buffered by the AP, the STA needs to send a PS-POLL to obtain the frame. Additionally, when there are several STAs and when the AP buffers a large amount of data for several stations, there may be many PS-POLLS requested by the STA at the same time instant, which can result in increased collision.

In unscheduled automatic power save delivery mode (U-APSD), the procedure for getting entering the doze state may be similar to the legacy IEEE 802.11 PSM. However, a UL transmission (or a null data frame) from the STA may be taken as an indicator by the AP that the STA is awake and thereby negotiates the data transfer process, as shown in FIG. 5.

Figure 6:
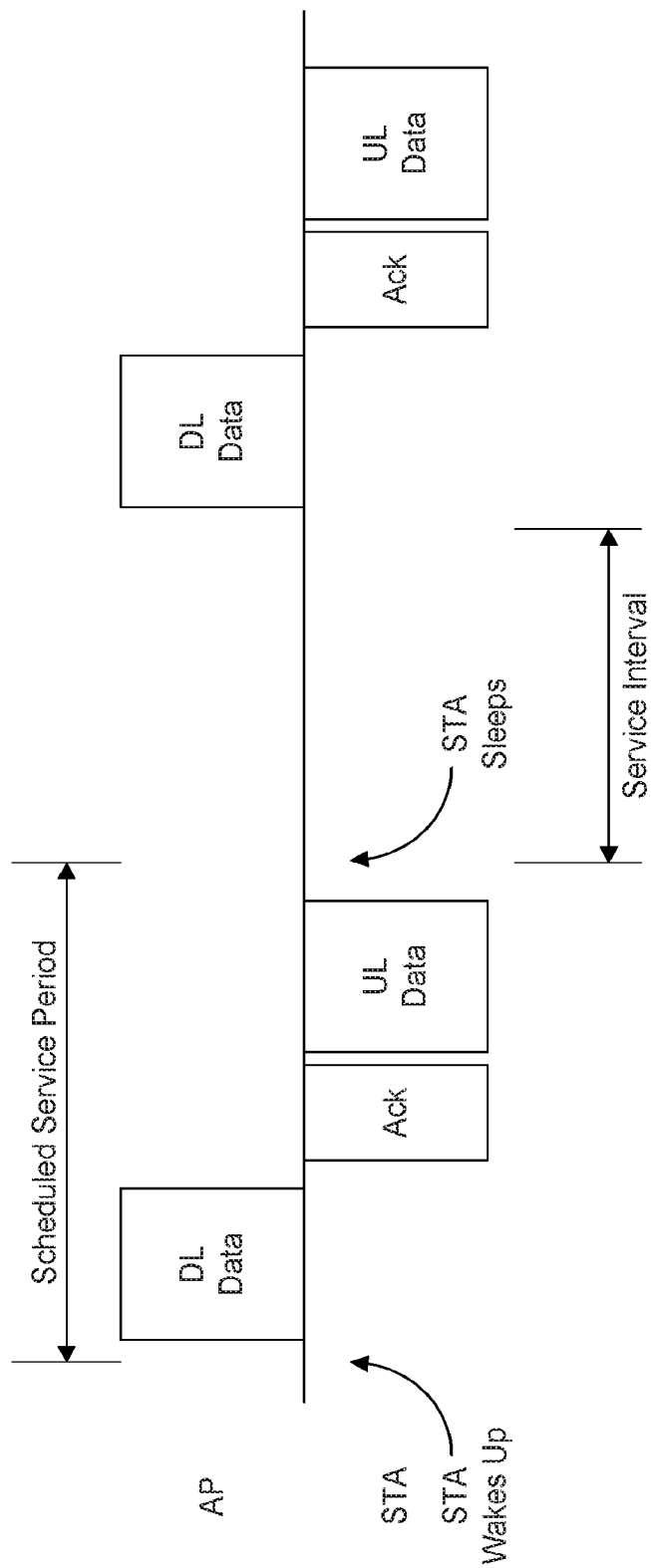
FIG. 6 is a diagram illustrating scheduled automatic power save delivery (S-APSD)

Referring now to FIG. 6, a diagram illustrating scheduled automatic power save delivery (S-APSD) is shown. In S-APSD, the STA may negotiate with the AP on the scheduled service interval (SSI) and the time duration between consecutive SSI. S-APSD may be suited for cases where the traffic patterns are deterministic and a pattern is followed in which STA may take advantage of the deterministic pattern and may conserve power.

Figure 7:
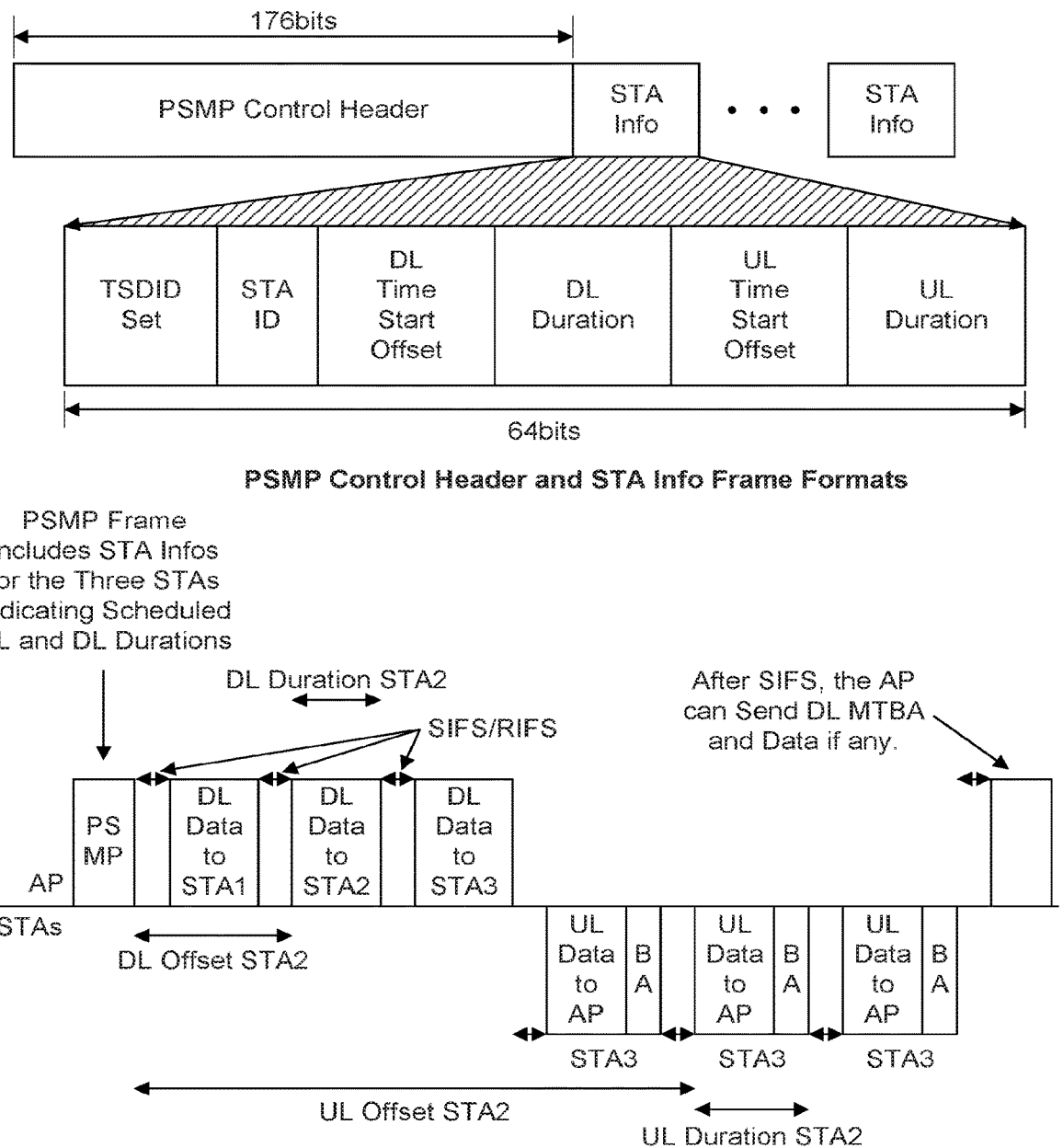
FIG. 7 is a diagram illustrating power save multi-poll (PSMP) delivery.

Referring now to FIG. 7, a diagram illustrating power save multi-poll (PSMP) delivery is shown. PSMP is another scheduled power save mode, where the schedule is performed by the AP with multiple stations. As with the S-APSD mode, traffic patterns may need to be deterministic to leverage PSMP for saving power. In wireless network management (WNM)-sleep mode, the STA may request permission to enter the sleep mode. In order to receive group addressed traffic, an STA may optionally indicate the actual wake-up time in a 'WNM-Sleep-Interval' field in the WNM-Sleep mode request frame.

In spatial multiplexing (SM) power save mode, an STA may operate with one receive chain throughout a session to save power (also referred to as static SM power save mode), or may have one receive chain active to detect data intended for receipt. If such data is detected, one or more receive chains may be switched to active (e.g., a dynamic SM power save mode).

Figure 8:
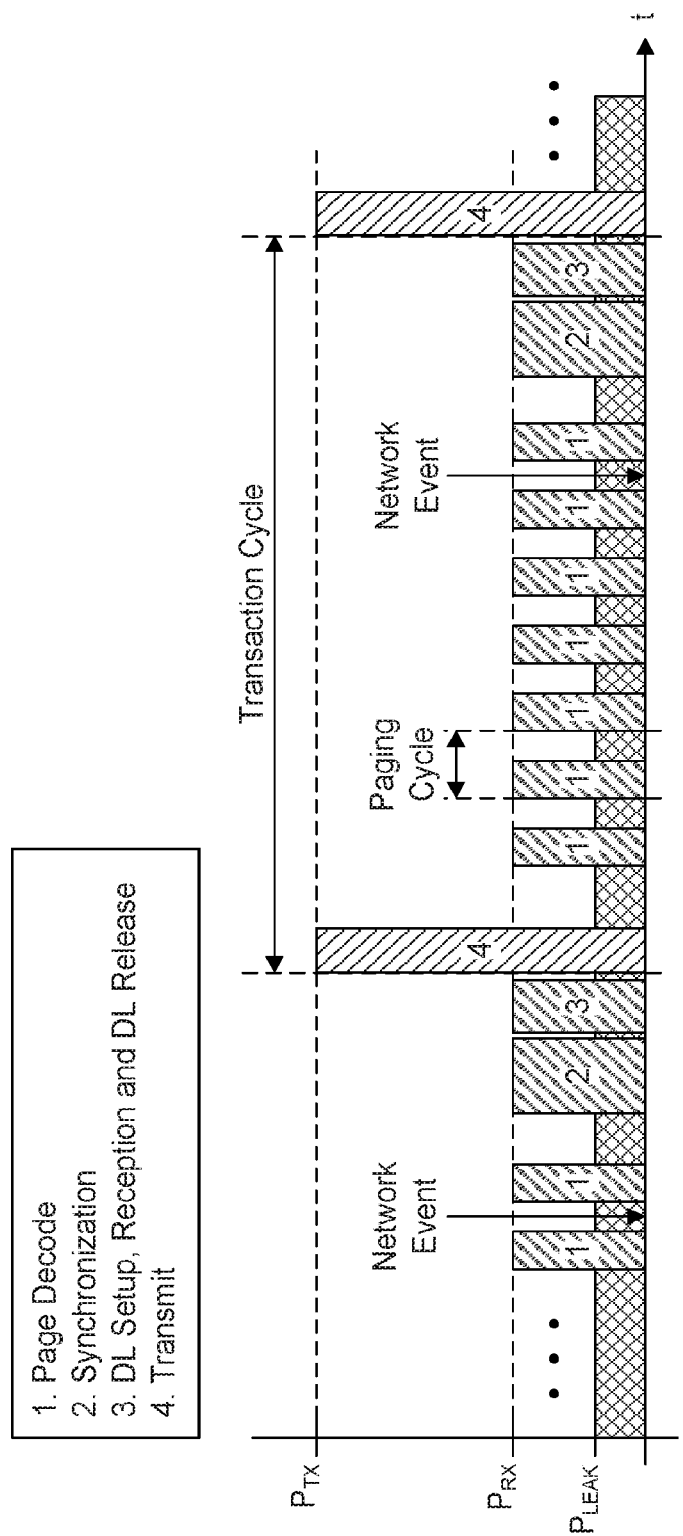
FIG. 8 is a diagram illustrating a device power profile in LTE DRX.

Referring now to FIG. 8, a diagram illustrating a device power profile in LTE DRX mode is shown. FIG. 8 may show the power profile and signaling activity of a duty cycled device. The device may be in one of two modes—active or sleep. When active, the device may consume $P_{TX}$ in transmit mode and $P_{RX}$ in receive mode. When in sleep mode, the device power may be dominated by the leakage power $P_{LEAK}$ of its various active components. The device battery lifetime may depend primarily on how often the unit transmits, and the size of the battery.

Figure 9B:
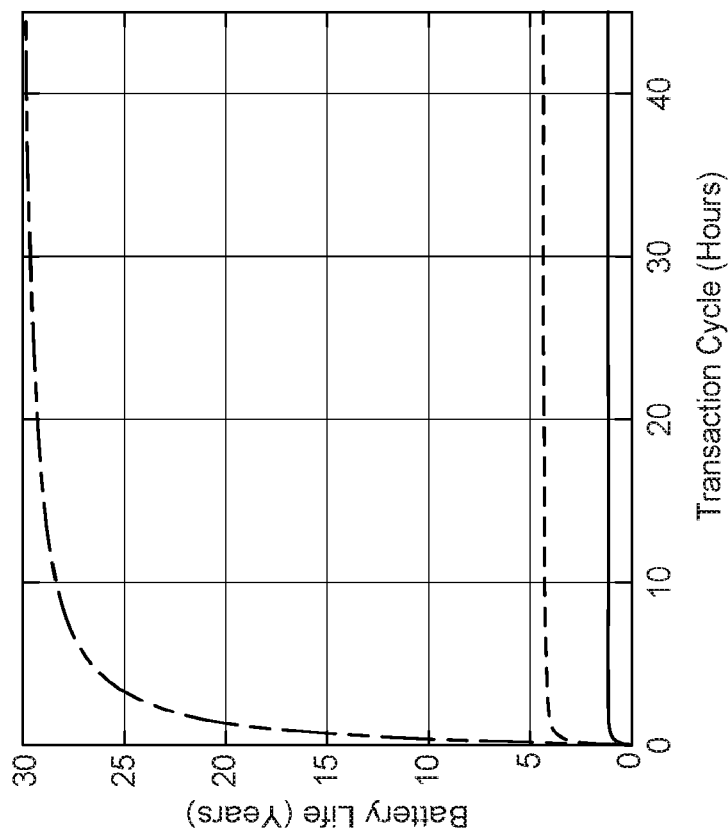
FIG. 9B is diagram illustrating battery life of a MTC device shows that a 45 hour paging and transaction cycle may be required to achieve a 30 year battery life if the leakage power is assumed to be 8 ρW.
Figure 9A:
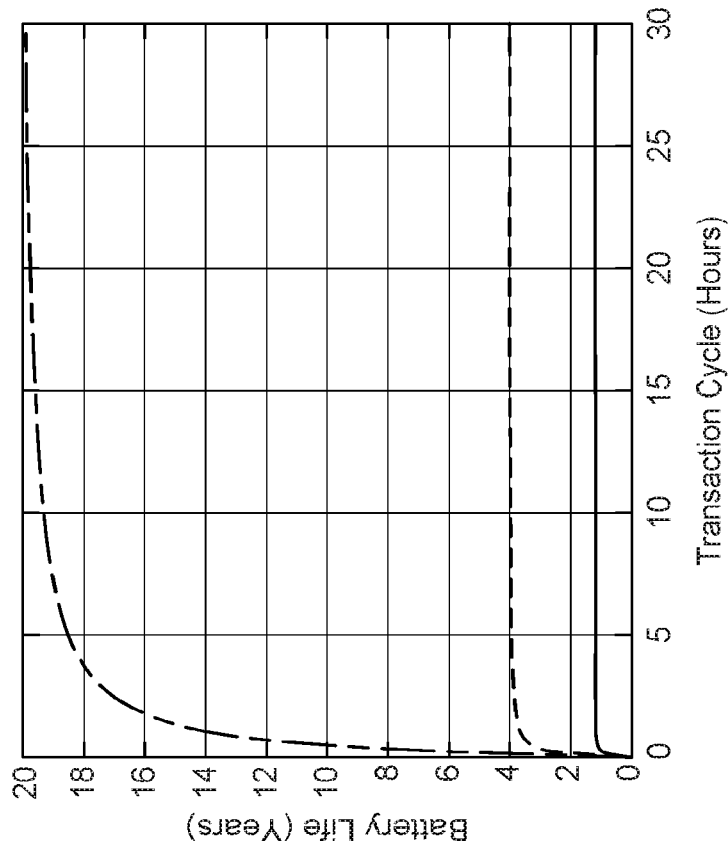
FIG. 9A is diagram illustrating a 30 year battery life of a machine type communication (MTC) device achieved with 8 ρW leakage power and 45 hour paging cycle.

Referring now to FIGS. 9A-9B, diagrams illustrating battery life of an MTC device with different paging cycles are shown. FIG. 9A shows a 20 year battery life achieved with 12 μW leakage power and 30 hour paging cycle. FIG. 9A shows a 30 year battery life achieved with 8 μW leakage power and 45 hour paging cycle.

Depending on the WTRUs transaction cycle (i.e., the average frequency at which the WTRU transmits data to the network), duty cycling has been shown to extend the battery life of, for example, an MTC device to roughly 4 years. The results summarized in FIGS. 9A-9B may be for an example device located at the cell edge and powered by two (e.g., 1.2 V and 2.1 A) lithium AA-cell batteries. As shown in FIG. 9A, the leakage power of the device in sleep mode may be assumed to be 12 μW. The battery life of an MTC device that transmits data infrequently (e.g., transaction cycle of one hour or longer) may be limited by the paging cycle. The maximum battery life for a paging cycle of 2.56 seconds may be approximately 1 year. If the paging cycle is extended to 10.24 seconds, the maximum achievable battery life may be approximately 4 years.

FIG. 9A also illustrates that a very long paging cycle and a transaction cycle of approximately 30 hours may be required to achieve a 20 year battery life employing scheduling based network paging. In this example, the device battery life may be limited by the power dissipated in the slow reference clock and the leakage current of the various active electronic components in the device. Accordingly, an LTE MTC device in DRX mode may receive at most one page every 30 hours and send data back to the network at most once every 30 hours in order to achieve a 20 year battery life.

FIG. 9B shows that a 45 hour paging and transaction cycle may be required to achieve a 30 year battery life if the leakage power is assumed to be 8 μW. This may result in very long latency that may not be suitable for many existing and emerging applications.

SigFox™ and LoRa™ are examples of proprietary low power and long range IoT solutions. If the number of transmissions is limited, the battery lifetime of a SigFox™ module may be very long. If the unit is used to transmit very seldom alarms, only a daily keep-alive message is transmitted, and one command message per day is received, then the battery lifetime may be more than 10 years using three (e.g., 1.2 V and 2.1 A) lithium AA-cell batteries. The lifetime may be 6 years using three (e.g., 1.2 V and 2.1 A) lithium AA-cell batteries transmitting 10 times per day. LoRa™ devices may achieve similar battery life for the above described SigFox™ operating conditions.

While duty cycling can extend the battery life of WTRUs, there can be an inherent energy-latency tradeoff associated with this type of approach. A longer paging cycle while reducing the energy consumption of the WTRU may result in longer latency (i.e., the delay from when an entity attached to the network generates a packet for the WTRU to when the WTRU wakes up and is ready to receive the packet and respond with data). Alternatively, if the paging cycle is shortened to reduce latency this may in turn shorten the battery life of the WTRU.

There may be many cases where it is desirable to deploy battery operated devices for 20 years or more. It may be infeasible or impossible to service these devices frequently to re-charge or replace the battery. Furthermore, while the average transaction cycle of these devices may be very long, an on-demand (low latency) paging mechanism may be necessary. Therefore, new paging approaches that can break the energy-latency tradeoff associated with duty cycling are desirable.

Wakeup signal sequences including a power optimized waveform for wireless power delivery and a wakeup command employing a unique energy signature are disclosed. Broadcast, multicast or unicast wakeup commands employing a unique energy signature are provided where the unique energy signature may be constructed employing stored-energy threshold event stacking, stored-energy quantizing and/or stored-energy threshold event separation encoding principles.

An end-to-end system employed by the disclosed paging procedures may include an asset management entity, the core network and internet, one or more eNodeBs (eNBs) or access points, one or more facilitators, one or more devices, and a zero-energy RAN interface.

Figure 10A:
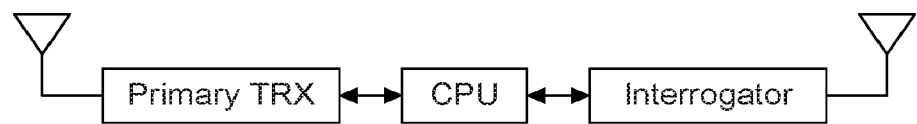
FIG. 10A is a first diagram of a top level architecture of a facilitator and an interrogator.
Figure 10B:
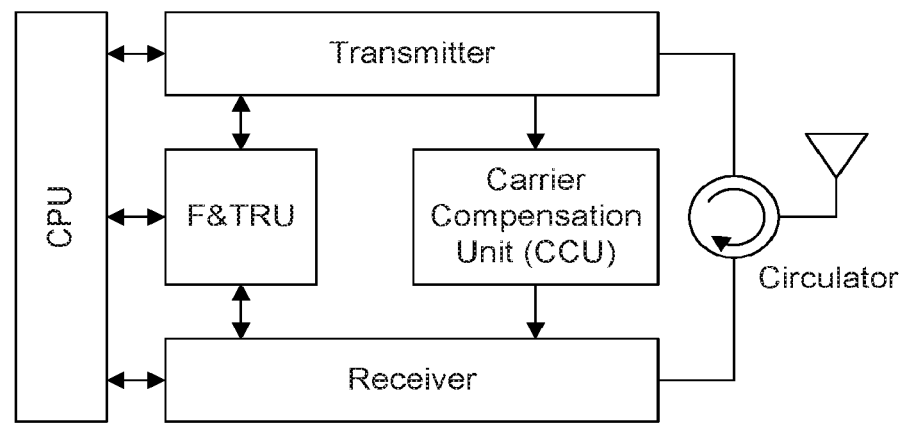
FIG. 10B is a second diagram of a top level architecture of a facilitator and an interrogator.

Referring now to FIGS. 10A-10B, diagrams a top level architecture of a facilitator and an interrogator are shown. The top level architecture of a facilitator may include a primary transceiver (TRX), a processor unit, and an interrogator. The primary transceiver may be used to form one or more wireless interfaces (e.g., Uu and PC5) with base stations, other facilitators, and devices.

The interrogator is used to from zero-energy interfaces with devices equipped with passive transceivers. The interrogator may include a transmitter, a receiver, a carrier compensation unit (CCU), a frequency and time reference unit (FTRU), and a processor. The transmitter and receiver in the interrogator may use a circulator to access the antenna. The interrogator may transmit a sinusoidal pulse and examine a backscattered version of this pulse with its receiver. The CCU may be used for self-interference cancellation. The CCU may cancel a portion of the transmitted signal that leaks into the receiver due to finite isolation between the transmitter and receiver in the interrogator. The interrogator may examine a pseudo-random modulated or criped sinusoid backscattered from a passive device in order to determine the frequency error of the oscillator in the passive device.

Figure 11:
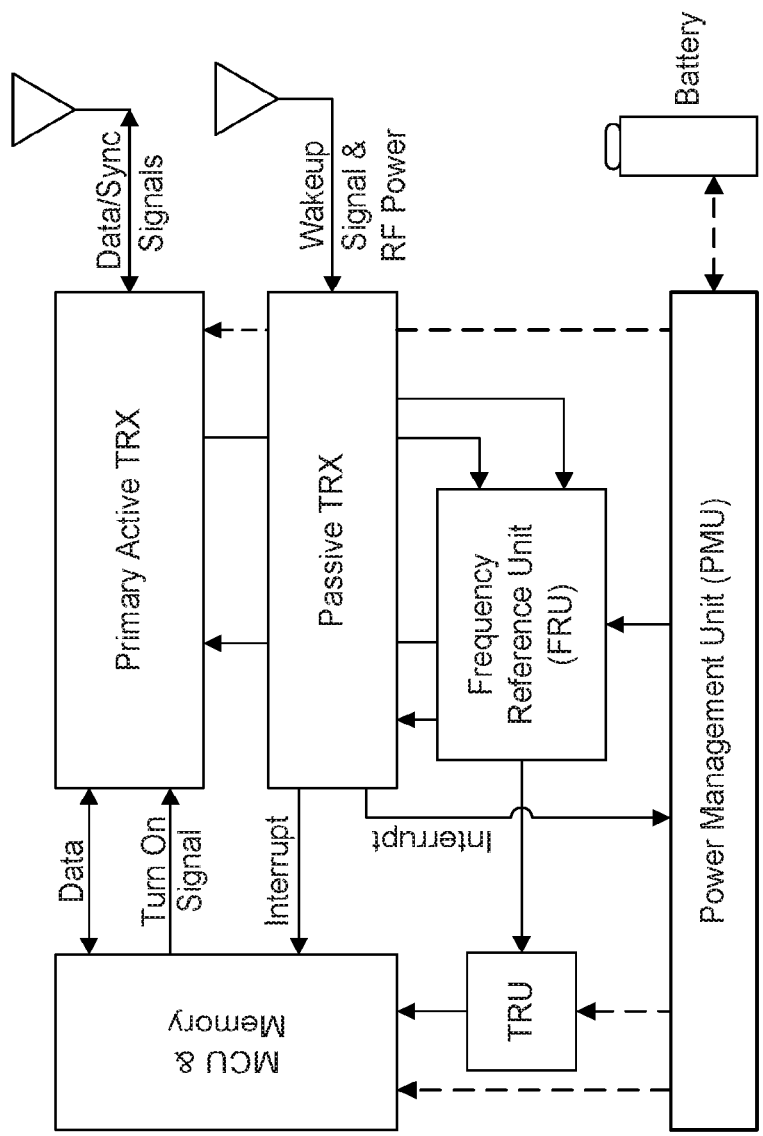
FIG. 11 is a top level radio architecture of a battery operated device.

Referring now to FIG. 11, a top level radio architecture of a battery operated device is shown. The battery operated device may include one or more primary active transceivers, one or more passive transceivers, a microcontroller unit and memory, a frequency reference unit (FRU) and time reference unit (TRU), a power management unit, and a battery.

Figure 12:
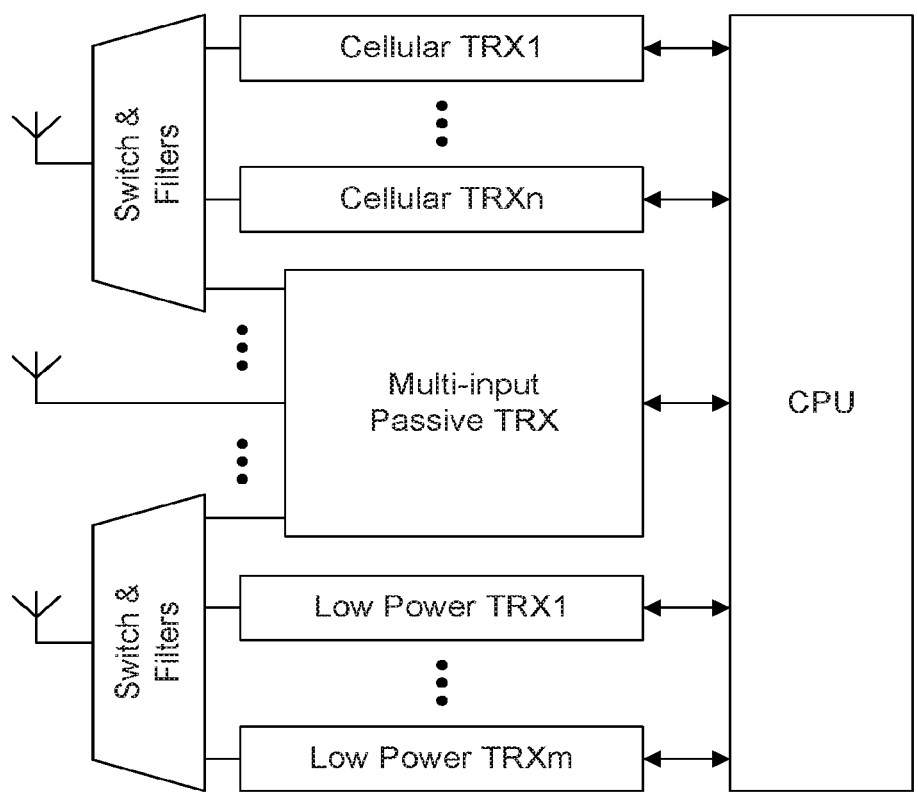
FIG. 12 is a diagram illustrating a top level description of a multi-mode and multi-band device.

Referring now to FIG. 12, diagram illustrating a top level description of a multi-mode and multi-band device is shown. The multi-mode and multi-band device may include a multi-band (n frequency bands) cellular transceiver, several (m) low power short range (e.g., IEEE 802.11, Bluetooth™, ZigBee™, etc.) transceivers and/or multi-input passive transceivers. The passive transceiver may comply with existing standards like near field communication (NFC), radio-frequency identification (RFID), or it may be a proprietary solution. In sleep mode, the device may shut down its cellular and low power transceivers. Alternatively, some or all of the low power transceivers may be left active while the cellular transceivers are shut down in sleep mode.

Figure 13B:
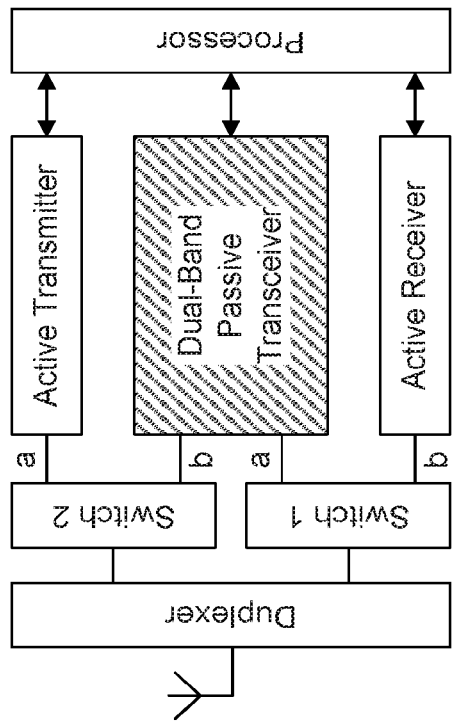
FIG. 13B is a diagram illustrating an FDD device with a dual-band passive transceiver.
Figure 13A:
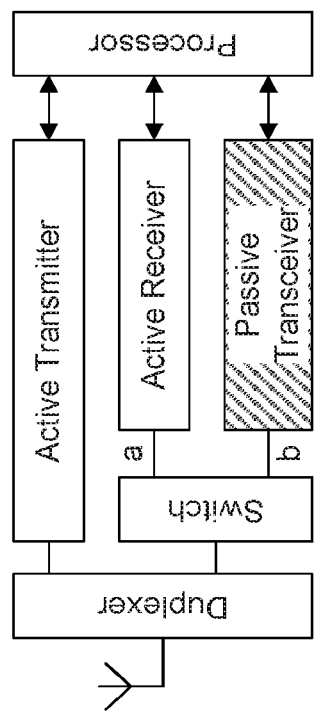
FIG. 13A is a diagram illustrating an FDD device with a single-band passive transceiver.

Referring now to FIG. 13A, a diagram illustrating an FDD device with a single-band passive transceiver that may benefit from the disclosed paging procedures is shown. The FDD device may include a duplexer. The duplexer's receive output may be split in two by a switch. One of the switch outputs may be connected to an active receiver while the other switch output may be connected to a passive transceiver. In sleep mode, the switch output may be left in position b and the active transceiver may be shut down.

Referring now to FIG. 13B, a diagram illustrating an FDD device with a dual-band passive transceiver that may benefit from the disclosed paging procedures is shown. The dual-band passive transceiver may be integrated into the RF front-end in. The FDD device may include a duplexer. In this example, both of the duplexer outputs may be split into two by switches. In sleep mode, switch 1 may be left in position 'a' and switch 2 may be left in position 'b' while the active transceivers may be shut down.

Figure 14B:
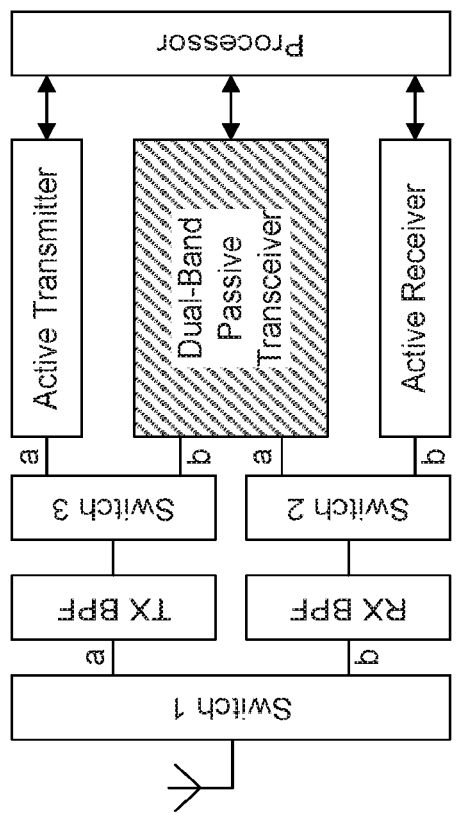
FIG. 14B is a diagram illustrating an HD-FF device with a dual-band passive transceiver integrated into the RF front-end.
Figure 14A:
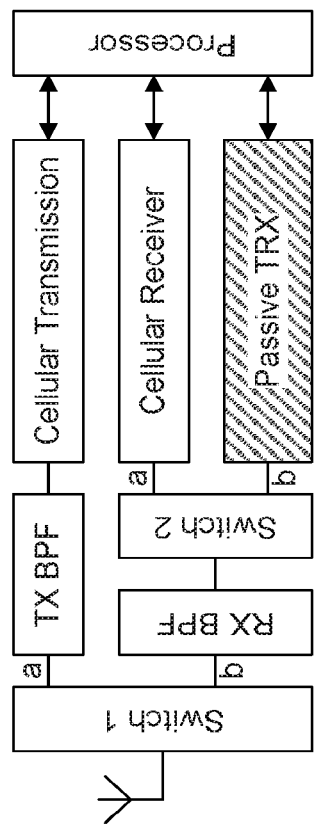
FIG. 14A is a diagram illustrating a half-duplex-FDD (HD-FDD) device with a single-band passive transceiver.

Similar examples of a single-band half-duplex-FDD (HD-FDD) mode device that may benefit from the proposed paging procedures are illustrated in FIGS. 14A-14B.

Referring now to FIG. 14A, an HD-FF device with a single-band passive transceiver is shown. In sleep mode, both switch 1 and switch 2 outputs may be left in position 'b' while the active transceiver may be shut down.

Referring now to FIG. 14B, an HD-FF device with a dual-band passive transceiver integrated into the RF front-end is shown. In sleep mode, the switch 1 output may be left in either position, the switch 2 output may be in position 'a,' and the switch 3 output may be in position 'b' while the active transceiver may be shut down.

Figure 15:
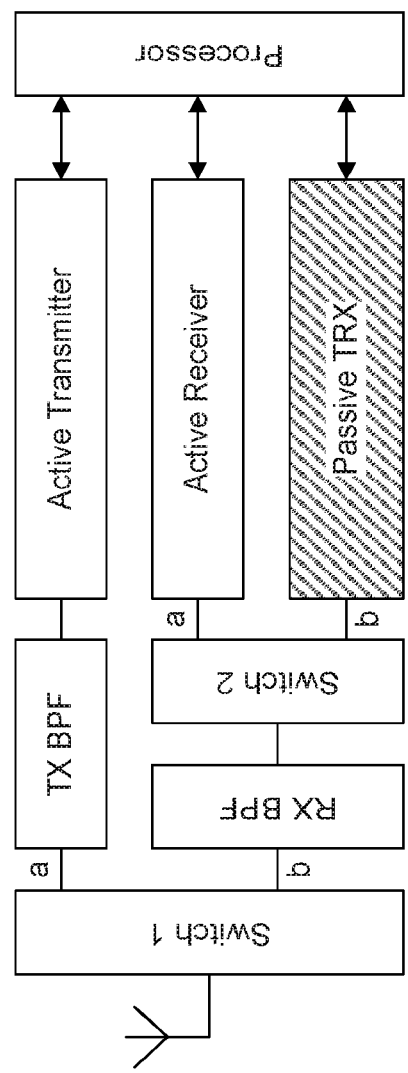
FIG. 15 is a diagram showing a TDD mode device.

Referring now to FIG. 15, a diagram illustrating a single-band TDD mode device that may benefit from the disclosed paging procedures is shown. In sleep mode, switch 1 and switch 2 outputs may be left in position 'b' while the active transceiver may be shut down.

Figure 16B:
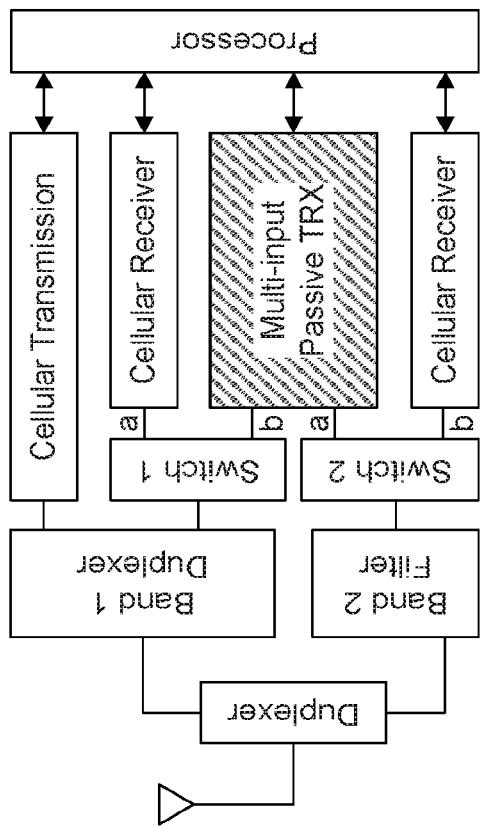
FIG. 16B is a diagram illustrating a single-band FDD device.
Figure 16A:
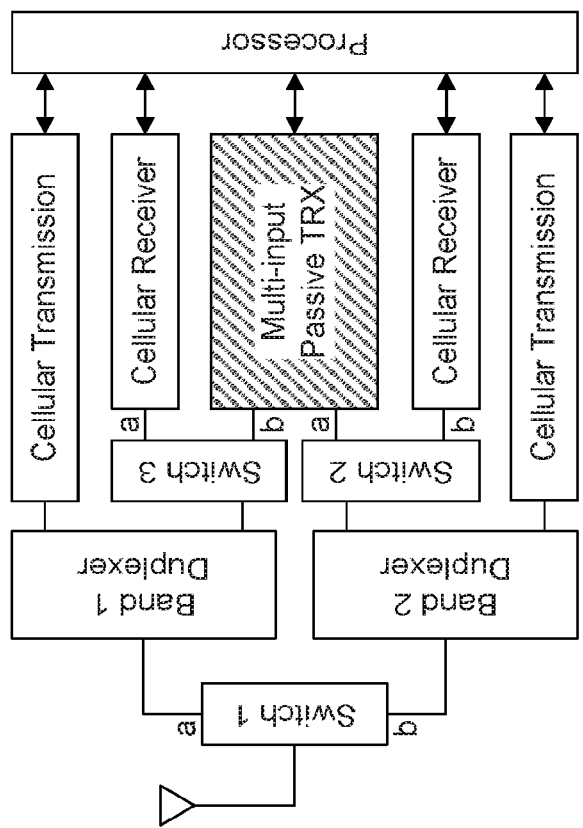
FIG. 16A is a diagram illustrating a dual-band FDD device.

Referring now to FIG. 16A, a diagram illustrating a dual-band FDD device that may benefit from the disclosed paging procedures is shown. FIG. 16A shows a dual-band FDD device integrating a dual-band passive transceiver into the FDD receive paths It should be noted that a quad-band passive transceiver may be integrated in the device shown in FIG. 16A employing the methods described above.

Referring now to FIG. 16B, a diagram illustrating a single-band FDD device that may benefit from the disclosed paging procedures is shown. FIG. 16B shows a single band transmitter with dual-band downlink carrier aggregation. In other words, FIG. 16B shows an inter-band downlink carrier aggregation capable FDD device. A dual-band passive transceiver is shown in FIG. 16B, but it should be noted that a tri-band passive transceiver may be integrated in the device shown in FIG. 16B employing the methods described above.

The approaches described above are not radio access technology (RAT) specific. These approaches may be applied to devices employing cellular, 802.11, Bluetooth, ZigBee or any other RAT employing active transceivers.

Figure 17:
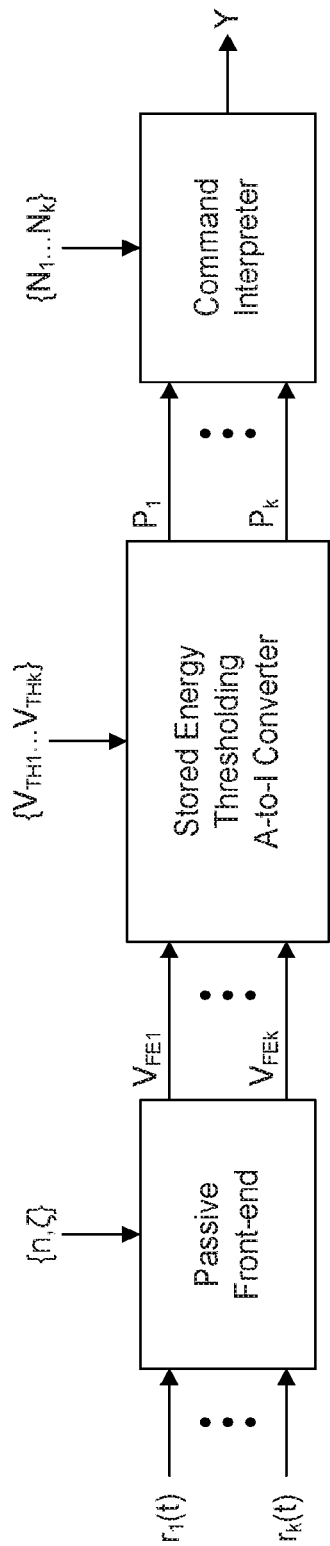
FIG. 17 is a diagram showing radio-triggered wakeup receiver architecture.

Referring now to FIG. 17, a top level architecture of a passive receiver (P-RX) is shown. The P-RX may include a single or multi-input passive front-end, a single or multi-input analog-to-information (A-to-I) converter and a single or multi-input command interpreter. The passive front-end may include a set of design parameters $\{n,\zeta\}$. The parameter n may be used to set the passive gain of the front-end. The parameter $\zeta$ may be used to set an R-C time constant. The stored energy thresholding based A-to-I converter may include multiple voltage-to-pulse (V-to-P) converters. The A-to-I converter may have k inputs and k parameters $\{V_{TH1} \ldots V_{THk}\}$. The A-to-I converter's output may be used by the command interpreter. The command interpreter's "success criteria" may be defined by the set of parameters $\{N_1 \ldots N_k\}$. If the input signal set $\{P_1 \ldots P_k\}$ to the command interpreter satisfies the success criteria defined by its parameter set, the command interpreter then may generate an interrupt Y.

Figure 18B:
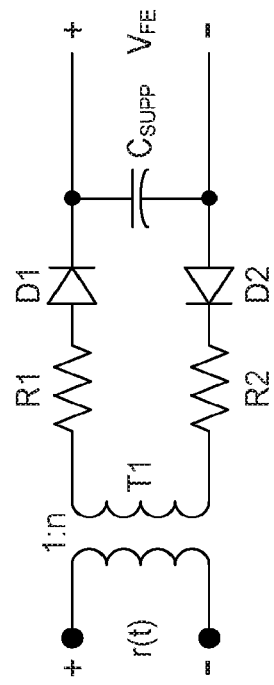
FIG. 18B is a simplified schematic of a differential or balanced architecture of the passive front-end.
Figure 18A:
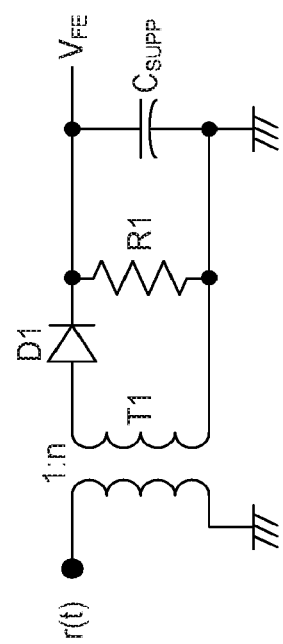
FIG. 18A is a simplified schematic of a single-ended architecture of the passive front-end.

Referring now to FIGS. 18A-18B, diagrams illustrating implementations of the passive front-end are shown. FIG. 18A shows a simplified schematic of a single-ended architecture. FIG. 18B shows a simplified schematic of a differential or balanced architecture. Each implementation may employ a transformer with a turns ratio of 1:n. The transformer turns ratio may be optimized to provide passive gain and input matching. A single diode (D1) or a pair of diodes (D1, D2) may be used to rectify the input signal r(t). The capacitor $C_{SUPP}$ may be used as a supplementary energy storage element. The resistors R1, R2 may be used to ensure the proper impedance at the input port of the transformer T1. The resistors R1, R2 together with the capacitor $C_{SUPP}$ define the time constant of the passive front-end. The parameter set $\{n,\zeta\}$ may allow the selection of the effective sensitivity level and reaction time of the passive front-end.

Figure 19B:
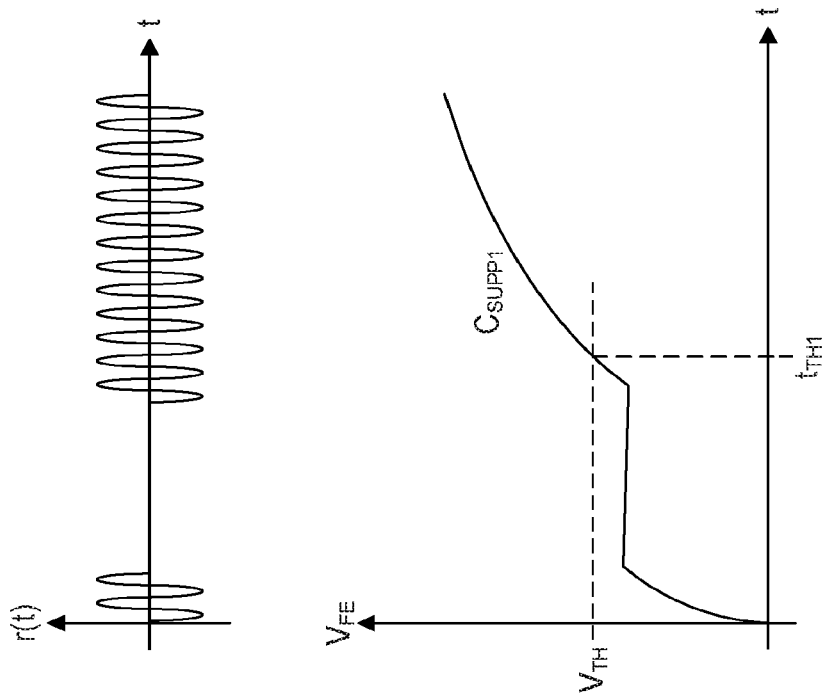
FIG. 19B shows the passive front-end's response to a pulsed sinusoid.
Figure 19A:
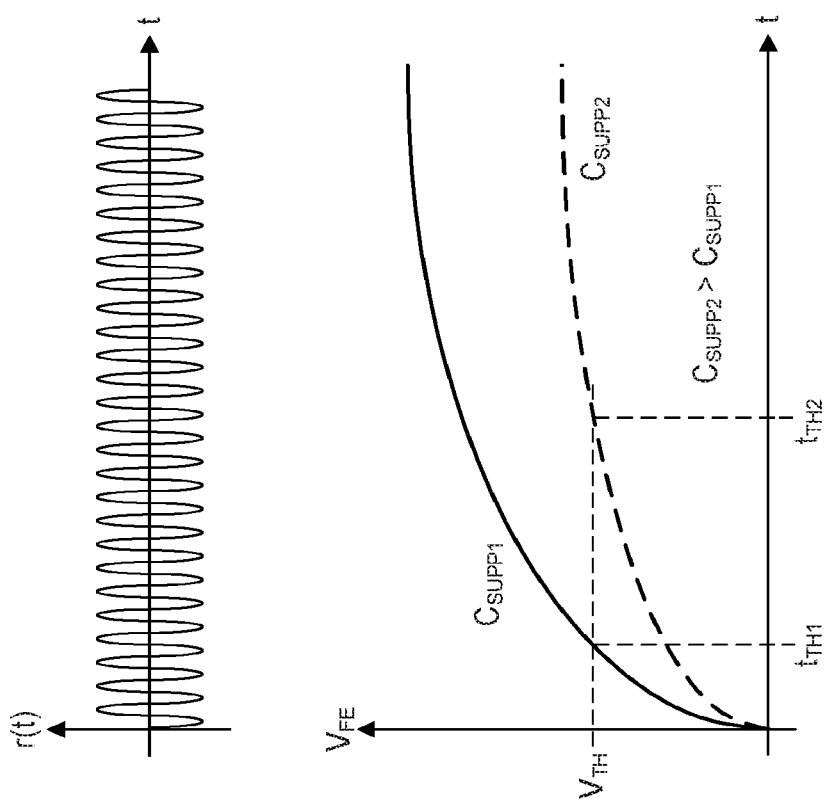
FIG. 19A shows an output waveform $V_{FE}$ in response to a continuously persistent sinusoidal input r(t)

Referring now to FIGS. 19A-19B, diagrams illustrating a possible set of input and output waveforms of the passive front-end are shown. The output waveform $V_{FE}$ may indicate the amount of energy that has been stored in $C_{SUPP}$ by the passive front-end. FIG. 19A shows the output waveform $V_{FE}$ in response to a continuously persistent sinusoidal input r(t). The time required ($t_{TH}$) for the output $V_{FE}$ to reach a desired threshold voltage level $V_{TH}$ for a given input signal r(t) may be controlled by appropriately selecting the value of $C_{SUPP}$. A larger $C_{SUPP}$ may result in a larger $t_{TH}$ for a given threshold voltage $V_{TH}$. FIG. 19B shows the passive front-end's response to a pulsed sinusoid. If the capacitor $C_{SUPP}$ (and associated circuitry) does not exhibit substantial loss, then the output $V_{FE}$ can be made to reach a desired threshold voltage $V_{TH}$ in response to a pulse sinusoid. When an input r(t) is present, the output voltage $V_{FE}$ may rise proportionately to the input signal amplitude. When the input is not present, $V_{FE}$ may be held at a near constant value until the input appears again.

Figure 20A:
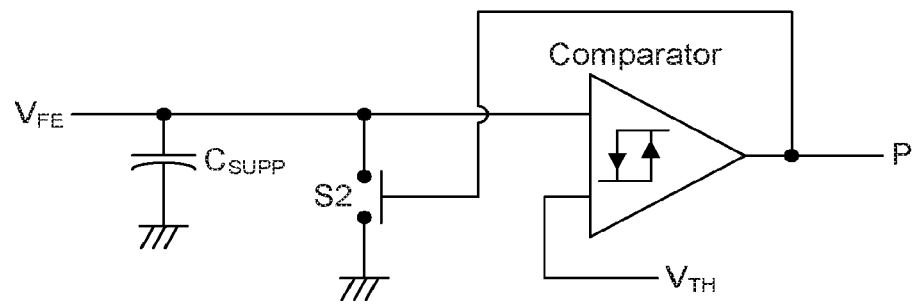
FIG. 20A is a diagram illustrating an implementation of the analog-to-information (A-to-I) converter.

Referring now to FIG. 20A, a diagram illustrating an implementation of the analog-to-information (A-to-I) converter is shown. The A-to-I converter may include a storage element $C_{SUPP}$, a comparator with hysteresis, and a shunting switch at the input of the comparator that is controlled by the comparator output logic level.

Figure 20B:
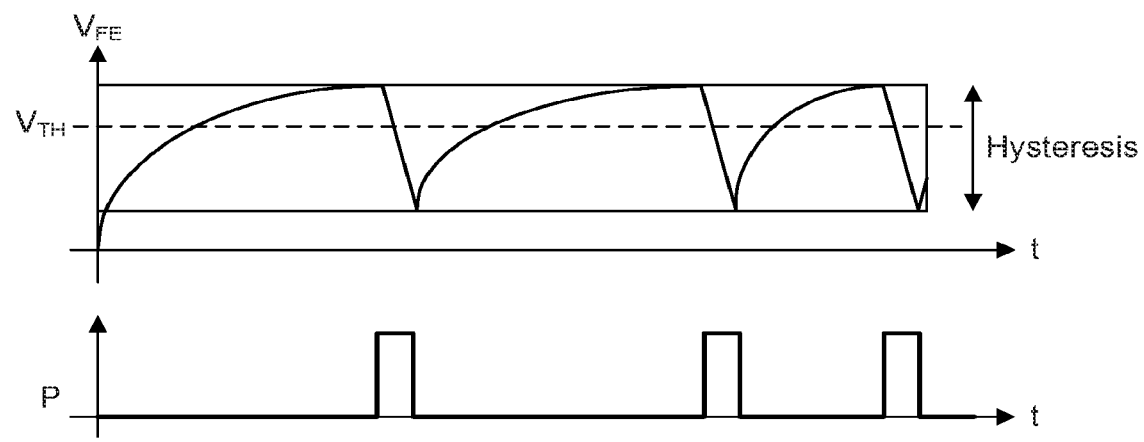
FIG. 20B shows the A-to-I converter's input and output waveforms.

Referring now to FIG. 20B, diagrams illustrating the A-to-I converter's input and output waveforms are shown. When the input voltage $V_{FE}$ on the positive terminal of the comparator exceeds the threshold voltage $V_{TH}$ on the negative terminal of the comparator by the hysteresis amount, the output (P) of the comparator may transition from logic low to logic high. This may close the shunting switch attached to the positive input terminal of the comparator thereby emptying the storage capacitor $C_{SUPP}$ and reducing $V_{FE}$ below $V_{TH}$. The amount by which the input voltage is reduced below $V_{TH}$ may also be set to the comparator hysteresis. As a result, the comparator may generate a pulse at its output every time the voltage at its input exceeds $V_{TH}$. The width of the generated pulse may be set by the comparator's hysteresis voltage.

Figure 21:
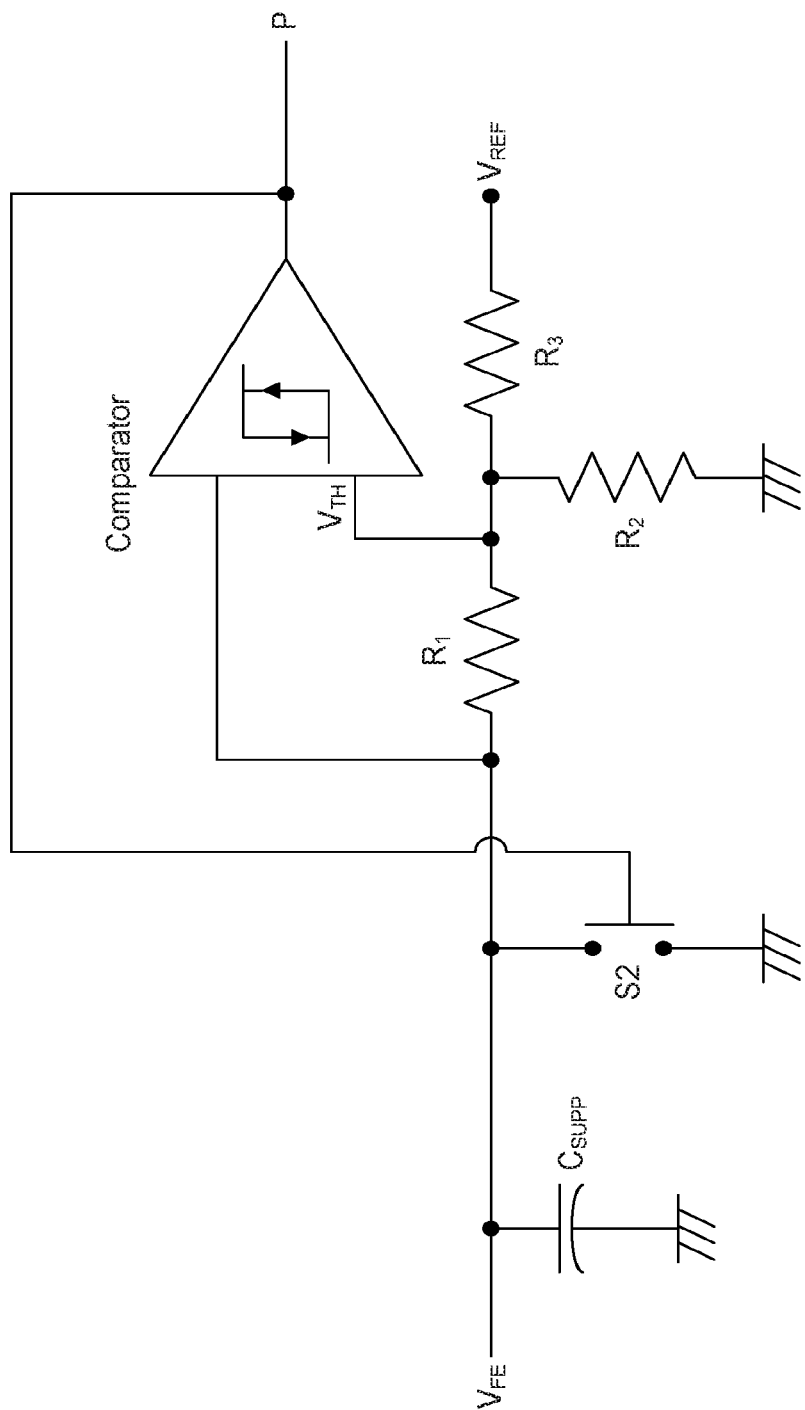
FIG. 21 is a circuit diagram showing an analog-to-information converter with automatic sensitivity control

Referring now to FIG. 21, a diagram illustrating an A-to-I converter with an automatic sensitivity control mechanism is shown. The comparator threshold voltage $V_{TH}$ may be a superposition of $V_{FE}$ and $V_{REF}$. When the voltage $V_{FE}$ across $C_{SUPP}$ is large, a portion of this voltage added to $V_{REF}$ may increase the trip point of the comparator thereby reducing the sensitivity of the A-to-I converter. When $V_{FE}$ is small, $V_{TH}$ may be essentially dropped to $V_{REF}$ thereby increasing the sensitivity of the A-to-I converter.

Figure 22A:
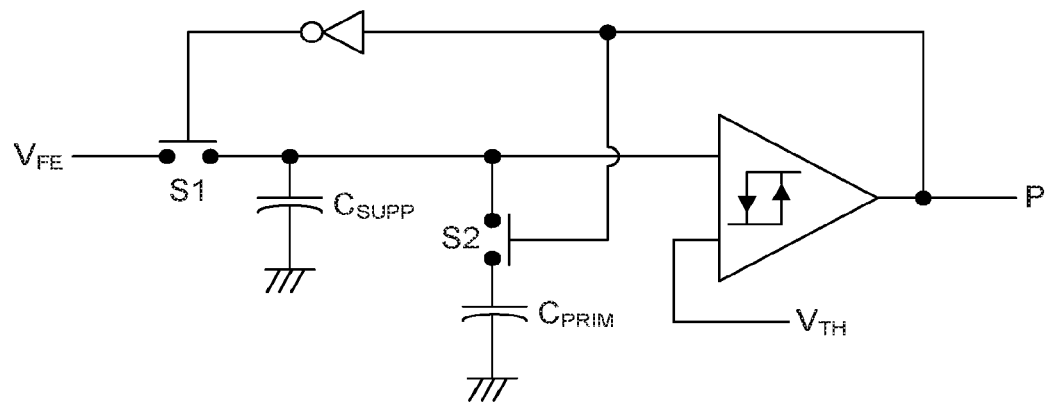
FIG. 22A shows a single-ended implementation of the A-to-I converter.
Figure 22B:
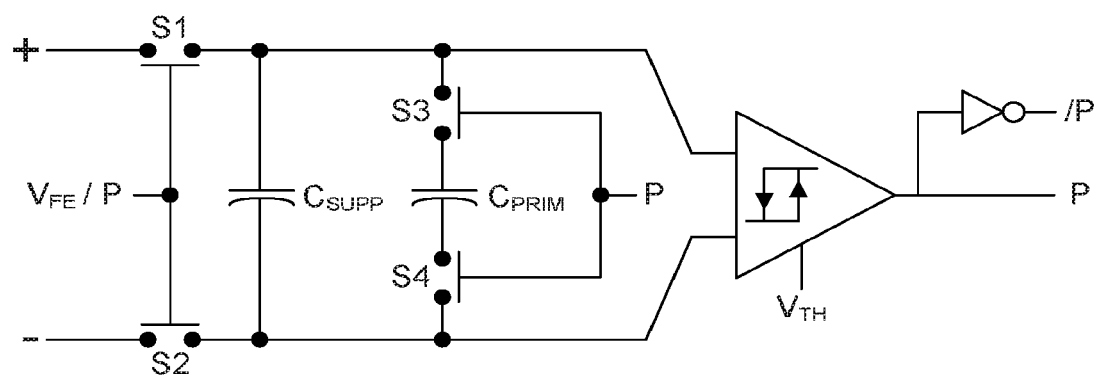
FIG. 22B shows a fully differential or balanced implementation of the A-to-I converter.

Referring now to FIGS. 22A-22B, alternative examples of the A-to-I converter are shown. FIG. 22A shows a single-ended implementation. An output (P) of the comparator is initially assumed to be in logic low state and, as a result, Switch 51 may be closed and Switch S2 open. Once the input voltage $V_{FE}$ exceeds the threshold voltage $V_{TH}$, the output P may transition from logic low to logic high thereby opening switch 51 and closing switch S2. In contrast to the implementations shown above, the energy stored in the supplementary storage element $C_{SUPP}$ may be transferred to a primary storage element $C_{PRIM}$, where $C_{PRIM}$ may be much larger than $C_{SUPP}$. If the voltage on $C_{PRIM}$ is smaller than $V_{TH}$, the voltage at the positive terminal of the comparator may be reduced below $V_{TH}$ thereby returning the output P to logic low. FIG. 22B shows a fully differential or balanced implementation of this type of A-to-I converter.

Figure 23:
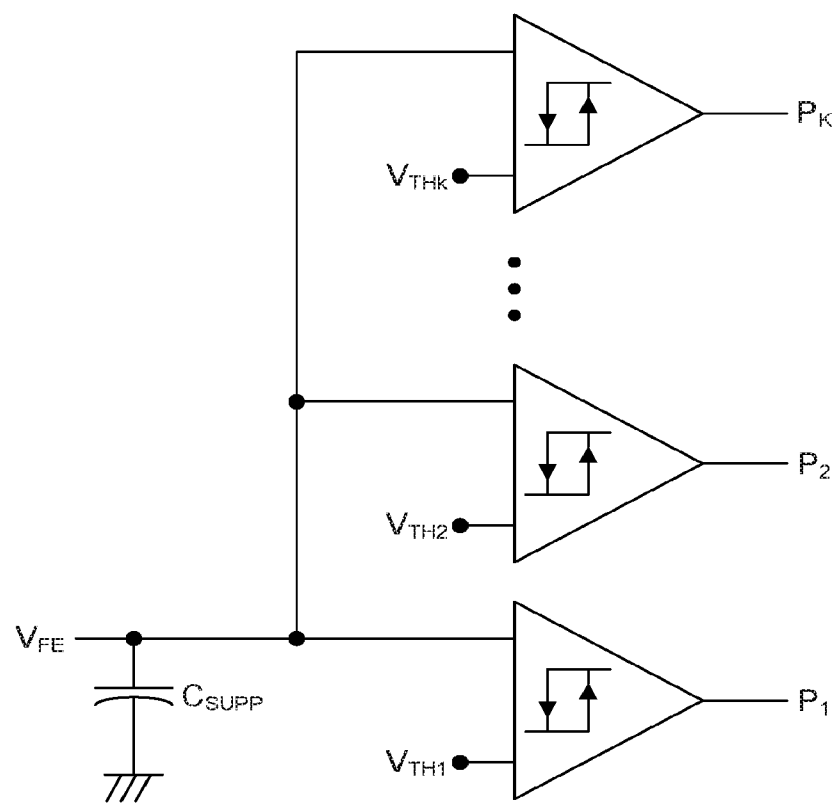
FIG. 23 is a circuit diagram showing an alternative realization of the analog-to-information converter.

Referring to FIG. 23, a diagram illustrating an alternative implementation of the A-to-I converter is shown. The voltage $V_{FE}$ may be quantized into k levels using k comparator with k different threshold voltages ($V_{TH1}$, $V_{TH2}$, . . . $V_{THk}$). The A-to-I converter may produce k outputs ($P_1$, $P_2$, . . . $P_k$) to approximate $V_{FE}$.

Figure 24:
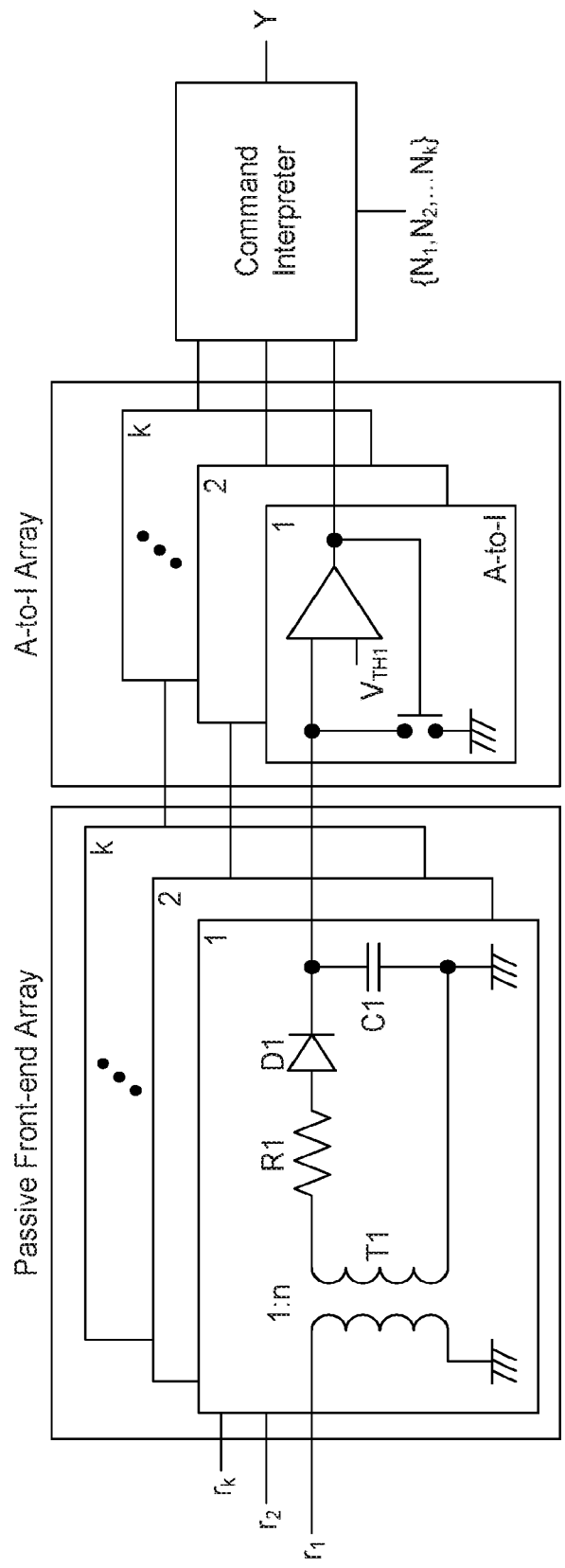
FIG. 24 is a circuit diagram showing a complete schematic of a radio-triggered wakeup receiver.

Referring now to FIG. 24, a diagram illustrating another schematic of the P-RX is shown. The P-RX may contain of one or more inputs (e.g., a k-input P-RX). The P-RX may include k passive front-ends and k A-to-I converters. One or more diode rectifiers in the k passive front-ends may together drive a single storage capacitor $C_{SUPP}$ followed by a single V-to-P converter in the message decoder.

Figure 25:
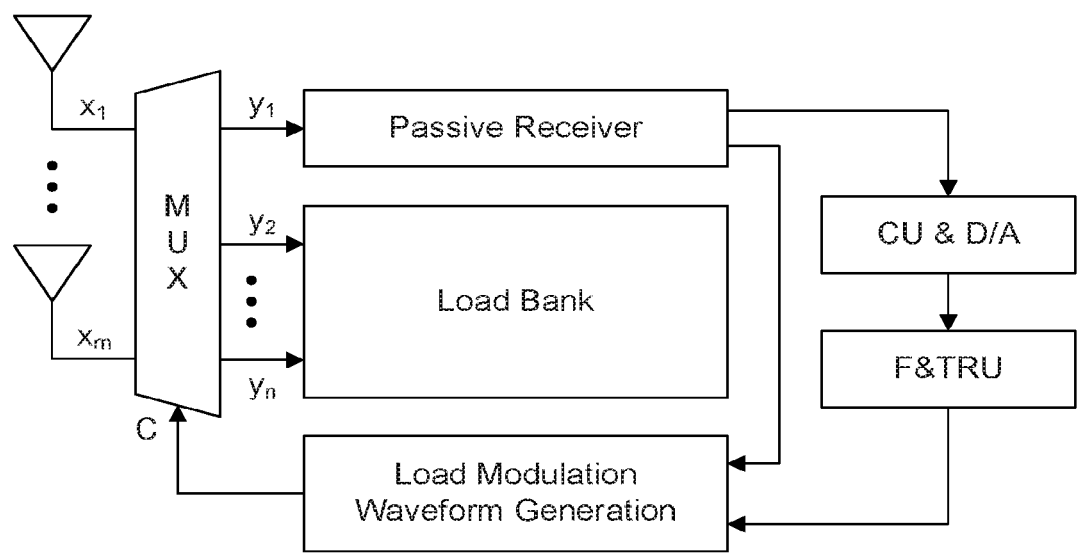
FIG. 25 is a circuit diagram showing a passive transceiver architecture.

Referring now to FIG. 25, a diagram of a passive transceiver (P-TRX) is shown. The P-TRX may include a single or multiple antennas, a multiplexer, a single to multiple passive receivers, a single or multiple load banks, a controller and digital-to-analog converter (CU&D/A) unit, a frequency and time reference unit (FTRU), and/or a single or multiple modulation waveform generators.

The m-to-N multiplexer (MUX) may have m inputs ($x_1 \ldots x_m$), N outputs ($y_1 \ldots y_N$) and a control port C. The control port C may be used to connect the m inputs of the MUX to m out of N outputs of the MUX. The P-TRX may receive an un-modulated sinusoid on one or multiple antennas. In response, the passive receiver may generate an interrupt to the CU&D/A unit indicating that an RF field has been detected. The passive receiver may employ stored energy thresholding principles to generate the interrupt. The CU&D/A in response may activate the FTRU and the FTRU may activate a clock signal and send the clock signal to the load modulation waveform generator (LMWFG). The passive receiver may generate a second interrupt to activate the load modulation waveform generator (LMWFG). Once the LMWFG receives an activation signal from the passive receiver and a clock from the FTRU unit, the LMWFG in turn may apply a modulation waveform to the control port C of the MUX thereby connecting the antennas to different loads in the load bank. This may amplitude modulate the sinusoid backscattered from the P-TRX. The LMWFG may generate a sinusoid, a square wave, a pseudo-random sequence or chirped sequence to create different backscatter patterns.

Figure 26A:
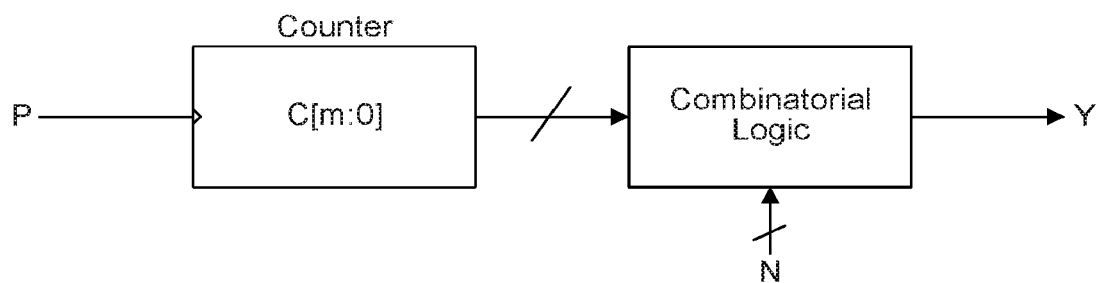
FIG. 26A is shows stored energy thresholding event counting wakeup command interpreter (ET-CI) for a single input.
Figure 26B:
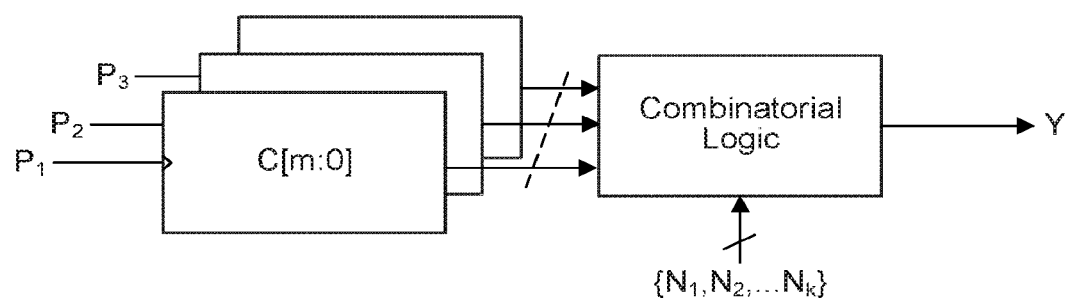
FIG. 26B shows a stored ET-CI for a multi-input device.

Referring now to FIGS. 26A-26B, diagrams illustrating a pulse counting wakeup command interpreter are shown. FIG. 26A shows stored energy thresholding event counting wakeup command interpreter (ET-CI) for a single input RT-WURX. FIG. 26B shows a stored ET-CI for a multi-input RT-WURX. The ET-CI may include a counter and a combinatorial logic block. The combinatorial logic block may perform a comparison between its two inputs C[m:0] and N. When the (m+1) bit counter output C[m:0] reaches a count equal to N, the combinatorial logic block may set its output Y to logic high.

Figure 27A:
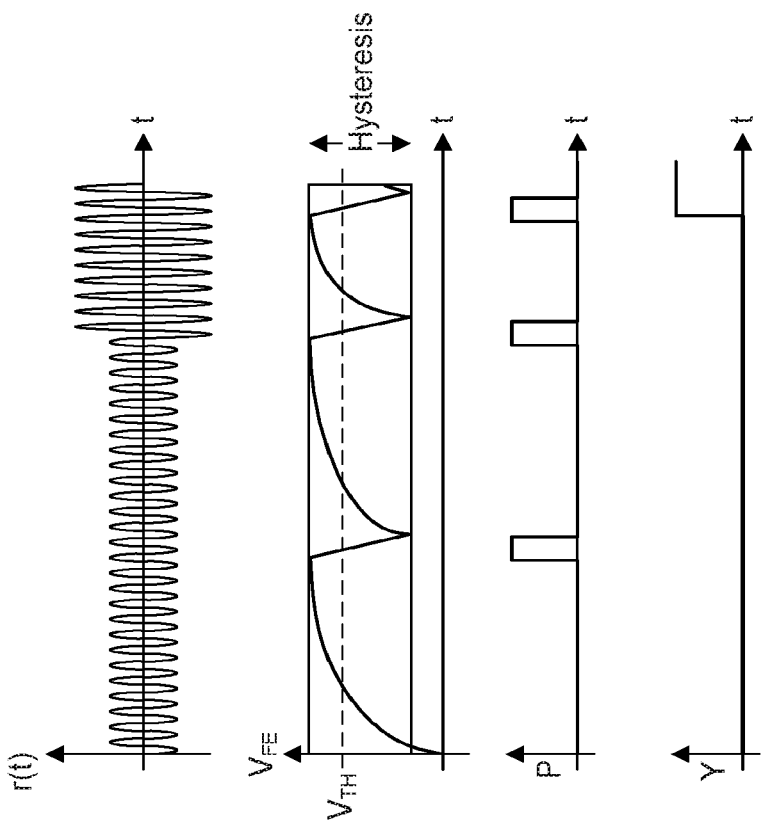
FIG. 27A shows an ET-CI configured for two threshold events from an A-to-I convertor.
Figure 27B:
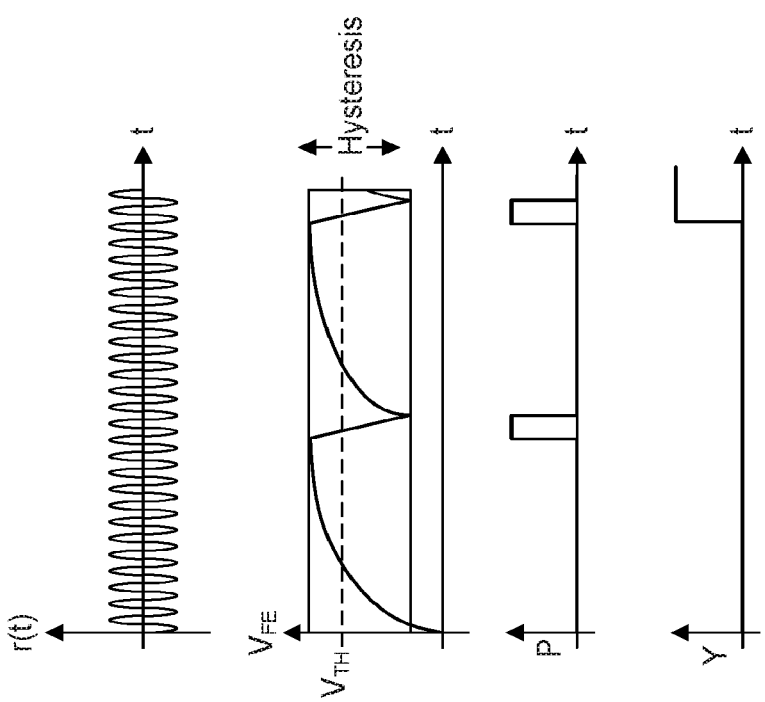
FIG. 27B shows an ET-CI configured for three threshold events.

Referring now to FIGS. 27A-27B, diagrams illustrating the operation of a single input ET-CI. FIG. 27A shows an ET-CI configured for 2 threshold events from an A-to-I convertor. Once N=2 consecutive pulses at the output of the A-to-I are detected, the ET-CI may transition its output Y from logic low to logic high thereby generating an interrupt. FIG. 27B shows an ET-CI configured for 3 threshold events. Once N=3 consecutive pulses at the output of the A-to-I are detected, the ET-CI may transition its output Y from logic low to logic high thereby generating an interrupt.

The A-to-I converter threshold voltage ($V_{TH}$) and the threshold event counter's target number of events (N) may be used to optimize the detection and false alarm probability of the RT-WURX. As an example, setting both $V_{TH}$ and N to high values will render the RT-WURX robust to noise and thereby reduce false alarms. However, more energy will be needed to trigger a wakeup interrupt with such a configuration.

A stored energy quantizing wakeup command interpreter may examine a digital bit sequence. The digital bit sequence may be generated by an analog-to-information converter in the passive receiver frontend. The stored energy quantizing command interpreter may generate an interrupt if the bit sequence received from the passive receiver frontend matches a pre-determined code.

Figure 28A:
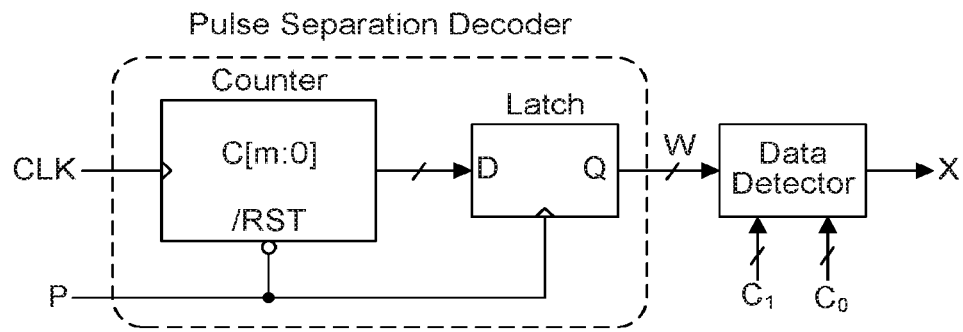
FIG. 28A shows a pulse separation decoding (PSD) data detector.
Figure 28B:
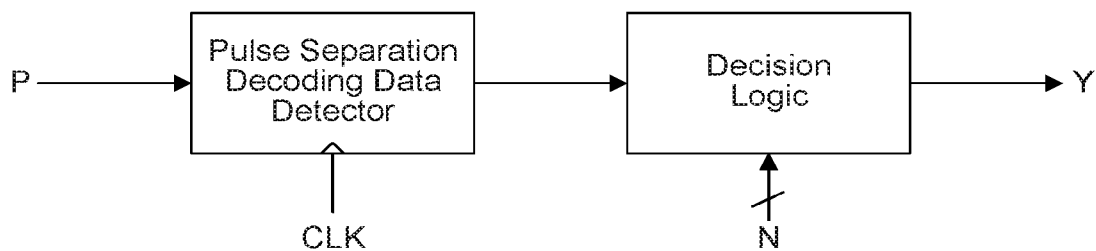
FIG. 28B shows a single input stored energy threshold event separation decoding wakeup command interpreter (ETESD-CI)
Figure 28C:
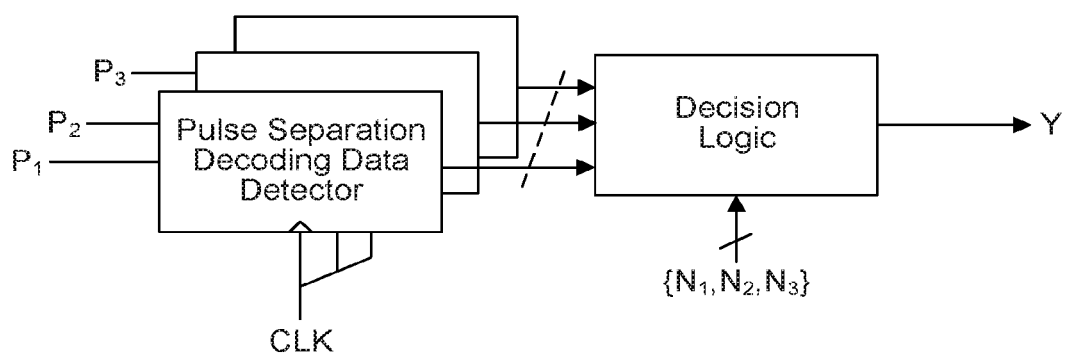
FIG. 28C shows a three input stored energy threshold event separation decoding wakeup command interpreter (ETESD-CI)

Referring now to FIGS. 28A-28C, diagrams of a stored energy threshold event separation decoding wakeup command interpreter (ETESD-CI) for a single-input and multi-input RT-WURX are shown. The ETESD-CI may include two major blocks, the pulse separation decoding (PSD) data detector and the decision logic. The PSD data detector is shown in FIG. 28A. A single input ETESD-CI is shown in FIG. 28B, and a three-input ETESD-CI is shown in FIG. 28C.

The PSD data detector illustrated in FIG. 28A may include a counter and a multi-bit latch. The counter clock (CLK) frequency may be set significantly (e.g., 10×) higher than the expected minimum separation between consecutive pulses P from the Analog-to-information converter. The pulse P may be used to save the counter value into the latch and then reset the counter. Successive outputs W of the latch provide a scaled numerical measure of the time separation between successive incoming pulses P. This information can be used by the data detector.

The data detector includes two programmable parameters C0 and C1. According to an embodiment, the operating principal of the data detector is described below in equation 1. The decision logic block may have one programmable parameter N. Its output may be initialized to logic low and transition to logic high when the PSD data detector output bit pattern X matches N.

$$X = \begin{cases} 0, \text{ when } W > C_0 \\ 1, \text{ when } W < C_1 \\ C_0 > C_1 \end{cases} \qquad \text{Equation 1}$$

Figure 29:
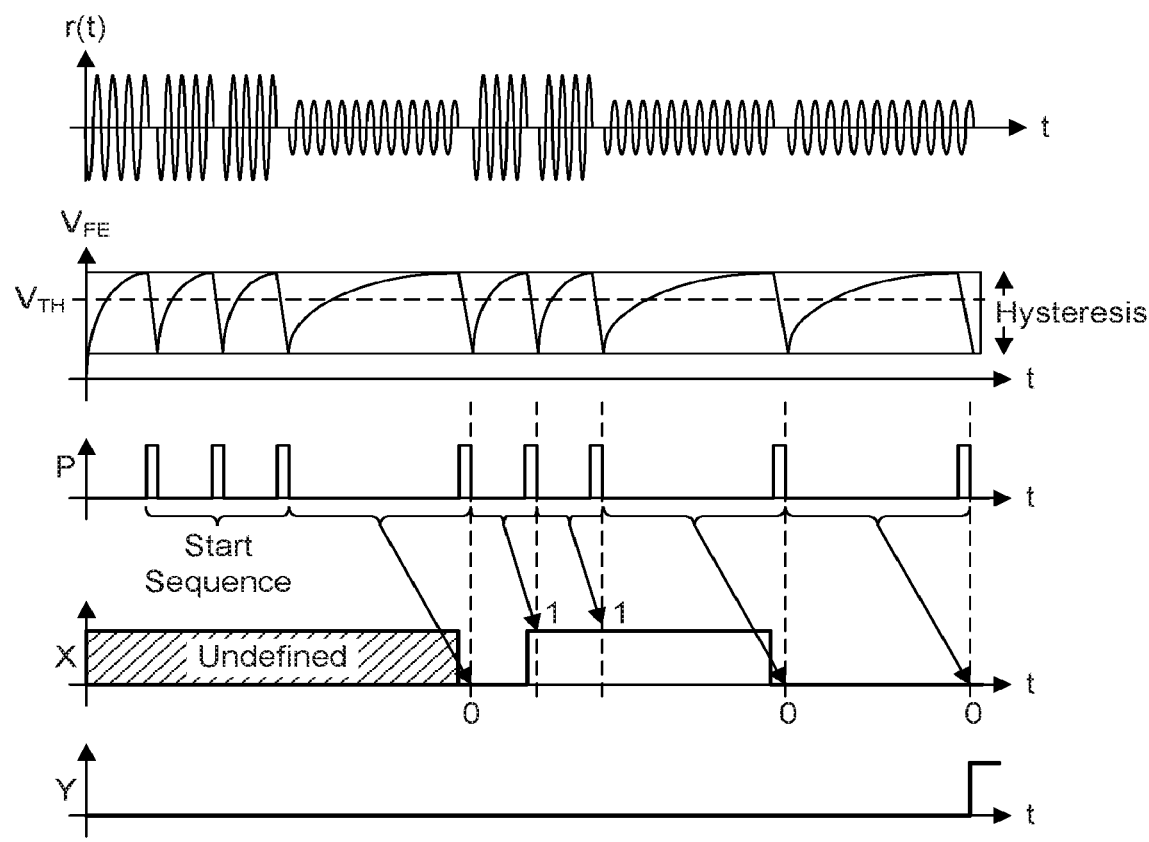
FIG. 29 is a diagram showing a single-input energy threshold event separation decoding command interpreter theory of operation.

Referring now to FIG. 29, a diagram illustrating the operation of a single input ETESD-CI is shown. Signal r(t), $V_{th}$ and P are associated with the wakeup receiver's passive front-end and the A-to-I converter. Signals X and Y are associated with the ETESD command interpreter.

The ETESD-CI may require a start sequence (e.g., 111) to begin the wakeup command interpretation process. Once the start sequence is detected, the measured time separation between successive pulses P may be used to decode the data. If the measured separation between successive pulses P is less than C1, this may be interpreted as a binary bit of value 1. If the measured separation between successive pulses P is greater than C0, this may be interpreted as a binary bit of value 0. Once the programmed bit pattern N (e.g., 01100) is received by the decision logic block, its output may be transitioned from logic low to logic high thereby generating an interrupt.

Figure 30:
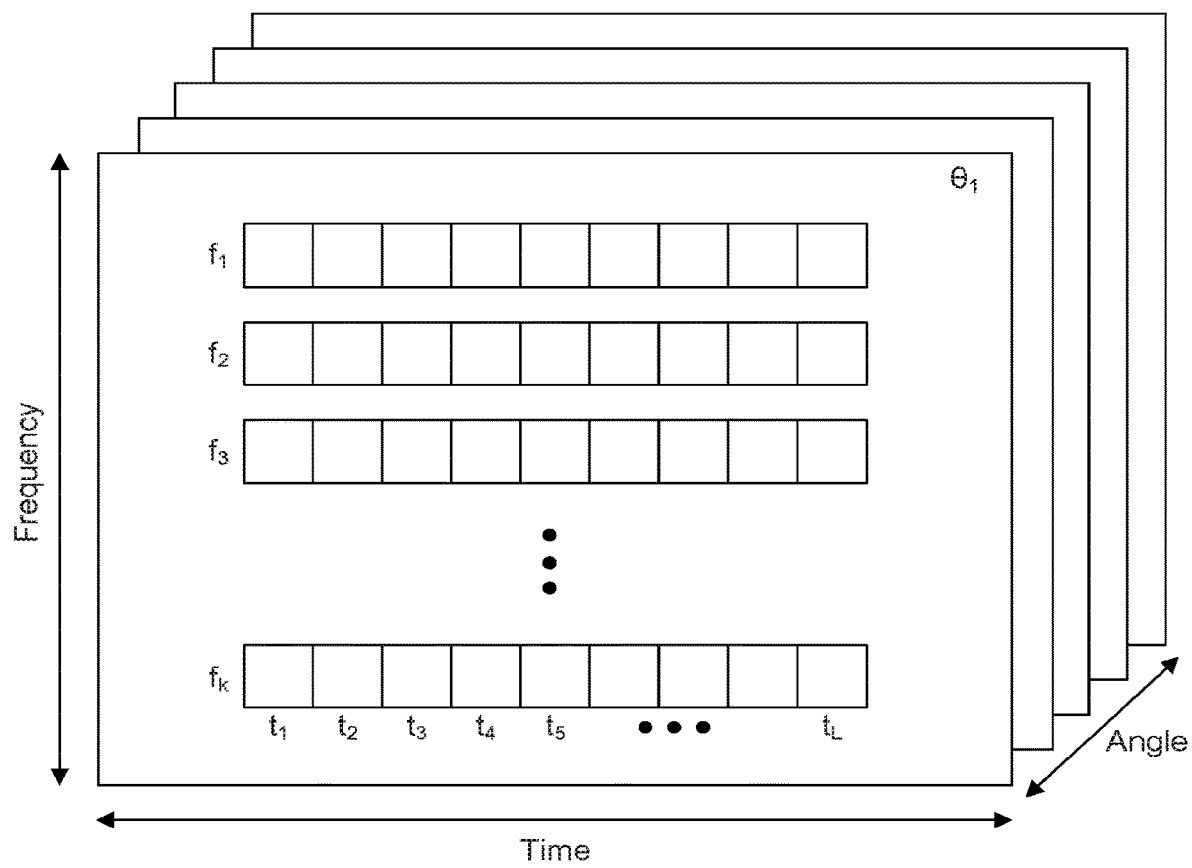
FIG. 30 is a diagram showing a resource cube used to construct a wakeup word.

Referring now to FIG. 30, a diagram illustrating a resource cube used to construct a wakeup word is shown. The network may employ all or a subset of elements (angle, frequency, time) in the resource cube to construct a wakeup signal sequence. The wakeup signal sequence may include a power optimized waveform and a wakeup command employing a unique energy signature.

The frequency resources may include a mix of carriers and sub-carries. The carriers may be contained in a single frequency band or in multiple frequency bands. The network may employ one or more unmodulated carrier or traditional carrier modulation techniques such as on-off keying (OOK), binary phase-shifted keying (BPSK), quadrature phase-shifted keying (QPSK), quadrature amplitude modulation (QAM), or the like, to transmit the wakeup command. Unique energy signature methods such as stored energy quantization (SEQ), stored energy threshold event stacking (SET) or stored energy threshold event separation encoding (SETES) schemes may also be used to transmit a wakeup command. One or more methods may be combined to create hybrid methods for transmitting a wakeup command.

The network may generate broadcast, multicast or unicast wakeup commands to wake-up all devices, groups of devices or individual devices in a coverage area. Multiple base stations may be instructed to collaborate when transmitting a wakeup command.

A broadcast wakeup command may be constructed with a single or multi frequency SEQ, SET, or SETES command. Multiple SEQ, SET, and SETES commands may be combined to create a compound wakeup command. All devices in the coverage area may be programmed to respond to the same simple or compound wakeup command and the wakeup command may be transmitted in an omnidirectional manner to wake-up all devices in the coverage area. According to an embodiment, a network may be partitioned into several spatial sectors and the same broadcast command may be transmitted in each angular direction using beamforming.

A multicast wakeup command may be constructed with a single or multi frequency SEQ, SET, or SETES command. Multiple SEQ, SET, and SETES commands may be combined to create a compound wakeup command. The network may be partitioned into several spatial sectors and the same command may be transmitted in a particular sector or a subset of sectors to wakeup different groups of devices. Alternatively, a multicast wakeup command may include a preamble and a body. The preamble may be a group identifier and the body may be the wakeup command for all devices in the coverage area. The preamble may be constructed using a SEQ or SET command and the body may be constructed using a SETES command.

A unicast wakeup command may be constructed with a single or multi frequency SEQ, SET, or SETES command. Multiple SEQ, SET, and SETES commands may be combined to create a compound wakeup command. The network may be partitioned into several spatial sectors and each sector may contain only one device. The same command may be transmitted in a particular sector to wake-up a particular device. Alternatively, a unicast wakeup command may include a preamble and a body. The preamble may be a group identifier and the body may be the wakeup command for a particular device in the group. The preamble may be constructed using a SEQ or SET command and the body may be constructed using a SETES command.

Figure 31:
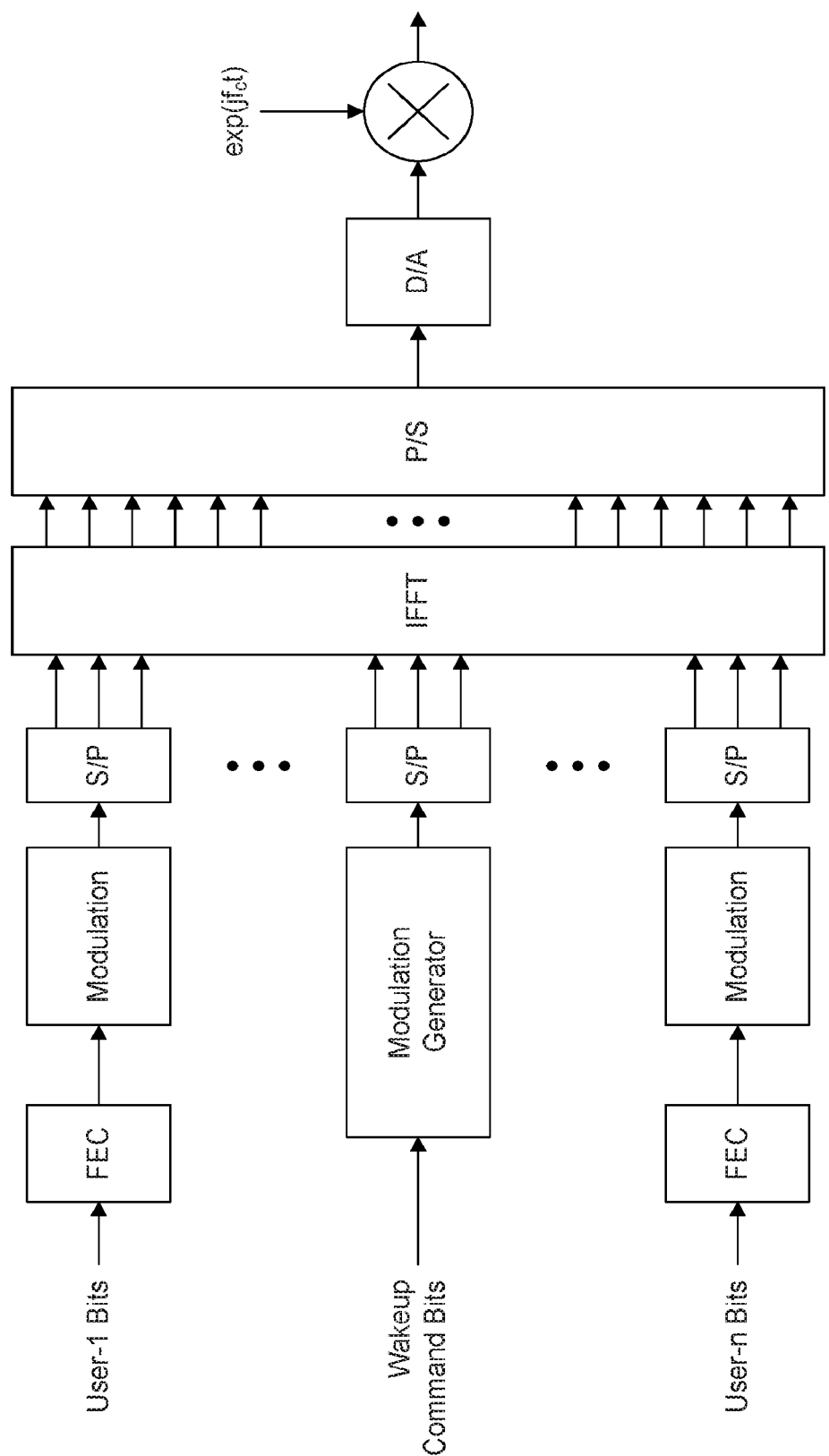
FIG. 31 is a diagram showing a transmitter structure sued to generate a wakeup command.

Referring now to FIG. 31, a diagram illustrating a transmitter structure that may be used to generate a wakeup command is shown. A modulation generator may be used to map wakeup command bits onto OFDM subcarriers that may be designated for use by the wakeup command. The modulation generator may employ a scaled superposition of the designated subcarriers to realize a wakeup signal with the desired time-domain properties.

Figure 32A:
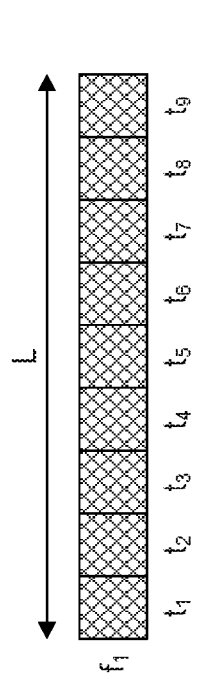
FIG. 32A shows a symbolic representation of a ⅗th strength $f_1$ word.
Figure 32B:
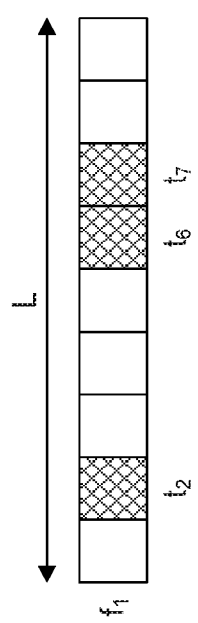
FIG. 32B illustrates a (1, f1) wakeup word.
Figure 32C:
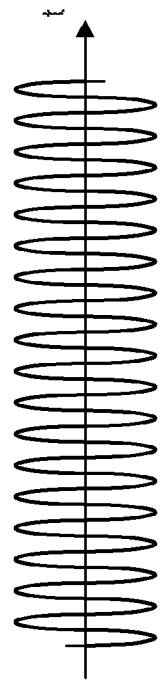
FIG. 32C shows wakeup words utilizing a single frequency resource and up to L time resources.
Figure 32D:
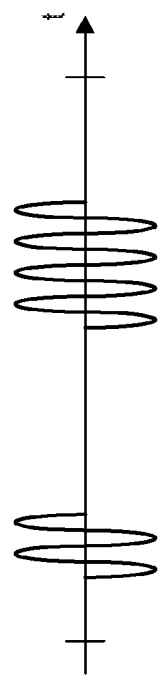
FIG. 32D illustrates a (1, f1) wakeup word.

Referring now to FIGS. 32A-32D, diagrams illustrating a wakeup word utilizing a single frequency resource ($f_1$) and up to L=9 time resources are shown. The strength of word employing L time resources may range from 1/L to 1. FIG. 32A shows a symbolic representation of a ⅜th strength $f_1$ word. This may be referred to as a (⅜, $f_1$) word. The underlying time domain waveform of the (⅜, $f_1$) word depicted in FIG. 32A is shown in FIG. 33C. FIGS. 32B and 32D illustrate a (1, f1) wakeup word.

Figure 33A:
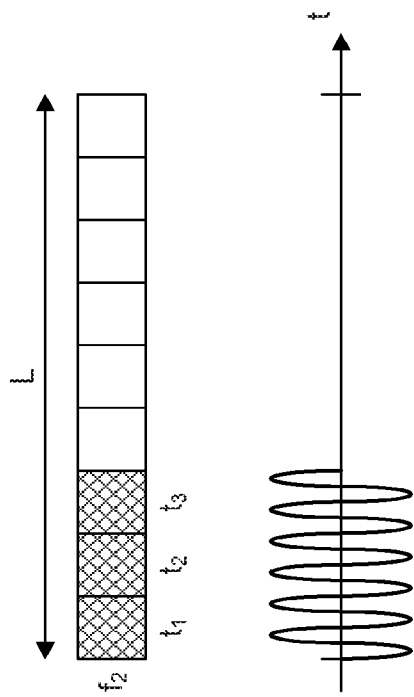
FIG. 33A shows an alternative implementation of a (⅗, f1) wakeup word
Figure 33B:
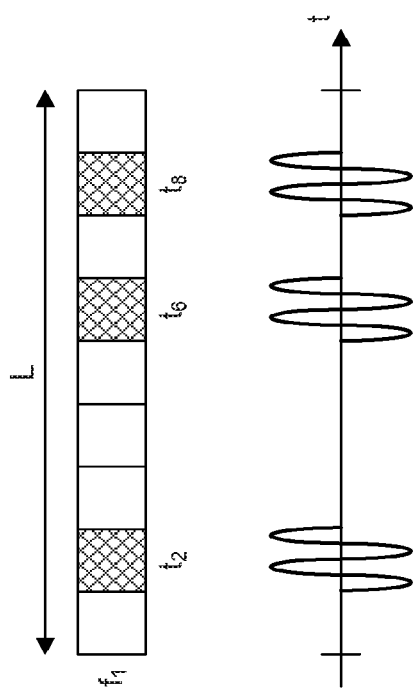
FIG. 33B shows another alternative implementation of a (⅗, f1) wakeup word.

Referring now to FIGS. 33A-33B, diagrams illustrating implementations of a (⅜, $f_1$) wakeup word are shown. The time resources in a wakeup word do not need to be contiguously arranged.

Referring now to FIGS. 34A-34B, diagrams illustrating wakeup words utilizing multiple frequency and time resources are shown. FIG. 34A shows a word employing a (⅜, f1) and a (1, fk) frequency-time resource combination. This may be referred to as a {(⅜, f1), (1, fk)} word. FIG. 34B shows a {(⅜, f1), (⅘, f2), (1, fk)} word.

Referring now to FIGS. 35A-35B, diagrams illustrating a wakeup word utilizing j angle resources, k frequency resources and up to L time resources are shown. FIG. 35A shows a word employing an identical combination of time and frequency resources (⅜, $f_1$) and (1, $f_2$) on two different angle resources $\theta_1$ and $\theta_2$. This may be referred to as a [{$\theta_1$, (⅜, $f_1$)}, {$\theta_2$, (1, $f_2$)}] word. FIG. 35B shows a [{$\theta_1$, (⅜, $f_1$)}, {$\theta_2$, (⅘, $f_1$), (1, $f_2$)}] word.

Figure 36A:
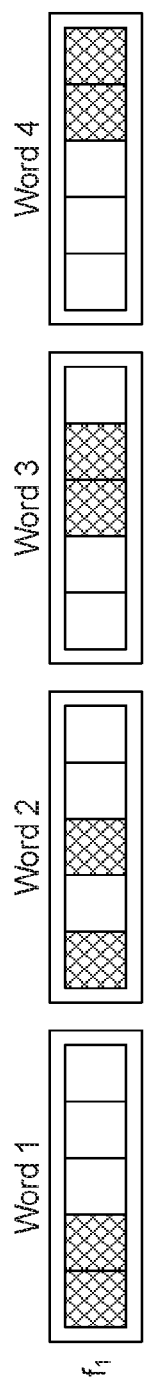
FIG. 36A shows a wakeup command employing 4-word (N=4), single angle (m=1), single frequency (k=1) and five time resources (L=5) per word.
Figure 36B:
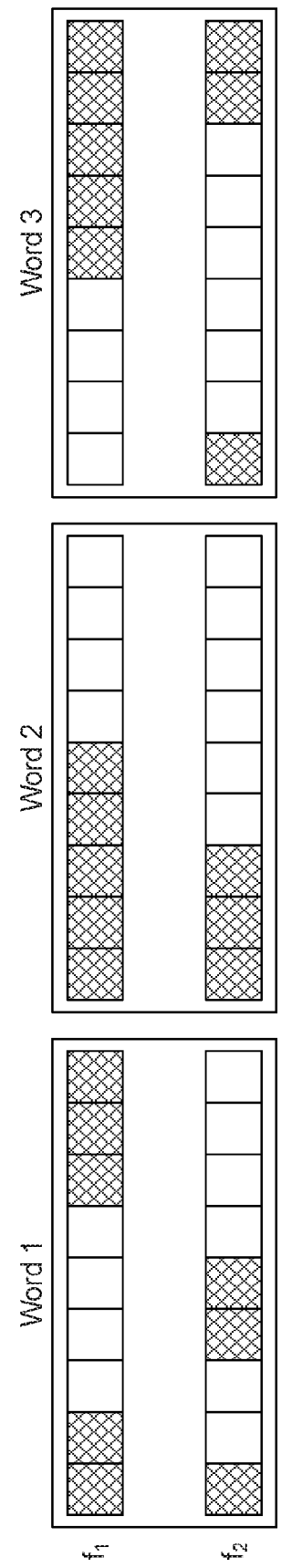
FIG. 36B shows a (3, 1, 2, 9) stored-energy threshold event stacking wakeup command employing N=3 words, m=1 angle, k=2 frequencies and L=9 time resources per word.

Referring now to FIGS. 36A-36B, diagrams illustrating an (L, m, k, N) wakeup command structure are shown. A stored-energy threshold event stacking wakeup command may employ an (N, m, k, L) combination of resources. The wakeup command may be constructed using N identical words employing m angle resources, k frequency resources, and L time resources per word. FIG. 36A shows a wakeup command employing 4-word (N=4), single angle (m=1), single frequency (k=1) and five time resources (L=5) per word. This may be referred to as a (4, 1, 1, 5) wakeup command. FIG. 36B shows a (3, 1, 2, 9) stored-energy threshold event stacking wakeup command employing N=3 words, m=1 angle, k=2 frequencies and L=9 time resources per word.

The number of words N in a wakeup message may correspond to the number of threshold events needed to trigger an interrupt in the target device. The number of time resources L per word may correspond to the range of energy (1/L to 1) that may be transmitted by a base station or combination of base stations. The duration of each time resource within a word may be a full frame or a sub frame in an LTE system. The wakeup command may, for example, employ resource blocks in the LTE control plane or data plane. The words within a wakeup command may, for example, be mapped on top of paging occasions in an LTE system.

A stored-energy quantization based wakeup command may employ an (m, k, L) combination of resources. The wakeup command may employ N distinct words corresponding to each of the N quantization level where m angle resources, k frequency resources and L time resources are used per word.

Referring now to FIGS. 37A-37D, diagrams illustrating stored-energy quantization based wakeup commands where 4 quantization levels are implemented are shown. Each of the 4 words may employ a single angle resource, a single frequency resource, and 8 time resources. The lowest quantization level may be implemented using 1 time resource out of 8 and may have a strength of ⅛. The time resource may be located anywhere in the word. The highest quantization level may be implemented using all 8 time resources and may have a strength of 1.

Figure 38:
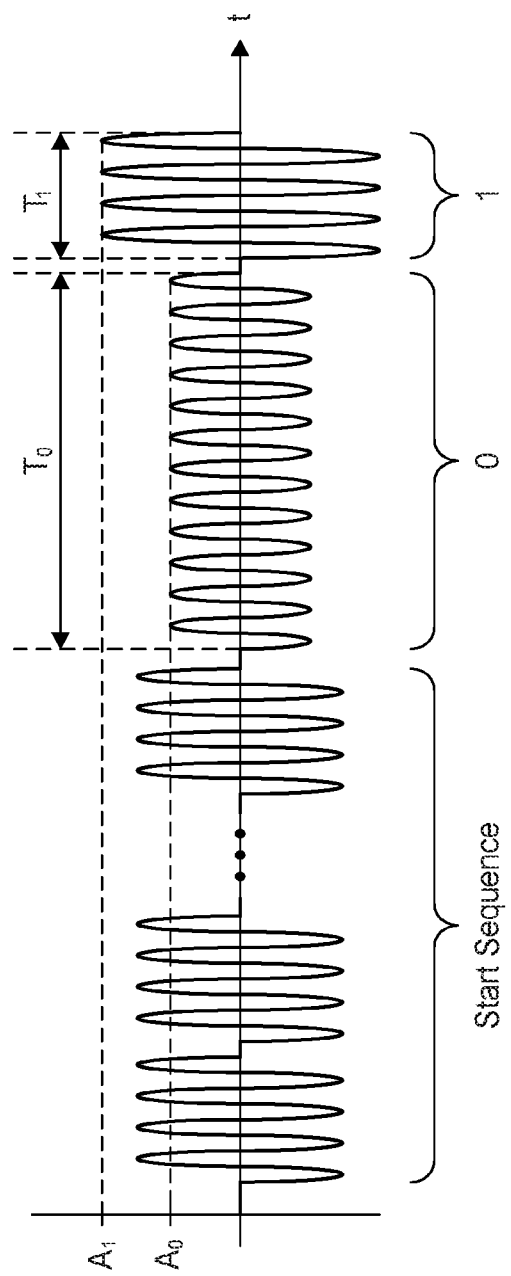
FIG. 38 is a diagram showing a constant-energy amplitude modulation waveform.

Referring now to FIG. 38, a diagram illustrating a time domain representation of a constant-energy amplitude modulated waveform used to generate stored-energy threshold event separation decoding wakeup commands is shown. The constant-energy amplitude modulated waveform may be mapped to a single word or to multiple consecutive words. The example waveform may encode a binary sequence 01. The waveform may begin with a start sequence followed by a sinusoid of amplitude A0 and duration T0 used to encode a binary bit of value 0 and a sinusoid of amplitude A1 and duration T1 used to encode a binary bit of value 1.

The criteria for selecting the amplitude and duration parameter pair {Ai,Ti} to encode binary values 0 and 1 is described below in equation 2. The two sinusoids encoding binary value 0 and 1 may have the same energy.

$$A_0^2 T_0 = A_1^2 T_1 \qquad \text{Equation 2}$$

As an example, the desired time separation between pulses to encode binary bit value 0 may be three times that of binary bit value 1. Once the amplitude and duration pair {A1,T1} representing binary bit value 1 is selected, the amplitude A0 required to encode binary bit value 0 may be calculated by setting T0=3T1, and using equation 2.

A network transmitting a signal sequence including a power optimized waveform and a broadcast, multicast, or unicast wakeup command with a unique energy signature is described herein. A device and technique for receiving a broadcast, multicast or unicast wakeup command with a passive receiver and interpreting the wakeup command by generating stored-energy threshold events in accordance with the unique energy signature embedded in the wakeup command by transferring charge from its temporary storage element to its battery is also described herein.

A network transmitting an interrogation command to determine the state of a device (e.g., its frequency offset) is described herein. The interrogation command may include, for example, an un-modulated carrier. The network may determine the state (e.g., frequency offset) of a device by examining the pseudo-random sequence modulated backscatter from the device's passive transceiver. The network may transmit a frequency correction command with a unique energy signature. A device may receive a frequency correction command with a passive receiver, interpret a unique energy signature and make adjustments to its time and frequency reference unit.

Figure 39:
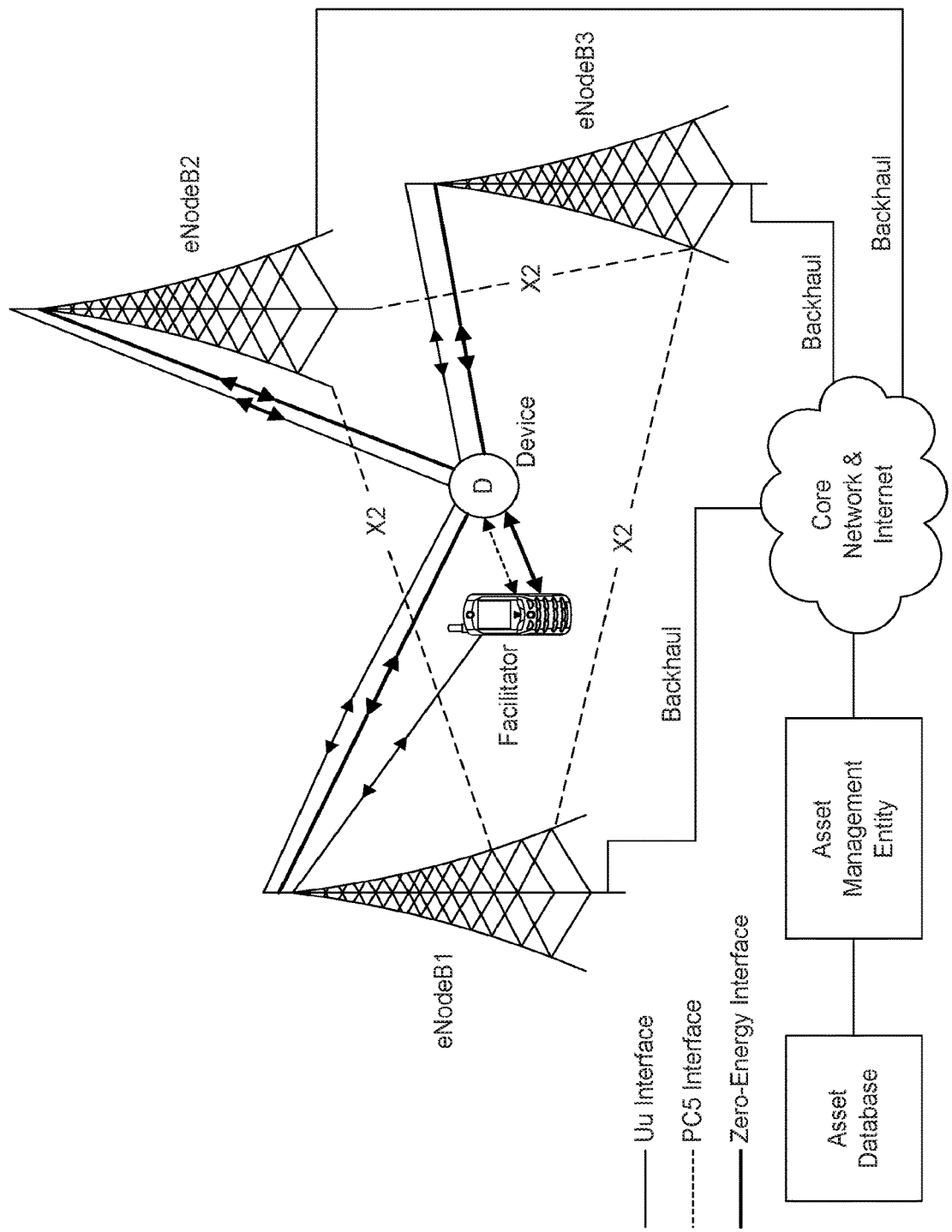
FIG. 39 is a diagram showing elements of a paging system.

Referring now to FIG. 39, a diagram illustrating elements of a network initiated on-demand zero-energy paging system is shown. The system may include one or more of an asset management entity, the core network and internet, one or more eNBs or access points, one or more facilitators, one or more devices, and a zero-energy RAN interface.

The system may utilize a single radio access technology (RAT) or multiple RATs. This includes cellular (LTE), 802.11, Bluetooth, ZigBee, NFC, RFID and the like. The facilitator may be an eNB, an access point, a remote radio head, or a WTRU. A connected appliance, a connected consumer electronic device or any other connected device with wireless communication capability may also function as a facilitator. The facilitator may be stationary or be capable of mobility. The zero-energy RAN interface may be unidirectional (downlink) or bi-directional (uplink and downlink). The zero-energy link may be realized by transmitting radio signals with unique energy signatures from eNBs, access points, facilitators, or the like, and by employing passive receivers using stored-energy thresholding methods via the devices to interpret commands carried by the radio signals.

Figure 40:
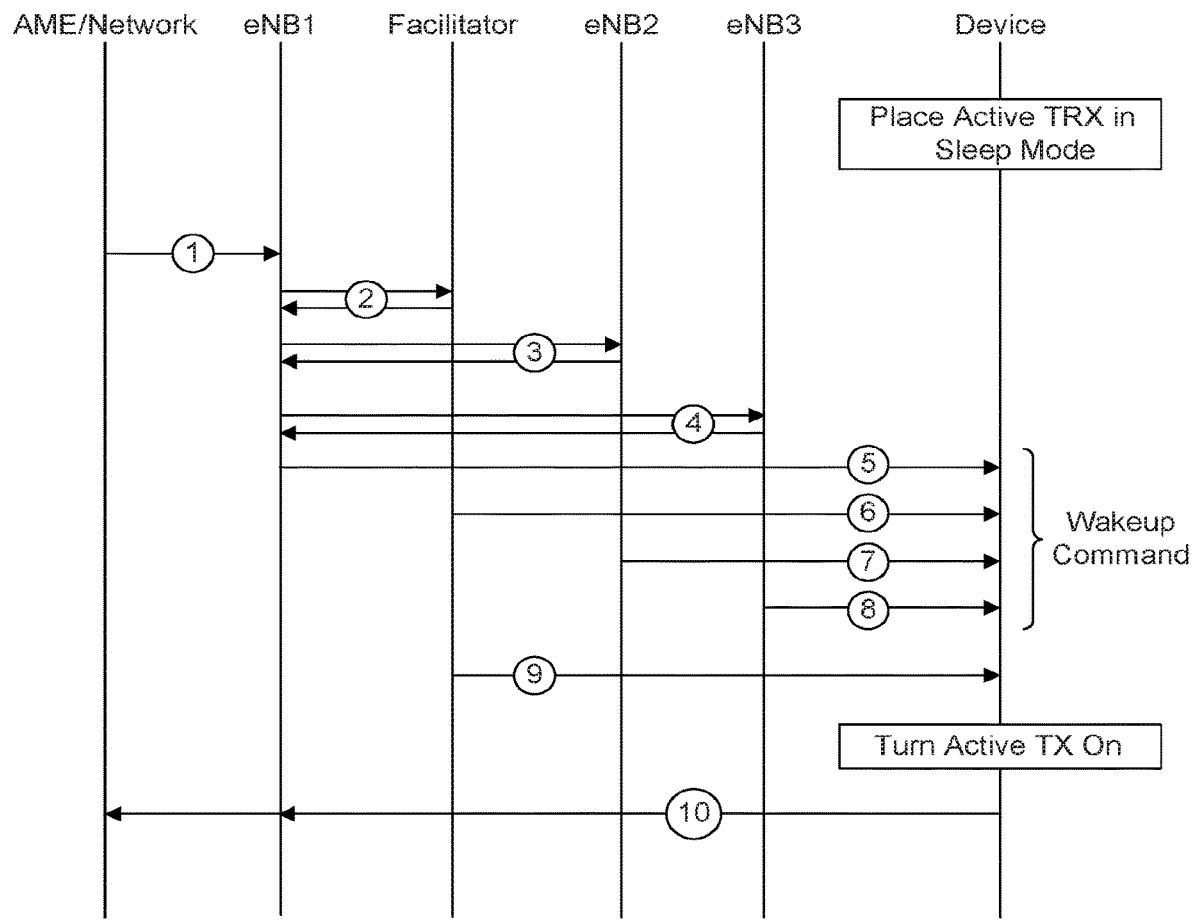
FIG. 40 is a diagram showing an on-demand zero-energy paging procedure.

Referring now to FIG. 40, a diagram illustrating the on-demand zero-energy paging procedure is shown. Once deployed, a device may enter a sleep mode. The paging procedure may be triggered by a network event. For example, an asset management entity may requests data from a device. The active receiver in the device may not be turned on during the on-demand zero-energy paging procedure. In addition to the wakeup command, a synchronization signal and UL configuration information may be received by the device using its passive receiver. The details of the proposed on-demand paging procedure are outlined below. Although provided as a list, it should be understood that these procedures may be implemented in any applicable order, one or more of the outlined steps may be omitted, and one or more steps may be added to the procedure.

In step 1, the network may instruct a first eNB (eNB1) to interrupt the sleep cycle of the device. The network may specify the priority level of the interrupt that is to be implemented. According to this example, eNB1 may be the eNodeB with which the device is currently registered. eNB1 computes the parameters (e.g., waveform type, power level, duration, frequency bands, etc.) of the wakeup command based on the specified interrupt level. eNB1 may determine if it needs to collaborate with one or more additional eNBs (e.g., eNB2, eNB3, etc.) or facilitators, in order to implement the required interrupt type.

In step 2, eNB1 may configure the facilitator (e.g., the sidelink). eNB1 may send parameters of the portion of the wakeup command to be implemented by the facilitator. eNB1 may receive confirmation from the facilitator.

In step 3, eNB1 may send parameters of the portion of the wakeup command to be implemented by eNB2 and may receive confirmation from eNB2.

In step 4, eNB1 may send parameters of the portion of the wakeup command to be implemented by eNB3 and may receive confirmation from eNB3.

In step 5, eNB1 may transmit its portion of the wakeup command.

In step 6, the facilitator may consecutively or simultaneously transmit its portion of the wakeup command.

In step 7, eNB2 may consecutively or simultaneously transmit its portion of the wakeup command.

In step 8, eNB3 may consecutively or simultaneously transmit its portion of the wakeup command.

In step 9, the facilitator may wait a predetermined amount of time and may transmit the zero-energy synchronization signal. The facilitator may examine the signal backscattered from the device's passive transceiver and may determines the frequency error of the device's frequency reference unit. The facilitator may transmit a signal containing the frequency correction instruction and the uplink configuration information.

In step 10, the device may use its passive transceiver to interpret signals received from the eNodeBs and the facilitator. The device may turn on its primary active transmitter and may send data back to the network.

Figure 41A:
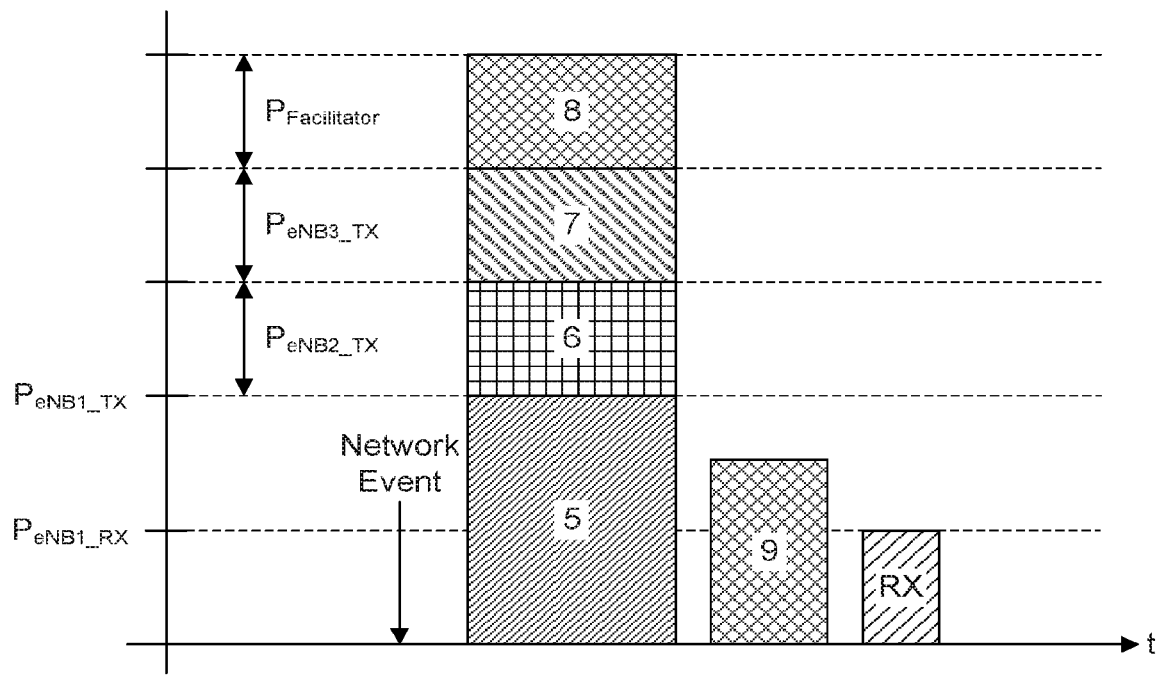
FIG. 41A shows eNodeB and facilitator signals.
Figure 41B:
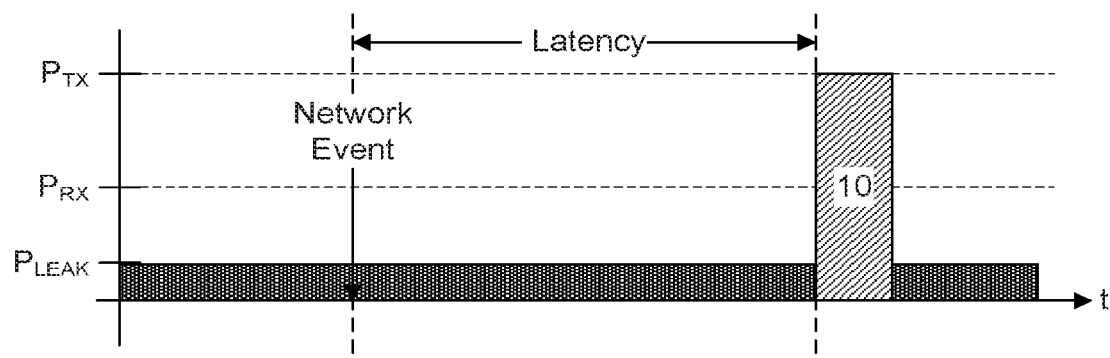
FIG. 41B shows device signals.

Referring now to FIGS. 41A-42B, diagrams illustrating a signal exchange between the device and the eNodeBs and facilitators are shown. FIG. 41A shows eNodeB and facilitator signals. FIG. 41B shows device signals. The power profiles of the eNBs, facilitator and the device are also depicted in FIG. 41. The signal power levels associated with the steps above are indicated with the same numerical designation in FIG. 41.

Figure 42:
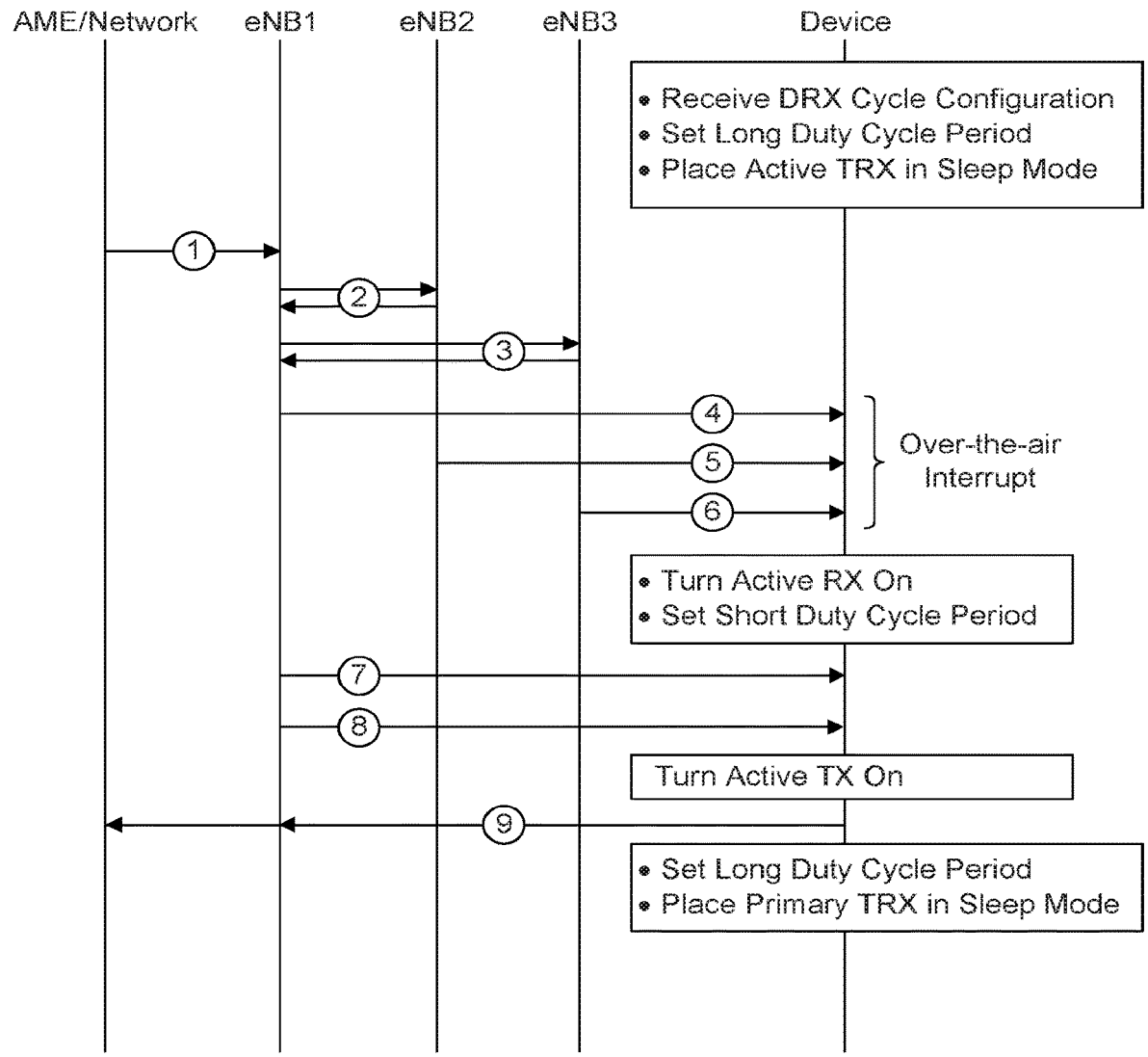
FIG. 42 is a diagram showing a paging cycle period adaptation procedure.

Referring now to FIG. 42, a diagram illustrating a hybrid paging procedure is shown. The network may implement an over-the-air interrupt driven on-demand adaptation of the device's (e.g., DRX mode) duty cycle period for high priority paging provisioning. The device may receive a DRX cycle configuration information from the network. In order to save power, the device may program its sleep counter with a long duty cycle period based on the DRX cycle configuration information received from the network. The device may then enter sleep mode. In normal operation, the network may only page the device on the agreed upon paging occasions defined by the paging cycle. The device sleep counter may be synchronized with the network's counter and the device may only wake up to decode paging messages during the programmed paging occasions.

The paging cycle adaptation procedure may be triggered by a network event. For example, an asset management entity may request data from a device. The asset management entity may indicate a priority level or a quality-of-service level. If the requested priority level is set to high, the network computes the time remaining (delay) until the next paging occasion. If the computed delay meets the requested level of service, the network may wait until the next scheduled paging occasion to page the device. If the computed delay does not meet the requested level of service, the network may initiate the paging cycle adaptation procedure. The details of such a paging cycle period adaptation procedure are outlined below.

Although provided as a list, it should be understood that these procedures may be implemented in any applicable order, one or more of the outlined steps may be omitted, and one or more steps may be added to the procedure.

In step 1, the network may instruct a first eNodeB (eNB1) to interrupt the sleep cycle of the device. The network may specify the priority level of the interrupt that is to be implemented. eNB1 may be the eNodeB with which the device is currently registered. eNB1 may compute the parameters (e.g., waveform type, power level, duration, frequency bands, etc.) of the required over-the-air (OTA) interrupt signal based on the specified interrupt level. eNB1 may determine if it needs to collaborate with one or more eNodeBs (e.g., eNB2 and eNB3) in order to implement the required interrupt type.

In step 2, eNB1 may send parameters of the portion of the OTA-interrupt signal to be implemented by eNB2 and may receive confirmation from eNB2.

In step 3, eNB1 may send parameters of the portion of the OTA-interrupt signal to be implemented by eNB3 and may receive confirmation from eNB3.

In step 4, eNB1 may transmit its portion of the OTA-interrupt signal. The device may receive the OTA-interrupt signal with its passive receiver.

In step 5, eNB2 may consecutively or simultaneously transmit its portion of the OTA-interrupt signal. The device may receive the OTA-interrupt signal with its passive receiver.

In step 6, eNB3 may consecutively or simultaneously transmit its portion of the OTA-interrupt signal. The device may receive the OTA-interrupt signal with its passive receiver. The device may turn on its primary active receiver.

In step 7, eNB1 may wait a predetermined amount of time and may transmit a synchronization signal. The device may receive the synchronization signal with its primary active receiver.

In step 8, eNB1 may transmit the uplink configuration information. The device may receive the signal containing the uplink configuration information with its primary active receiver.

In step 9, the device may turn on its primary active transmitter and may transmit data back to the network.

Referring now to FIGS. 43A-43B, diagrams illustrating a signal exchange between the device and the eNodeBs are shown. FIG. 43A shows eNodeB power profile and signals. FIG. 43B shows device power profiles and signals. The signal power levels associated with the numbered steps above are indicated with the same numerical designation in FIG. 43. FIG. 43A illustrates the Tx and Rx based power consumption by the network components eNB1, eNB2, eNB3, as associated with the steps outlined above. FIG. 43B illustrates the Tx and Rx based power consumption by the WTRU as associated with the steps outlined above.

In implementing the OTA-interrupt, the PeNB and the SeNBs may collaborate in a manner where the SeNBs transmit an additive amount of power on the same frequency as depicted in FIGS. 43A-43B. The SeNBs may also transmit portions of the OTA-interrupt signal on different carrier frequencies.

Figure 44:
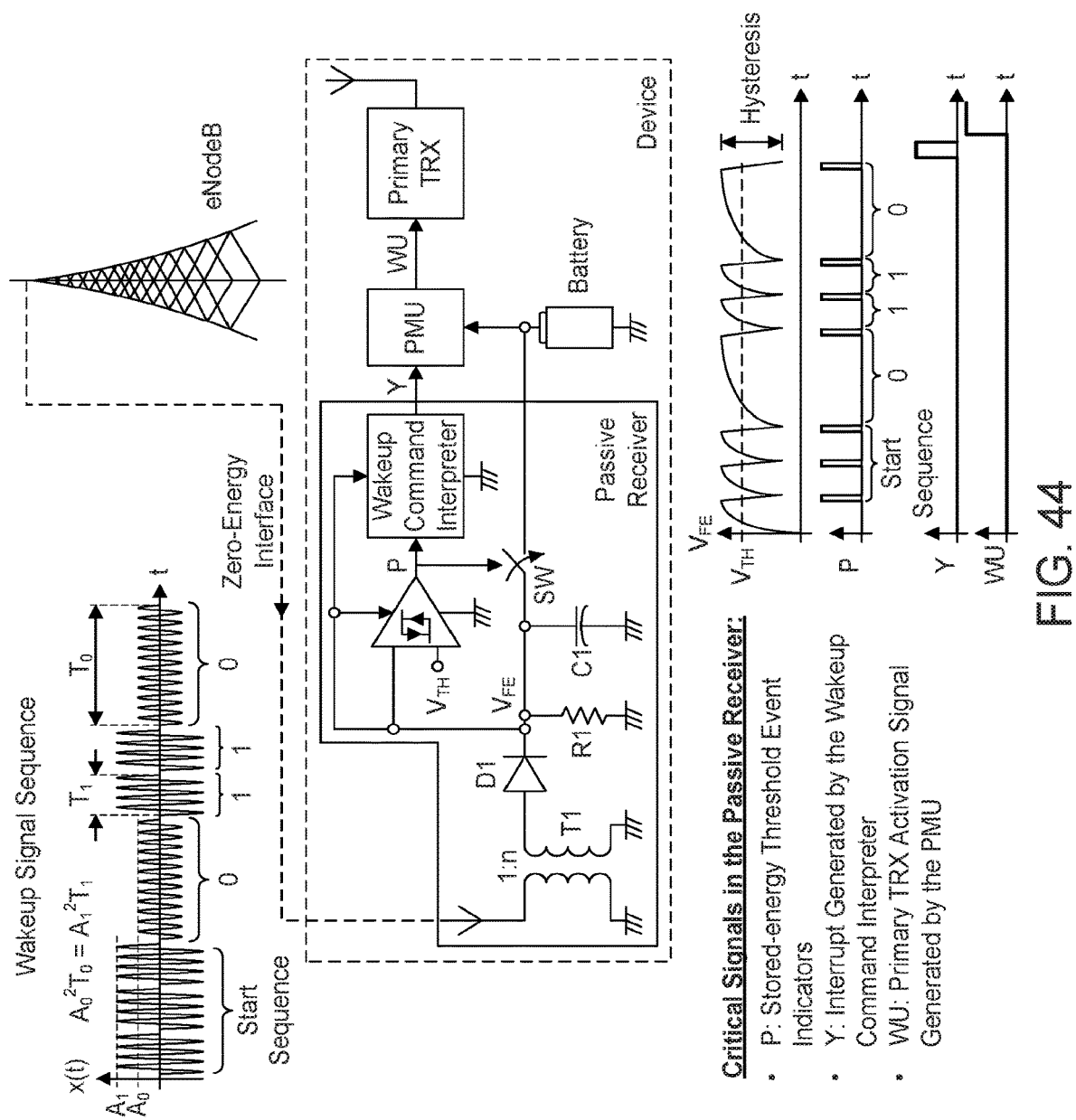
FIG. 44 is a diagram showing an on-demand zero-energy wakeup procedure.

Referring now to FIG. 44, a diagram illustrating a zero-energy wakeup procedure is shown. A device may include one or multiple primary active transceivers (TRXs), one or multiple passive receivers, a power management unit (PMU) and a battery. The passive receiver may include a rectifier illustrated by diode D1 and resistor R1, a temporary storage element illustrated by capacitor C1, and analog-to-information A2I converter (comparator) and a wakeup command interpreter.

The network may transmit a signal sequence including a power optimized waveform (POW) and a broadcast, multicast or unicast wakeup command with a unique energy signature. The POW may for example include a single-frequency or multi-frequency sinusoidal pulses. The wakeup command with a unique energy signature may be constructed, for example, using stored-energy event stacking, stored-energy event quantizing or stored-energy event separation encoding principles.

The device may harvest energy from the POW and the wakeup command in the transmitted signal sequence. The harvested energy may be stored in a temporary storage element (capacitor C1). This stored energy may be used to power the A2I and the wakeup command interpreter in the device's passive receiver.

The device may receive a broadcast, multicast or unicast wakeup command with its passive receiver and interpret the wakeup command by generating stored-energy threshold events in accordance with the unique energy signature embedded in the wakeup command by transferring charge from its temporary storage element to its battery. The device may monitor the amount of stored energy in its temporary storage element (capacitor C1) with its A2I converter in its passive receiver. If the amount of energy or charge stored as indicated by the voltage $V_{FE}$ in the temporary storage element (capacitor C1) exceeds a pre-determined threshold, the A2I converter may transfer this stored charge from the temporary storage element to the battery thereby emptying the temporary storage element and reducing the voltage $V_{FE}$ below the threshold. The A2I may generate a pulse P at its output each time a charge transfer takes place.

Depending on the structure of the wakeup command, this process of charge transfer may be repeated several times. The wakeup command interpreter may examine the pulse train P and if the pulse train matches the pattern that was assigned to the device by the network, the wakeup command interpreter generates an interrupt Y. Upon receiving the interrupt Y, the power management unit (PMU) may generate a wakeup signal WU used to activate the devices primary transceiver (TRX). The A2I converter threshold voltage $V_{TH}$ and the pulse pattern P may be configured by the network before the device enters sleep mode.

Range extension procedures may be employed by the network to wakeup target devices that may experience significant signal quality degradation such as devices that are far away or behind an obstacle. Range extension may be accomplished by beam forming and/or increasing the power and/or duration of the constituent words in a wakeup command. The required power and/or time duration for a device may be derived from an estimate of the path loss reported by the device before it enters sleep mode. Alternatively, the network may step through a set of power and time duration settings to implement an energy ramping procedure. The network may implement a blind ramping procedure where it steps through multiple or all power and/or time duration setting. The network may also implement a ramping procedure with feedback such that the network waits a pre-configured amount of time after every power and time duration setting. If the device responds with a wakeup acknowledgement during this pre-configured window the network may terminate the ramping procedure.

According to an embodiment of the disclosed subject matter, a procedure for wakeup command false alarm suppression may be implemented. Robust wakeup commands may be implemented to prevent scenarios where a device in sleep mode spuriously wakes up (causing false alarms) in response to ambient RF energy in the environment caused by unrelated transmissions. Employing multi-angle and multi-frequency words when constructing a wakeup command may reduce false alarms. Employing compound wakeup commands such as a stored-energy threshold event stacking command combined with a stored-energy threshold event separation encoding wakeup command may also mitigate false alarms. The device may make, for example, path loss measurements and inform the network. Based on the reported measurement, the network may determine the level of false alarm mitigation needed and configure the device appropriately before it enters sleep mode.

A procedure for pseudo-random backscattering zero-energy synchronization may be implemented. Frequency and timing synchronization is a procedure that reduces the frequency and timing offsets between two nodes to enable an acceptable communication link. One of the nodes or another node (e.g., GPS signals) may be used as the reference to reduce both frequency and timing offsets.

A procedure, a method, and an apparatus that utilizes backscattering based zero-energy wakeup confirmation and synchronization procedure may be described herein. A node transmitting the wakeup command may also determine the frequency offset of the intended or target device and assist setting up timing synchronization. The transmitting node (or interrogator) may determine frequency offset by using a pseudo-random sequence modulated backscattered tone from the target device's passive transceiver (TRX). The modulated backscattered tone may reflect the main VCO offset at the target device. The transmitting node may also send time stamps that may determine frame, slot, and/or symbol timing in reference to the wakeup sequence timing.

The target devices may get their particular wake-up codes or sequences as part of an initial device discovery process. Alternatively or in addition, the necessary information for wake-up procedures such as unique wake-up energy signature with other parameters for the passive TRX may be signaled by the network and received by the target devices via the active TRX prior to the sleep procedure activation. The necessary parameters such as a pseudo-random code index may also be sent to a particular device ID after a common wakeup energy sequence. The device ID may be assigned a priori or during initial network attachment procedure.

Figure 45:
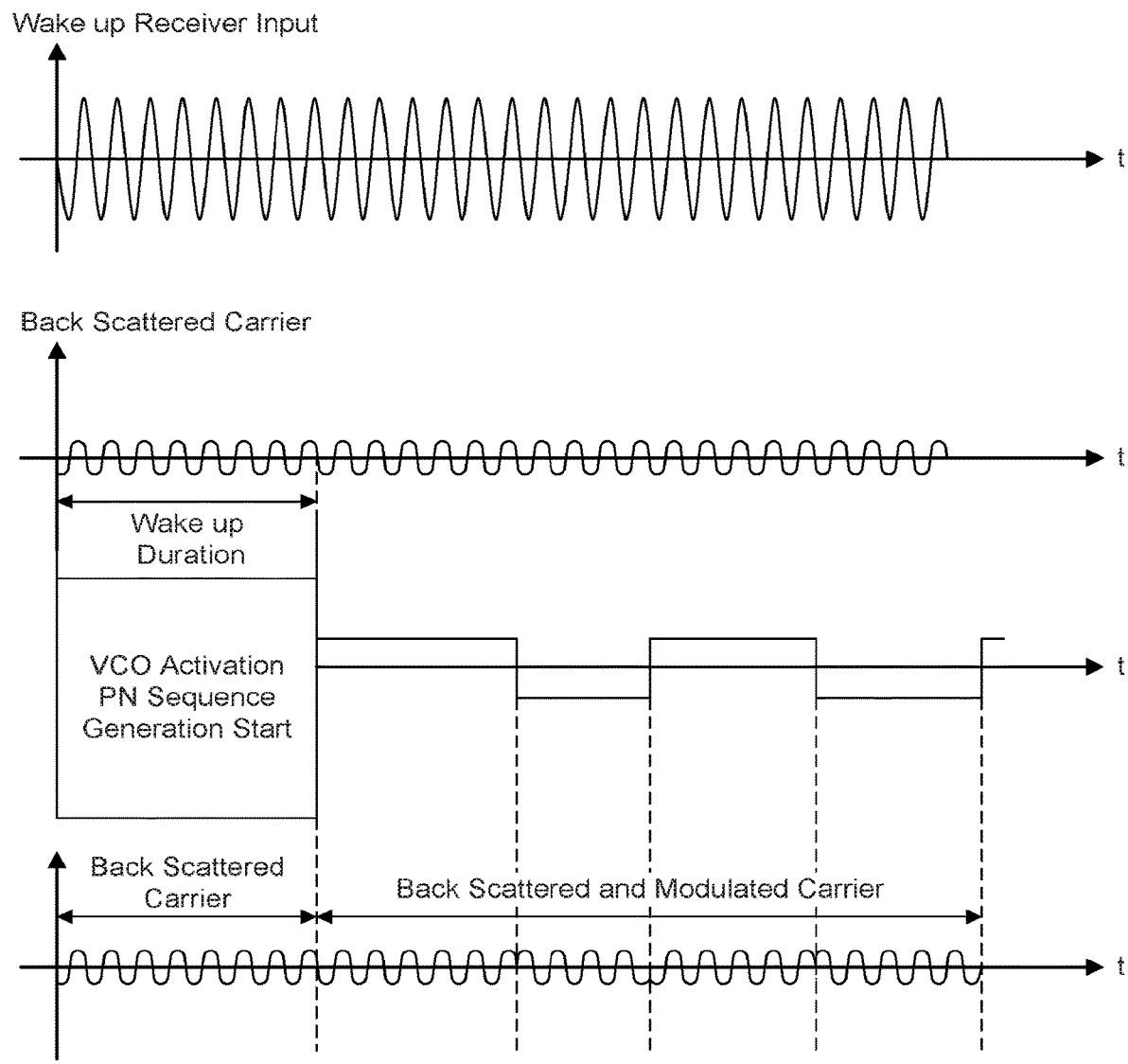
FIG. 45 is a diagram showing a backscattered and modulated carrier.

Referring now to FIG. 45, a diagram illustrating a backscattered and modulated carrier is shown. During the wake-up process, a node transmitting wakeup commands may estimate the initial frequency offset of the passive TRX in the target device. The interrogator's receiver may exploit backscattering techniques to determine initial frequency offset of the passive TRX in the target device where the reception of wakeup command with a unique energy signature may trigger the transmission of a pseudo-random (PN) code.

Referring now to FIG. 46, a diagram illustrating a detection procedure is shown. When a device specific wake-up command is detected, the passive TRX may start generating the PN sequence that modulates the back-scattered carrier. The back-scattered modulated carrier may reflect the target devices' frequency and time reference unit (FTRU) frequency offset. The FTRU may be used as the reference clock source by both passive TRX and the active TRX in the target device. The reference clock offset may be controlled by the FTRU.

Once the interrogator transmits the wake-up command, it may start receiving the device specific wakeup confirmation by means of PN code detection. The interrogator may have a priori knowledge about the expected PN sequence for each device. When the interrogator successfully detects the expected PN code, the wake-up process may be confirmed to be successful. During the PN code reception, the interrogator may estimate the initial frequency offset of the passive TRX in the target device. The estimated offset may be signaled back to the passive TRX to correct FTRU reference clock offset. The frequency correction procedure may utilize open or close loop approaches and may exchange multiple messages between the interrogator and the passive TRX in the target device. The interrogator may also send time references with respect to active TRX along with the estimated frequency offsets.

The PN sequence detection and frequency offset estimation algorithms may utilize parallel processing units to expedite the detection and estimation processes. Also, a single processing unit may be utilized over multiple offset setting with iterations to determine the initial frequency offset to trade off the complexity. This tradeoff may, however, increase detection and estimation latency.

Referring now to FIG. 47, a diagram illustrating a frequency offset estimator is shown. A method to estimate the frequency offset may employ two PN sequences (i.e., the same or different sequences with same or different lengths) where the passive TRX may modulate the back-scattered carrier with the two PN sequences. In the case of AWGN channel only, the interrogator may determine two peaks with two complex numbers for each PN sequence. The frequency offset may be estimated by taking the phase difference between the two complex numbers, and then dividing the result by the time difference of the peak locations multiplied by a normalizing coefficient, as shown in FIG. 47. The process may be initiated by the last know offset value that may be kept in non-volatile memory.

The matched filter (MF) may be designed for the PN sequence. The output of MF may be passed through a power convertor, and then integrated over N iterations where N may be from 1 to a particular number. Once the integration period is over, a maximum element and its location may be determined and compared to a threshold. If the threshold is met, the PN sequence detection may be successful. The detection process may be prone to large initial frequency offsets and, therefore, artificially shifted input samples may be used at different frequency offsets with phase rotation only or phase rotation and timing drift, to guarantee detection. The process may be performed in parallel with multiple HW units to expedite the detection process. When the detection process is completed, the peak location may be associated as a "max index". The sample extractor may take samples as depicted in FIG. 47.

A range extension procedure may be used by the interrogating node to wake up devices either far away or behind an obstacle with significant signal quality degradation. The node may set up a timer to wait for an expected response from a targeted device starting from the transmission of a wakeup command. If an expected response is not received by the interrogator, it may start deploying extended range procedures for PN sequence detection and frequency offset estimations.

When enough energy is harvested by a device and when a device wakeup command is detected, the received tone may be continuously modulated with its predefined or network instructed PN sequence. The device, associated with a PN sequence, may be known by the interrogator node prior to performing a PN sequence detection process. The interrogator nodes may accumulate MF outputs after the power conversion block, as shown in FIG. 46, over T periods, where T is the length of the PN sequence and, determine the peak value and its index location (e.g. index may vary from 0 to T−1). The peak value may be compared to a particular threshold to keep the false alarm rate under a target value. The threshold may be set differently for each number of integration periods. The integration buffer may be reset after a number of integration (N). Once the peak is determined to be above the threshold, the detection may occur.

In the case that the detection occurs only after N integration, the interrogator may use the frequency offset estimation by averaging N results before sending it to the target device with increased processing gain that may be equivalent to N integration or better. The device may be informed about the format as part of initial device attachment, factory default, and/or parameters provided before entering a sleep mode. The interrogator may also indicate the range extension format by encoding predefined fields. The device may look for normal or range extension mode formats and decode them in parallel.

The network may transmit a signal sequence consisting of a power optimized waveform and a broadcast, multicast, or unicast wakeup command with a unique energy signature.

A device may receive the broadcast, multicast, or unicast wakeup command with a passive receiver and may interpret the wakeup command by generating stored-energy threshold events in accordance with the unique energy signature embedded in the wakeup command by transferring charge from its temporary storage element to its battery.

The network may transmit an interrogation command to determine the state of a device (e.g., its frequency offset). The interrogation command may include an unmodulated carrier. The network may determine the state (e.g., frequency offset) of a device by examining the pseudo-random sequence modulated backscatter from the device's passive transceiver. The network may transmit a frequency correction command with a unique energy signature.

The device may receive a frequency correction command with a passive receiver. The device may interpret a unique energy signature and may make adjustments to its time and frequency reference unit.

In addition to, or as an alternative to, the standard methods for transmitting system information, the network may broadcast a tracking area update (TAU) command utilizing a specialized radio beacon with a unique energy signature. The TAU command may employ a frame structure that includes a preamble and a body. The TAU command frame body may, for example, contain a tracking area code (TAC). The network may employ all or a subset of elements (angle, frequency, time) in the resource cube when broadcasting a TAU command. The frequency resources may include a mix of carriers and sub-carries. The carriers may be contained in a single frequency band or in multiple frequency bands. SEQ, SET, or SETES methods may be used to construct the radio beacon. The network may also combine multiple methods to create hybrid methods when constructing the beacon used to broadcast the TAU command. The beacon may be constructed with a single or multi frequency SEQ, SET, or SETES methods. The network may broadcast TAU commands from one, a few or all eNBs in a tracking area (TA). This may be done in a periodic manner or at random intervals.

In addition to, or as an alternative to, the standard methods for accessing system information, a device may receive a TAU command with a passive receiver and interpret a unique energy signature to access system information (e.g. TAC). The device may employ stored energy quantization, stored energy threshold event counting or stored energy threshold event separation decoding methods to interpret a unique energy signature. These methods may be used in a standalone manner or combined to create hybrid methods for interpreting a unique energy signature. A device may employ a look-up table (LUT) based approach to trigger a tracking area update (TAU) procedure. The device may store a tracking area list (TAL) representing its current known location in an LUT. The TAL-LUT may be stored in local memory and may be accessible while the device is in sleep mode. The device may access system information using a passive receiver while in active or in sleep mode. Once the system information (e.g. TAC) has been retrieved, the retrieved TAC of the cell whose coverage area the device is currently within may be compared against the TACs in the stored TAL-LUT. If no match is found, the device may wake-up, if in sleep mode, and use its active transceiver to perform a TAU procedure. Once the TAU procedure is completed, the device may update its TAL-LUT and enter sleep mode.

Figure 48:
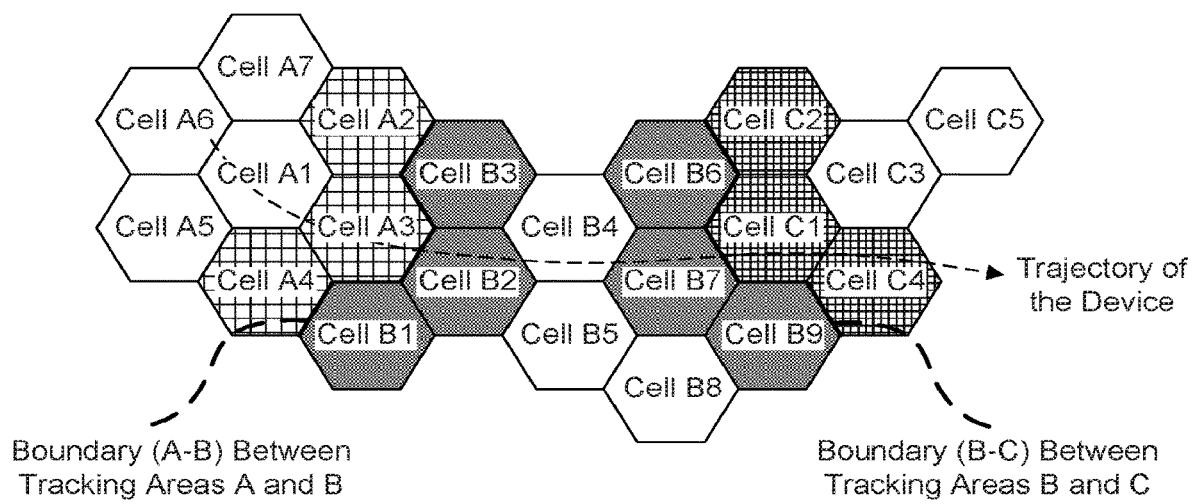
FIG. 48 is a diagram showing deployment of cell clusters transmitting radio beacons on distinct frequencies to indicate TA boundaries.

Referring now to FIG. 48, a diagram illustrating cell clusters is shown. The network may deploy multiple cell clusters that broadcast TAU commands on distinct frequencies to identify tracking area (TA) boundaries. The TAU commands may employ a frame structure that includes a preamble and a body. The TAU command frame preamble may contain a TA boundary indicator code and the frame body may, for example, contain a tracking area code (TAC). The cell clusters may include one or more cells and may constitute a part or all of a TA. The cell clusters may be concentrated, for example, near the TA boundaries as illustrated in FIG. 48.

A device may identify a TA boundary crossing by detecting a change in the carrier frequency of consecutively received TAU commands. The device may include multiple passive receivers with TAU command interpreters preconfigured to operate on distinct carrier frequencies. Each passive receiver may decode the preamble of a received TAU command and generate an interrupt when a TA boundary indicator code is decoded. The device may keep count of the number of interrupts generated, each representing the detection of a change in carrier frequency. The number carrier frequency changes may be compared to a TA boundary-crossing threshold. If the number of detected TA boundary crossings exceeds this threshold the device may wake-up, if in sleep mode, and use its active transceiver to perform a TAU procedure.

The network may deploy facilitators to enable a device to perform a zero-energy TAU procedure using its passive transceiver that employs indirect modulation (also known as backscattering) while remaining in sleep mode. The facilitator may be an eNB, an access point, a remote radio head, or another device. A connected appliance, a connected consumer electronic device or any other connected device with wireless communication capability may also function as a facilitator. The facilitator may be stationary or be capable of mobility. The facilitator and the device may be in close proximity to one another and within the coverage area of the same cell. The facilitator may access network system information to learn the TAC of the cell that it is currently attached to. The facilitator may transmit an unmodulated carrier and the device may include a passive transceiver employing indirect modulation (also known as backscattering) to communicate with the facilitator. The facilitator may read the TAL-LUT stored in the device and compare the TAC of the cell that it is currently attached to against the TACs in the retrieved TAL from the device. If no match is found, the facilitator may perform a TAU procedure on behalf of the device. Once the zero-energy TAU procedure is completed the facilitator may update the TAL-LUT stored in the device.

Wakeup configuration and signaling schemes may be implemented as described herein. Several WTRUs with passive wakeup transceivers may be served by an eNB. The eNB may employ wakeup commands with unique energy signatures to wake up the WTRUs. The following description includes possible signaling schemes by which an eNB could configure the unique energy signature associated with the WTRUs.

A group specific energy signature may be used for waking up specific class of WTRUs. Tje group specific energy signature may be broadcast as a part of system information message (e.g., SIB-2/SIB-3 etc.). An example signaling in SIB-2 is shown below in Table 2.

TABLE 2

| SystemInformationBlockType2 ::= | SEQUENCE { |
|---|---|
| radioResourceConfigCommon | RadioResourceConfigCommonSIB, |
| ue-TimersAndConstants | UE-TimersAndConstants, |
| freqInfo | SEQUENCE { |
| ul-CarrierFreq | ARFCN-ValueEUTRA |
| ul-Bandwidth | ENUMERATED {n6, n15, n25, n50, n75, n100} |
| additionalSpectrumEmission | AdditionalSpectrumEmission |
| }, | |
| Zero-energy signature seqeunce assignment | SEQEUNCE{ |
| UE-class1 | $s_1$ |
| UE-Class2 | $s_2$ |
| ......... | |
| ......... | |
| } | |

The values $s_1$ and $s_2$ may be multi-cast energy signature sequences assigned for waking up WTRUs belonging to class-1 and class-2 respectively.

The eNB may signal WTRU-specific energy signals as a part of an RRC message. In Table 3, the signature sequence may be signaled on the PCCH logical channel.

TABLE 3

| RRC_LTE: PCCH-message | |
|---|---|
| PCCH-Message ::= SEQUENCE { | |
| message | PCCH-MessageType |
| } | |
| PCCH-MessageType ::= CHOICE { | |
| c1 | CHOICE { |
| signature sequence | $e_1$ |
| }, | |

The signature sequence $e_1$ may be assigned to the WTRU. If a WTRU receives a signature assignment from both the common broadcast message (e.g., a system information message) and WTRU-specific messaging (e.g., RRC), the WTRU may use the signature assignment received by WTRU-specific messaging.

Alternately, the EUTRAN may also signal the signature assignment using both the common broadcast message and WTRU-specific messaging. In the examples shown above, $s_1$, $s_2$ could denote a set of sequences (e.g., $s_1=\{a_1, a_2, a_3, a_4\}$, $s_2=\{b_1, b_2, b_3, b_4\}$, where $a_i$, $b_i$ are signature sequences) that are transmitted through common broadcast (e.g., SIB), and $e_1$ could denote an integer that signifies the position of the sequence in the sequence set. For the case when WTRU receives $s_1$, in the SIB, and $e_1$=2 in RRC, the assigned sequence would be $a_2$.

Figure 49:
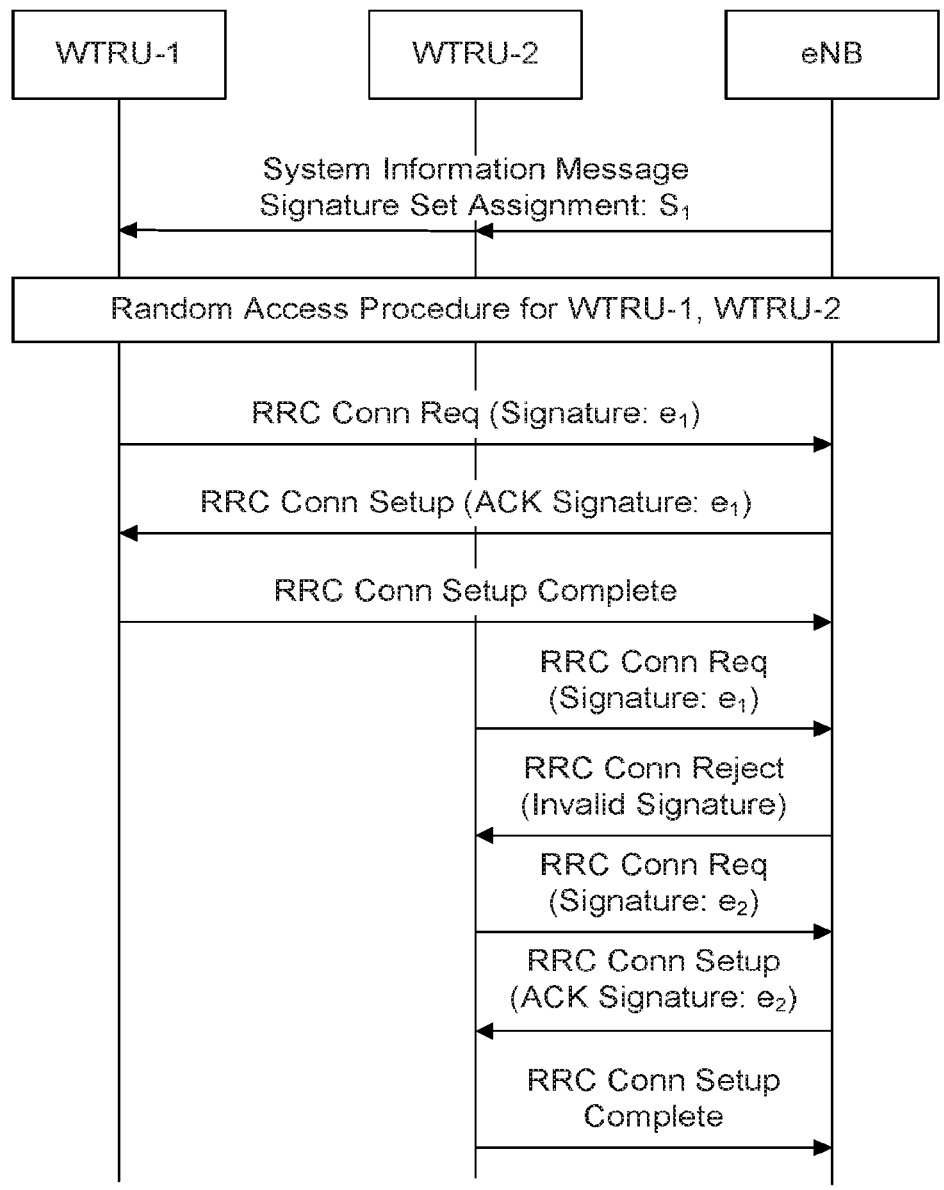
FIG. 49 is a diagram showing a WTRU initiated wakeup command entry signature assignment procedure

Referring now to FIG. 49, a diagram illustrating a WTRU initiated wakeup command energy signature assignment procedure is shown. The WTRU may choose a signature sequence and signal the eNB regarding its chosen sequence. The eNB may confirm that no other WTRU has selected the same signature sequence. The WTRU may choose the signature sequence independently or with assistance from EUTRAN. The steps of the latter procedure are described herein. It will be understood that one or more steps outlined below may be performed in a different order than presented herein and that one or more steps may be added to or removed from the steps stated below.

The eNB may provide the sequence set (e.g., $s_1$) using SIB signaling. The WTRU may randomly choose a sequence in the sequence set (e.g., $e_1$) as a part of RRC connection request. The eNB may reject or confirm the selected sequence based on whether the sequence has already been selected by the other WTRU. WTRU2 may select the same sequence as selected by WTRU1. The eNB may reject the selected sequence and WTRU2 may repeat the sequence selection step (i.e., RRC Connection Request).

Figure 50:
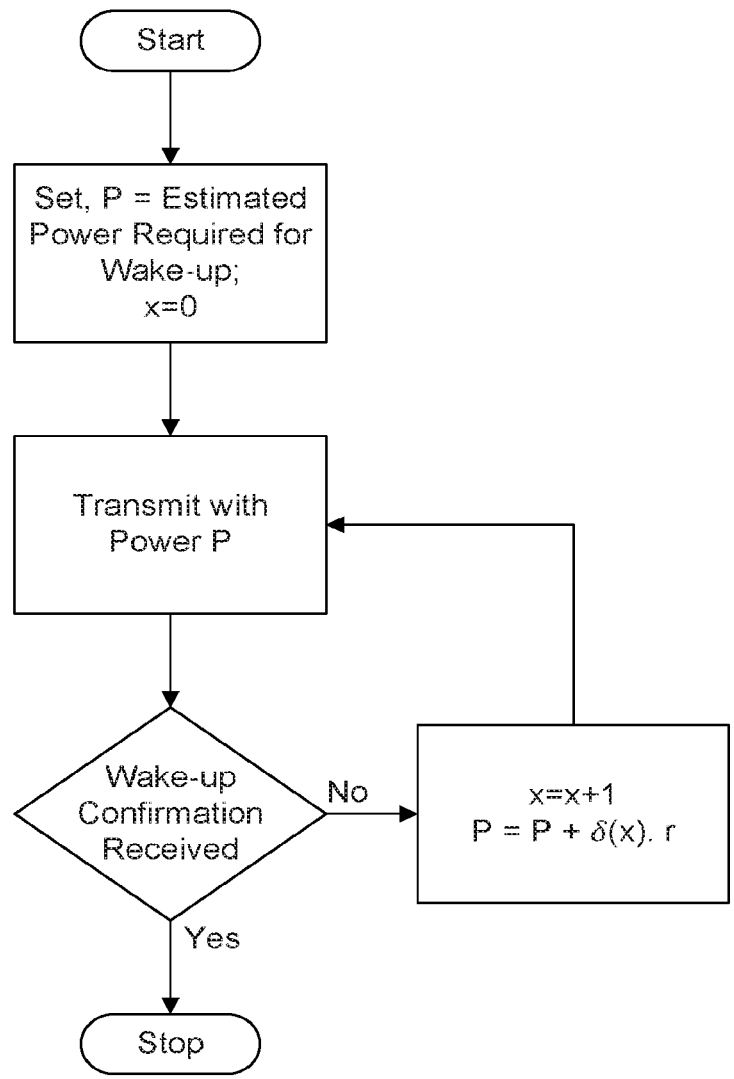
FIG. 50 is a diagram showing adaptive power transmission for a wake-up process.

Referring now to FIG. 50, a diagram illustrating adaptive power transmission for the wake-up process is shown. The amount of power allocated for waking up a sensor may be dynamic. The amount of power may depend on the number of unsuccessful attempts that have occurred attempt to wake up the sensor. This method may ensure that the right amount of power increase is performed at times that provide an acceptable tradeoff in waking up the senor and avoiding interference. For a first time instant, a minimum required power may be used. For every subsequent unsuccessful attempt, the power may be increased in steps until a wake-up confirmation is received. More precisely, power allocation at time t, may be written as:

$$P_t = P_{t-1} + \delta(t-1)r. \quad \text{Equation 3}$$

The variable r may represent the power step size increment. $\delta(x)$ may represent the rate of increase provided at every time instant. As an example, $\delta(x)=x^2$ may represent a quadratic increase at every unsuccessful attempt. On the other hand, $\delta(x)=c$ may represent a constant increase at every unsuccessful instant. The aforementioned scheme may depend on wake-up confirmation, so as to be able to adapt the transmit power allocation at every unsuccessful instant.

A 'blind' scheme where the transmitter does not expect to receive wake-up confirmation may occur. In this case, there may be a fixed number of re-transmissions for waking up the sensor with a power increase of $\delta(x)$.

A primary eNB may monitor the system information-2 (SIB-2) broadcast messages of the neighboring cells. The primary eNB may infer the amount of the power that is provided by the neighboring cells in the resource blocks of interest and the amount of additional power that it may need to provide for waking up the sensor. It will be understood that one or more steps outlined below may be performed in a different order than presented herein and that one or more steps may be added to or removed from the steps stated below.

In step 1, the primary eNB may infer the energy per resource element (EPRE) for the reference signal of neighboring cells.

In step 2, the primary eNB may read the value of p-b from SIB-2 defined as $\rho_B/\rho_A$, where $\rho_B$ is the reference signal power, and $\rho_A$ is the PDSCH power.

From steps 1 and 2, the primary eNB may obtain the PDSCH power per EPRE provided by the neighboring cell i, to be $P_i^{pdsch}$. Assuming that the primary eNB allocates N resource blocks for waking up a sensor, the estimated power on these resource blocks contributed by a neighboring cell i, may be obtained to be $P_i'=P_i^{pdsch} \times N_{RB} \times N$, where $N_{RB}$ denotes the number of resource elements per resource block.

The amount of additive power required to wake up the sensor may be estimated as $\tilde{p}=P-\Sigma_n P_n'+\delta$, where P is the required total power to wake-up the sensor, and the quantity $\delta$ lumps the estimation error of neighboring cell's power, and the path losses that needs to be compensated by each of the cells.

Figure 51:
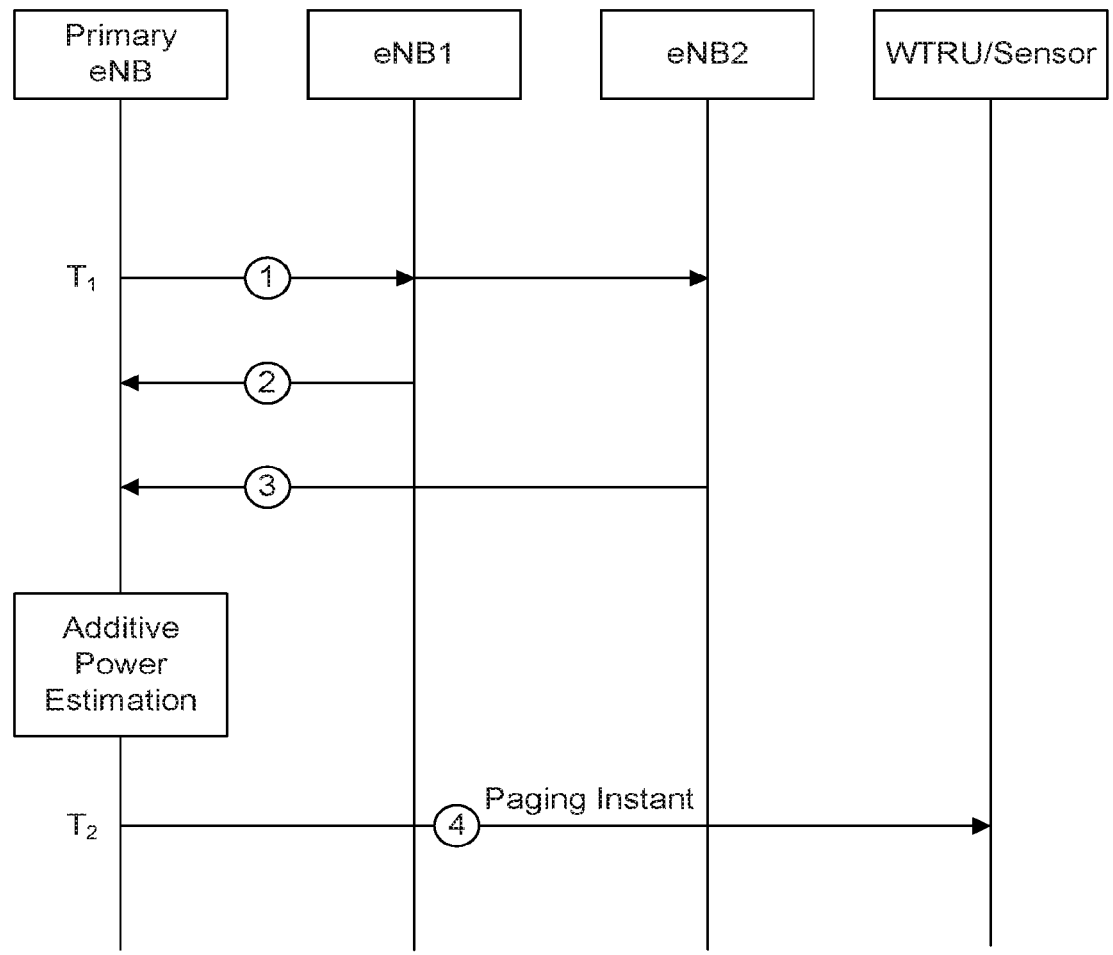
FIG. 51 is a diagram showing resource block (RB) usage information sharing amount eNBs for primary additive power estimation.

Referring now to FIG. 51, a diagram illustrating RB usage information sharing based TX power adaptation of coordinating eNBs is shown. The primary eNB may request power allocation in its resource blocks of interest to the neighboring cells (secondary eNBs) explicitly through the X2 interface. Based on the power allocation by the neighboring cells, the primary eNB may estimate the required power quite accurately.

In step 1, the primary eNB may send out a request for neighboring cells to provide power allocations on its resource blocks of interest (i.e., the resource blocks intended to be used for wake-up purposes) for the next T's, where $T'>(T_2-T_1)$. Assuming that $T_2$ denotes the time instant at which WTRU/sensor needs to be paged, $T_1$ may be chosen based on the backhaul delay, which in turn depends on the inter-site distances between primary eNB and the requested cells, to ensure availability of information from the neighboring cells before the paging instant.

Power allocation may be provided by the neighboring cells in a non-causal manner if eNBs perform semi-persistent scheduling. Further, instead of explicitly requesting for power allocation by the primary eNB on specific resource blocks, the neighboring cells may report power allocation on a wider set of resource blocks provided they include the resource blocks of interest on a periodic basis. The primary eNB may use the latest received allocation or an average received over the last several instances, as a good estimate. An advantage of this scheme is that there is no implicit deadline before the paging instant by which the primary eNB needs to request power allocations from neighbors, albeit at the cost of accuracy.

In step 2 and step 3, the power usage information for the near future may be provided by the neighboring cells based on predetermined power allocation that it follows or based on semi-persistent scheduling mechanisms.

In step 4, a paging instant transmission may be sent from the Primary eNB to a WTRU or sensor.

The network may broadcast a group-specific unique energy signature as part of the system information message (e.g. SIB-2, SIB-3) to wake-up a specific class of devices. The network may broadcast a device-specific unique energy signature as a part of the RRC message (e.g., signaled on the PCCH logical channel) to wake-up a specific device. The network may broadcast system information (e.g. tracking area identity, tracking area code, etc.) using a tracking area update (TAU) command with a unique energy signature. A device may receive a TAU command with a passive receiver, interpreting a unique energy signature to access system information and trigger a tracking area update procedure.

The description above may be applied to IEEE 802.11 systems. An AP may use a specialized beacon i. The beacon frame may be dual purpose. The beacon frame may be a conventional beacon frame and/or a wakeup beacon frame. An OFDM symbol constituting the wakeup beacon frame may include a unique pilot sequence in a set of preconfigured sub-carriers. The wakeup beacon frame may include a unique energy signature.

An STA may receive a wakeup beacon frame with a passive receiver, decode a unique pilot sequence in a preconfigured set of sub-carriers of the OFMD symbol constituting the beacon frame, interpret a unique energy signature, and generating a wakeup interrupt.

The following description includes using a specialized beacon transmission to wake up a STA. The specialized beacon may serve as a conventional beacon frame for the STAs, and may serve as a wake-up signal with a unique energy signature for the passive receiver in the STAs.

Figure 52:
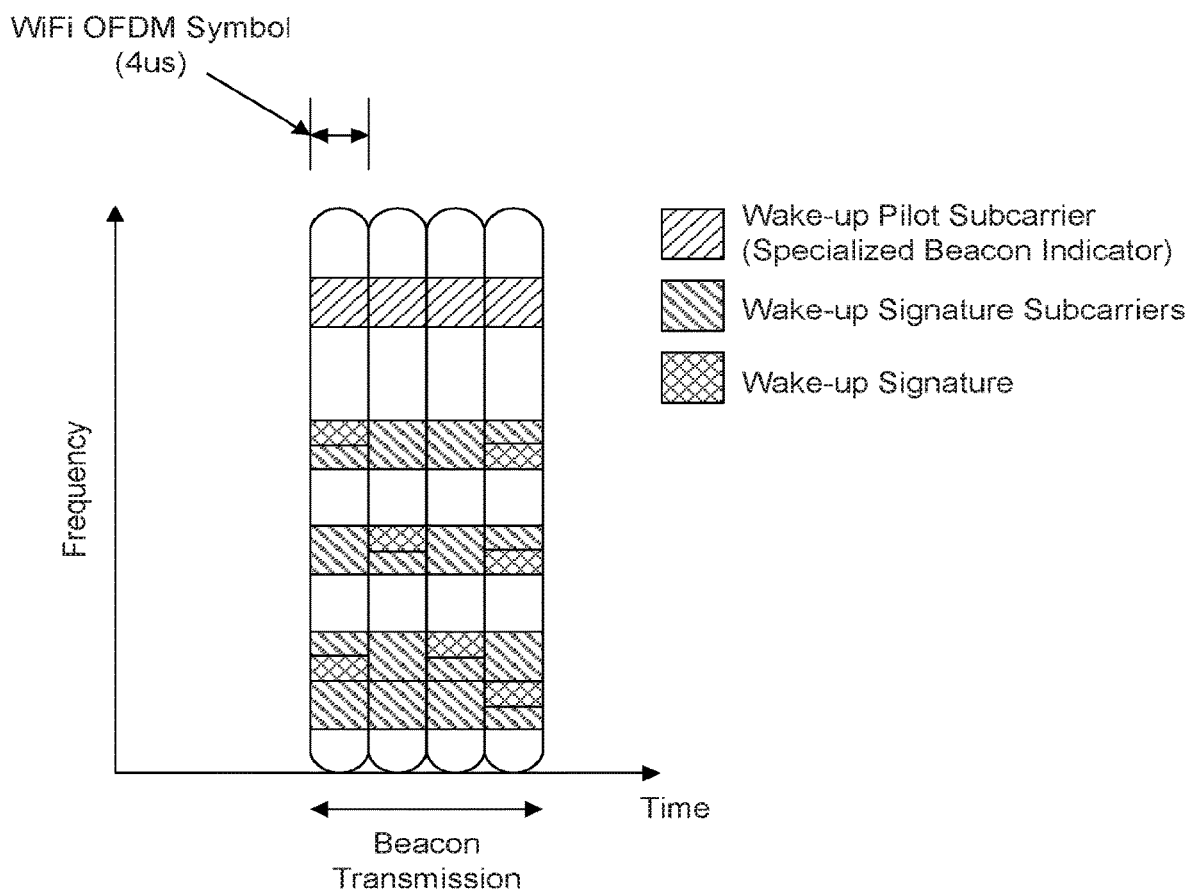
FIG. 52 is a diagram showing a specialized beacon transmission.

Referring now to FIG. 52, a diagram illustrating a specialized beacon transmission is shown. FIG. 52 illustrates a mechanism by which STAs may be made aware of the specialized beacon transmitted by an AP. On the set of OFDM symbols during beacon frame transmission by PHY, a unique pilot sequence maybe transmitted (e.g., Zadoff Chu Sequence of length seven), in pre-configured sub-carriers such as wake-up pilot subcarriers shown in FIG. 52.

The signature sequence for waking up the STA may be provided on pre-configured sets of subcarriers (e.g., wake-up signature subcarriers) that may be contiguous or distributed.

The presence of the unique wake-up pilot sequence on the wake-up pilot subcarriers may make STAs aware that the current OFDM symbol is a part of the specialized beacon frame being transmitted. Hence, the STAs may ignore the wake-up signature subcarriers for decoding the beacon frames.

The passive receiver may decode the signal from the wakeup subcarriers and may wake up the active TRX in the STA if the decoded signature matches its own wake-up signature. In order to prevent the passive receivers waking up the active TRXs during conventional transmissions (i.e., to prevent false alarms), the secondary receiver may look for a signature in the wake-up carriers and for the existence of the unique wake-up pilot sequence in the wake-up pilot subcarriers.

Figure 53:
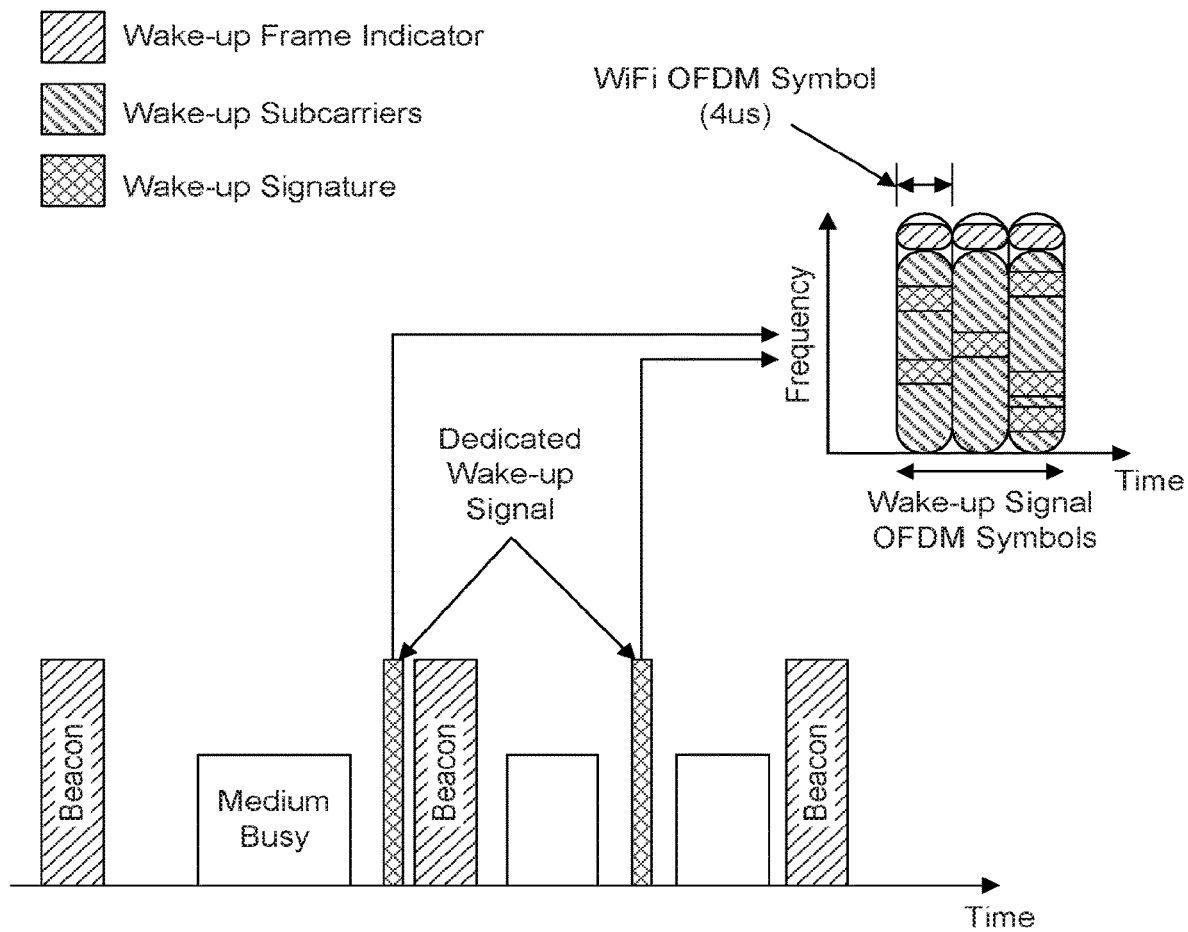
FIG. 53 is a diagram showing dedicated wakeup signal transmission.

Referring now to FIG. 53, a diagram illustrating a dedicated wakeup signal transmission is shown. The dedicated wake-up signal may include a group of OFDM symbols in time. The signal may be used for transmitting a unique energy signature associated with a wakeup command which may be used by the passive receiver in the STA to wake-up the active TRX. This signal may be transmitted right before the beacon, or may be transmitted any time when the AP senses the medium is free (e.g., between consecutive beacon transmissions shown in FIG. 53). As described above, there may be a unique identifier (e.g., a Zadoff Chu sequence of length 7) to make the wake-up receivers aware that this OFDM frame is intended for them, and for conventional STAs to discard this frame.

Individual and group wake up procedures and collision avoidance are described herein. In conventional systems, STAs may be required to wake-up at least at some multiples of beacon periods to know whether they have data to receive. The following description includes a procedure to wake up only a subset of STAs (i.e., group-wake-up procedure) using their passive receiver.

In addition to waking up STAs only as and when required, the method described herein may avoid collision that may be a potential problem that would be present in PS-POLL phase.

Figure 54:
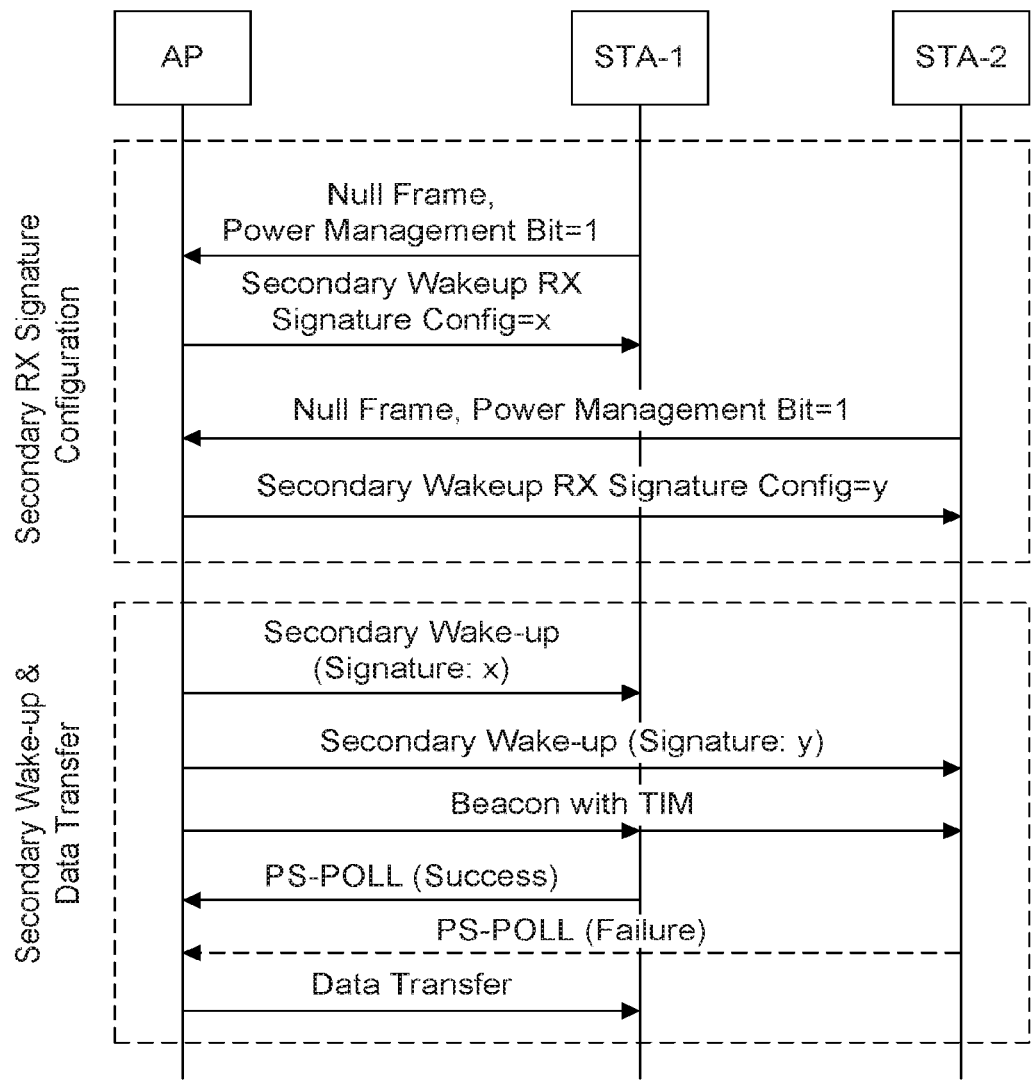
FIG. 54 is a figure showing call flow for wakeup command energy signature configuration, STA wakeup and data transfer.

Referring now to FIG. 54, a diagram illustrating a wakeup command energy signature configuration, STA wakeup, and data transfer is shown. It should be understood that one or more steps outlined below may be performed in a different order than presented herein and that one or more steps may be added to or removed from the steps stated below.

Before the STA goes into the doze state (i.e., when the STA transmits a null frame with Power Management Bit set to 1), the AP may dynamically assign a wakeup command energy signature.

The same signature may be provided to multiple STAs about to enter the doze state. In this case, the signature may be used by the AP to wake up multiple STA. Alternately, unique signatures may be configured to individual STAs, by the AP, for waking up individual STAs.

Before the beacon is transmitted by the AP, the AP may wake up the STA that it indents to send buffered data to. The STA may be awakened by the AP transmitting the wakeup command with the unique signature that was previously configured.

Thereafter, conventional PS-POLL procedures may be undertaken. One modification to the conventional PS-POLL procedure may be that only a subset of STAs (i.e., STA's primary receivers) may have been awakened by the AP.

Although the AP may wake up a subset of STAs, the traffic information map (TIM), that indicates the data available for STA, may not be changed and from conventional systems. This may be a result of the TIM containing data or storage items having information for other STAs that have not woken up yet due to selective wakeup.

In the example call flow shown in FIG. 54, both stations STA-1 and STA-2 may be woken up. However, the PS-POLL may be successful for STA-1 only. Alternatively, the STAs may be selectively woken up based on the priority of data (e.g., AC_VI, AC_VO etc.,) that needs to be delivered, which may be known by the AP.

Conventional STAs may set a power management bit to 1 before going to sleep. This may allow the AP to know that the STA is going to be in sleep mode so that AP may buffer packets.

For STAs that receive small amounts of data per wake-up cycle, the default operation may be to be awake for a specified amount of time (once they are woken up by the AP), and then go to sleep immediately thereafter, without a 'Power Management' message. The STA may send a message 'M2M-mode operation request' so that the AP knows that the STA is requesting to go to sleep after being awake for a fixed amount of time. This configuration may be a one-time configuration that the STA may request from the AP. There may be a confirm message from the AP 'M2M-mode confirm' to the STA, to accept the M2M mode change. The STA may wake up thereafter when it has data from the AP. If the STA wants to cancel the 'M2M-mode operation' it may have to wait till data is delivered by the AP. Alternately, the AP may poll the STA after waking it up once every T seconds for M2M mode cancellation. Here, T may be a very large value.

A multiple signature sequence for STA wakeup is described herein. A signature sequence set $S=\{s_0, s_1, \ldots s_N\}$ may be assigned to wake-up an STA, where $s_i$ is a unique signature sequence. Though any of the sequences $s_i$ may be used for waking up the STA, each sequence will have different impacts on power saving capability. For example, $s_0$ may be used for powering up one active receive chain of the STA, $s_1$ may be used for powering up two receive chains and so forth. Depending on the traffic that that is to be sent to STA, the AP may invoke appropriate signature sequences. As an example, if video traffic is to be delivered to the STA, the AP may invoke a signature sequence that would make four receive chains active at the STA. A signature sequence set may be constructed as a concatenation of a primary and a secondary signature sequence. Here, $S=[A_p\ A_s]$, where $A_p$ is the base signature sequence (for waking up the active TRX), and $A_s$ may be the secondary signature sequence of length $\lceil \log_2 N \rceil$ bits (where N is the number of sequences in the signature set), used for invoking specific features on the power saving capability of the STA.

Although the features and elements of the present invention may be described in the embodiments in particular combinations or orders, each feature or element can be used alone without the other features and elements of the embodiments or in various combinations with or without other features and elements of the present invention.

Although the solutions described herein consider IEEE 802.11, LTE, LTE-A, New Radio (NR) or 5G specific protocols, it may be understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU) comprising a first transceiver and a second transceiver, the method comprising:

receiving first configuration information using the first transceiver, wherein the first configuration information comprises configuration information for a first discontinuous reception cycle (DRX) cycle and configuration information for at least one second DRX cycle;

entering the first DRX cycle for the first transceiver based on the configuration information for the first DRX cycle;

receiving a first message from a first network node using the second transceiver, wherein the first message comprises parameters including a command to interrupt the first DRX cycle and use a second DRX cycle based on the configuration information for the at least one second DRX cycle, wherein the second DRX cycle is associated with a priority level, wherein the parameters of the received first message are based on an associated priority level, and wherein the received first message comprises an energy signature comprising one or more sections of different time duration and amplitudes with a same energy;

determining the second DRX cycle for the first transceiver, wherein the second DRX cycle is based on the configuration information for the at least one second DRX cycle and the received first message; and activating the first transceiver and receiving a second message based on the determined second DRX cycle.

2. The method of claim 1, wherein entering the first DRX cycle comprises placing the first transceiver in a sleep mode.

3. The method of claim 1, wherein the determined second DRX cycle has a shorter sleep cycle than the first DRX cycle.

4. The method of claim 1, further comprising:
receiving, by the first transceiver, a synchronization signal in response to receiving the first message using the second transceiver.

5. The method of claim 1, further comprising:
extracting energy, by the second transceiver, from the received first message.

6. The method of claim 1, wherein the received second message is a paging message.

7. The method of claim 6, wherein the paging message is received at a paging occasion based on the determined second DRX cycle.

8. The method of claim 1, wherein the parameters comprise a waveform type, a power level duration, or a frequency band.

9. A wireless transmit/receive unit (WTRU) comprising:
a processor;
a first transceiver; and
a second transceiver, wherein:
the first transceiver is configured to receive first configuration information, wherein the first configuration information comprises configuration information for a first discontinuous reception cycle (DRX) cycle and configuration information for at least one second DRX cycle;

the processor is configured to enter the first DRX cycle for the first transceiver based on the configuration information for the first DRX cycle;

the second transceiver is configured to receive a first message from a first network node, wherein the first message comprises parameters including a command to interrupt the first DRX cycle and use a second DRX cycle based on the configuration information for the at least one second DRX cycle, wherein the second DRX cycle is associated with a priority level, wherein the parameters of the received first message are based on an associated priority level, and wherein the received first message comprises an energy signature comprising one or more sections of different time duration and amplitudes with a same energy;

the processor is further configured to determine the second DRX cycle for the first transceiver, wherein the second DRX cycle is based on the configuration information for the at least one second DRX cycle and the received first message;

the processor is further configured to activate the first transceiver; and the first transceiver is further configured to receive a second message based on the determined second DRX cycle.

10. The WTRU of claim 9, wherein the processor is configured to enter the first DRX cycle by placing the first transceiver in a sleep mode.

11. The WTRU of claim 9, wherein the determined second DRX cycle has a shorter sleep cycle than the first DRX cycle.

12. The WTRU of claim 9, wherein the first transceiver is further configured to receive a synchronization signal in response to the second transceiver receiving the first message.

13. The WTRU of claim 9, wherein the second transceiver is further configured to extract energy from the received first message.

14. The WTRU of claim 9, wherein the received second message is a paging message.

15. The WTRU of claim 14, wherein the paging message is received at a paging occasion based on the determined second DRX cycle.

16. The WTRU of claim 9, wherein the parameters comprise a waveform type, a power level duration, or a frequency band.

* * * * *